(12) United States Patent
Ochi et al.

(10) Patent No.: US 11,718,016 B2
(45) Date of Patent: Aug. 8, 2023

(54) THREE-DIMENSIONAL OBJECT MANUFACTURING METHOD, THREE-DIMENSIONAL OBJECT, AND SHAPING DEVICE

(71) Applicant: MIMAKI ENGINEERING CO., LTD., Nagano (JP)

(72) Inventors: Kazuhiro Ochi, Nagano (JP); Kunio Hakkaku, Nagano (JP); Hirofumi Hara, Nagano (JP); Nobuo Kanai, Nagano (JP); Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 227 days.

(21) Appl. No.: 16/080,674

(22) PCT Filed: Feb. 16, 2017

(86) PCT No.: PCT/JP2017/005652
§ 371 (c)(1),
(2) Date: Aug. 29, 2018

(87) PCT Pub. No.: WO2017/150196
PCT Pub. Date: Sep. 8, 2017

(65) Prior Publication Data
US 2019/0084220 A1    Mar. 21, 2019

(30) Foreign Application Priority Data

Feb. 29, 2016 (JP) .................................. 2016-036898
Sep. 15, 2016 (JP) .................................. 2016-180720

(51) Int. Cl.
*B29C 64/112*    (2017.01)
*B29C 64/264*    (2017.01)
(Continued)

(52) U.S. Cl.
CPC ........ *B29C 64/112* (2017.08); *B24B 27/0633* (2013.01); *B29C 64/147* (2017.08);
(Continued)

(58) Field of Classification Search
None
See application file for complete search history.

(56) References Cited

U.S. PATENT DOCUMENTS

| | | | |
|---|---|---|---|
| 2004/0105967 A1* | 6/2004 | Watanabe | B29C 64/135 428/207 |
| 2005/0069784 A1* | 3/2005 | Gothait | B29C 64/40 430/5 |

(Continued)

FOREIGN PATENT DOCUMENTS

| | | |
|---|---|---|
| JP | H0811218 | 1/1996 |
| JP | H09201878 | 8/1997 |

(Continued)

OTHER PUBLICATIONS

"International Search Report (Form PCT/ISA/210)" of PCT/JP2017/005652, dated Mar. 28, 2017, with English translation thereof, pp. 1-6.

*Primary Examiner* — Matthew J Daniels
*Assistant Examiner* — Gregory C. Grosso
(74) *Attorney, Agent, or Firm* — JCIPRNET

(57) ABSTRACT

A three-dimensional object manufacturing method for manufacturing a three-dimensional object by ejecting a liquid shaping material and then solidifying the ejected shaping material includes: an interior forming process of forming an interior portion of the three-dimensional object by the shaping material; and a periphery forming process of forming a peripheral portion of a periphery of the interior portion by stacking a plurality of layers by the shaping material, where the shaping material for forming the interior portion in the interior forming process has a larger rigidity (Continued)

in a solid state compared to the shaping material for forming the peripheral portion in the periphery forming process, the periphery forming process is a process of forming a groove configuring one part of the peripheral portion, and the interior forming process is a process of forming the interior portion by placing the liquid shaping material in the groove.

13 Claims, 38 Drawing Sheets

(51) Int. Cl.
| | | |
|---|---|---|
| *B29C 64/393* | (2017.01) | |
| *B24B 27/06* | (2006.01) | |
| *B33Y 30/00* | (2015.01) | |
| *B33Y 70/00* | (2020.01) | |
| *B33Y 10/00* | (2015.01) | |
| *B29C 64/147* | (2017.01) | |
| *B29C 64/241* | (2017.01) | |
| *B29C 64/40* | (2017.01) | |
| *B29L 31/52* | (2006.01) | |
| *B33Y 80/00* | (2015.01) | |

(52) U.S. Cl.
CPC .......... *B29C 64/241* (2017.08); *B29C 64/264* (2017.08); *B29C 64/393* (2017.08); *B29C 64/40* (2017.08); *B33Y 10/00* (2014.12); *B33Y 30/00* (2014.12); *B33Y 70/00* (2014.12); *B29L 2031/5218* (2013.01); *B33Y 80/00* (2014.12)

(56) References Cited

U.S. PATENT DOCUMENTS

| | | | |
|---|---|---|---|
| 2014/0291886 A1* | 10/2014 | Mark | B33Y 30/00 |
| | | | 264/259 |
| 2015/0099087 A1* | 4/2015 | Reznar | B29C 70/68 |
| | | | 428/68 |
| 2015/0201500 A1* | 7/2015 | Shinar | B29C 64/135 |
| | | | 425/132 |
| 2017/0361497 A1* | 12/2017 | Crescenti Savall | B29B 15/122 |
| 2018/0169949 A1* | 6/2018 | Momose | B29C 67/00 |

FOREIGN PATENT DOCUMENTS

| | | | | |
|---|---|---|---|---|
| JP | H09216291 | | 8/1997 | |
| JP | 2000211032 | | 8/2000 | |
| JP | 2002036374 | | 2/2002 | |
| JP | 3557926 | B2 * | 5/2004 | ............. B29C 67/00 |
| JP | 2006130864 | | 5/2006 | |
| JP | 2009281518 | | 12/2009 | |
| JP | 4545748 | | 9/2010 | |
| JP | 2015512816 | | 4/2015 | |
| JP | 2016027957 | | 2/2016 | |
| JP | 2017026818 | | 2/2017 | |
| WO | 2005037529 | | 4/2005 | |
| WO | 2014153535 | | 9/2014 | |
| WO | WO-2016072076 | A1 * | 5/2016 | ............. B29C 67/00 |

* cited by examiner

THREE-DIMENSIONAL OBJECT MANUFACTURING METHOD, THREE-DIMENSIONAL OBJECT, AND SHAPING DEVICE

CROSS-REFERENCE TO RELATED APPLICATION

This application is a 371 application of the International PCT application serial no. PCT/JP2017/005652, filed on Feb. 16, 2017, which claims the priority benefits of Japan Patent Application No. 2016-036898, filed on Feb. 29, 2016, and claims the priority benefits of Japan Patent Application No. 2016-180720, filed on Sep. 15, 2016. The entirety of each of the above-mentioned patent applications is hereby incorporated by reference herein and made a part of this specification.

TECHNICAL FIELD

The present invention relates to a three-dimensional object manufacturing method for manufacturing a three-dimensional object by ejecting a liquid shaping material and solidifying the ejected shaping material, a three-dimensional object, and a shaping device.

BACKGROUND ART

A three-dimensional object manufacturing method for manufacturing a three-dimensional object by ejecting a liquid shaping material and then solidifying the ejected shaping material is conventionally known for the three-dimensional object manufacturing method (see Patent Document 1).

CITATION LIST

Patent Literature

Patent Literature 1: Japanese Patent No. 4545748

SUMMARY OF INVENTION

Technical Problems

In the conventional three-dimensional object manufacturing method, however, when a three-dimensional object having a narrow portion at one part is manufactured, if the narrow portion of the three-dimensional object supports a portion of one part of the three-dimensional object, stress concentrates at the narrow portion of the three-dimensional object by the weight of the portion supported by the narrow portion of the three-dimensional object and an external force applied by human hands and the like on the portion supported by the narrow portion of the three-dimensional object, and thus breakage may occur at the narrow portion of the three-dimensional object. Furthermore, if a shaping material having high flexibility in a solid state is used to suppress the occurrence of breakage, the narrow portion of the three-dimensional object may bend by the weight of the portion supported by the narrow portion of the three-dimensional object and the external force applied by the human hand and the like on the portion supported by the narrow portion of the three-dimensional object, and the narrow portion of the three-dimensional object may not be able to appropriately support the portion of one part of the three-dimensional object. Examples of such a narrow portion include a foot of a human, a foot of an animal, a foot of an insect, a wing of a dragonfly, a leaf and a branch of a plant, and the like.

The present invention provides a three-dimensional object manufacturing method for manufacturing a three-dimensional object, a three-dimensional object, and a shaping device capable of suppressing the occurrence of breakage and bend at a narrow portion.

Solutions to the Problems

A three-dimensional object manufacturing method of the present invention relates to a three-dimensional object manufacturing method for manufacturing a three-dimensional object by ejecting a liquid shaping material and then solidifying the ejected shaping material, the method including: an interior forming process of forming a portion of an interior of the three-dimensional object by the shaping material; and a periphery forming process of forming a portion of a periphery of the portion of the interior by stacking a plurality of layers by the shaping material, in which the shaping material for forming the portion of the interior in the interior forming process has a larger rigidity in a solid state compared to the shaping material for forming the portion of the periphery in the periphery forming process, the periphery forming process is a process of forming a groove configuring at least one part of the portion of the periphery, and the interior forming process is a process of forming the portion of the interior by placing the liquid shaping material in the groove either before the portion of the periphery of one part of the three-dimensional object is formed in the periphery forming process or after all the portions of the periphery of the three-dimensional object are formed in the periphery forming process.

According to such configuration, a three-dimensional object manufactured by the three-dimensional object manufacturing method of the present invention can enhance the rigidity at the narrow portion by the shaping material for forming the portion of the interior as the shaping material for forming the portion of the interior has a larger rigidity in the solid state compared to the shaping material for forming the portion of the periphery. Therefore, the three-dimensional object manufacturing method of the present invention can manufacture the three-dimensional object capable of suppressing the occurrence of breakage and bend at the narrow portion. Furthermore, the three-dimensional object manufacturing method of the present invention can facilitate the manufacturing of the portion of the interior as the portion of the interior is formed by placing the liquid shaping material in the groove.

In the three-dimensional object manufacturing method of the present invention, the interior forming process and the periphery forming process may be processes of ejecting the liquid shaping material through an inkjet method.

According to such configuration, the three-dimensional object manufacturing method of the present invention can facilitate the manufacturing of a three-dimensional object as both the portion of the interior and the portion of the periphery are formed through the inkjet method.

A three-dimensional object manufacturing method of the present invention relates to a three-dimensional object manufacturing method for manufacturing a three-dimensional object by ejecting a liquid shaping material and then solidifying the ejected shaping material, the method including: an interior forming process of forming a portion of an interior of the three-dimensional object with a reinforcement material other than the shaping material; and a periphery forming process of forming a portion of a periphery of the portion of the interior by stacking a plurality of layers by the shaping material, in which the reinforcement material has a larger rigidity compared to the shaping material in a solid state.

According to such configuration, the three-dimensional object manufactured by the three-dimensional object manufacturing method of the present invention can enhance the rigidity at the narrow portion by the reinforcement material as the reinforcement material for forming the portion of the interior has a larger rigidity compared to the shaping material in the solid state for forming the portion of the periphery. Therefore, the three-dimensional object manufacturing method of the present invention can manufacture the three-dimensional object capable of suppressing the occurrence of breakage and bend at the narrow portion.

In the three-dimensional object manufacturing method of the present invention, the reinforcement material may include a connecting part for connecting with another member.

According to such configuration, the three-dimensional object manufactured by the three-dimensional object manufacturing method of the present invention can enhance convenience as the reinforcement material can also be used for connection with another member other than for reinforcement.

In the three-dimensional object manufacturing method of the present invention, the interior forming process may be a process in which the reinforcement material is disposed in the portion of the interior before the portion of the periphery of one part of the three-dimensional object is formed in the periphery forming process.

According to such configuration, the three-dimensional object manufacturing method of the present invention can easily fix the reinforcement material inside the three-dimensional object compared to a method of inserting the reinforcement material to the portion of the periphery after all the portions of the periphery of the three-dimensional object are formed.

In the three-dimensional object manufacturing method of the present invention, the periphery forming process may be a process of ejecting the liquid shaping material with a shaping device based on shaping data, and the periphery forming process may be a process of disposing the reinforcement material in the portion of the interior in the interior forming process, then detecting a position of the reinforcement material with respect to the portion of the periphery, and correcting the shaping data based on the detected position.

According to such configuration, the three-dimensional object manufacturing method of the present invention can facilitate the disposition work of the reinforcement material to the portion of the periphery as the shaping data is corrected based on the position of the reinforcement material with respect to the portion of the periphery. Therefore, the three-dimensional object manufacturing method of the present invention can facilitate the manufacturing of the three-dimensional object.

In the three-dimensional object manufacturing method of the present invention, the interior forming process may be a process in which the reinforcement material is inserted to the portion of the interior after all the portions of the periphery of the three-dimensional object are formed in the periphery forming process.

According to such configuration, the three-dimensional object manufacturing method of the present invention can facilitate the manufacturing of the portion of the periphery compared to a method of disposing the reinforcement material at the portion of the periphery before the portion of the periphery of one part of the three-dimensional object is formed.

In the three-dimensional object manufacturing method of the present invention, the periphery forming process may be a process in which a direction orthogonal to an extending direction of the layer is a vertical direction; the three-dimensional object may have a space formed at one part of an area on a lower side of the reinforcement material in the vertical direction in the periphery forming process; the portion of the periphery may include a supporting portion that supports the reinforcement material on the lower side of the reinforcement material in the vertical direction in the periphery forming process and that configures one part of a boundary of the space; and a surface of the supporting portion of the surfaces forming the space may be an inclined plane that does not overhang in the periphery forming process.

According to such configuration, the three-dimensional object manufacturing method of the present invention can reduce the weight and the material cost of the three-dimensional object as the necessary amount of the shaping material is greatly reduced by forming a space in which the shaping material does not exist at one part of an area on the lower side of the reinforcement material in the vertical direction in the periphery forming process. Furthermore, the three-dimensional object manufacturing method of the present invention can restrain each layer from losing shape at the portion of the space, and consequently, can form the three-dimensional object with satisfactory precision as the surface of the supporting portion of the surfaces forming the space is an inclined surface that does not overhang in the periphery forming process.

In the three-dimensional object manufacturing method of the present invention, the supporting portion may include an end supporting part that supports the reinforcement material at an end of the reinforcement material in the extending direction of the layer; and a non-end supporting part that supports the reinforcement material at a portion other than the end.

According to such configuration, the three-dimensional object manufacturing method of the present invention can suppress occurrence of deflection in the reinforcement material by arranging the non-end supporting part by the shaping material in an area where the length in the extending direction of the layer is long in the reinforcement material, and thus the three-dimensional object can be formed with satisfactory precision.

In the three-dimensional object manufacturing method of the present invention, the reinforcement material may have a hole formed at least one part of an area having the space formed on both sides in a direction orthogonal to the extending direction of the layer.

According to such configuration, the three-dimensional object manufacturing method of the present invention can greatly reduce the weight and the material cost of the three-dimensional object as the necessary amount of reinforcement material is greatly reduced by forming a hole in the reinforcement material.

A three-dimensional object of the present invention includes: an interior portion; and a portion of a periphery of the portion of the interior, in which the portion of the periphery is formed by a shaping material in a solid state, the portion of the interior is formed by a reinforcement material other than the shaping material, and the reinforcement material has a larger rigidity compared to the shaping material in the solid state.

According to such configuration, the three-dimensional object of the present invention can enhance the rigidity at the narrow portion by the reinforcement material as the reinforcement material for forming the portion of the interior has a larger rigidity compared to the shaping material in the solid state for forming the portion of the periphery. Therefore, the three-dimensional object of the present invention can suppress the occurrence of breakage and bend at the narrow portion.

In the three-dimensional object of the present invention, the reinforcement material may include a connecting part for connecting with another member.

According to such configuration, the three-dimensional object of the present invention can enhance convenience as the reinforcement material is also used for connection with another member other than for reinforcement.

A three-dimensional object of the present invention includes: a plurality of porous sheets, each porous sheet having a great number of holes formed thereon and being layered; and a shaping material that causes the porous sheets to adhere to each other by entering the holes.

According to such configuration, the three-dimensional object of the present invention is suited as a three-dimensional object capable of suppressing the occurrence of breakage and bend at the narrow portion since the porous sheets are caused to adhere by the shaping material to enhance the mechanical strength.

In the three-dimensional object of the present invention, the shaping material may be an ultraviolet curable ink that cures when irradiated with an ultraviolet light.

According to such configuration, the three-dimensional object of the present invention can be manufactured with high precision at high speed as the shaping material is cured with high precision at high speed.

A shaping device of the present invention includes: a supporting member in which a plurality of porous sheets are layered, each of the plurality of porous sheets having a great number of holes formed thereon; and a shaping material head that ejects a shaping material for causing the porous sheets to adhere to each other by entering the holes toward the plurality of porous sheets layered in the supporting member.

According to such configuration, the shaping device of the present invention can manufacture a three-dimensional object having a high mechanical strength as the porous sheets are caused to adhere to each other by the shaping material to enhance the mechanical strength. Therefore, the shaping device of the present invention is suited for the manufacturing of the three-dimensional object capable of suppressing the occurrence of breakage and bend at the narrow portion.

The shaping device of the present invention further includes a laser cutter that cuts out a three-dimensional object from the plurality of layered porous sheets, the three-dimensional object including the plurality of porous sheets in which the porous sheets are layered in an adhering state by the shaping material.

According to such configuration, the shaping device of the present invention can manufacture the high precision three-dimensional object having a high mechanical strength as the porous sheets are caused to adhere to each other with the shaping material to enhance the mechanical strength, and the three-dimensional object is cut out at high precision from the layered plurality of porous sheets by the laser cutter.

The shaping device of the present invention may further include a moving means that relatively moves the porous sheet with respect to the supporting member, in which after one part is cut out from the porous sheet by the laser cutter, the porous sheet may be relatively moved with respect to the supporting member by the moving means to layer the porous sheet on a side opposite to the supporting member side with respect to a portion cut out by the laser cutter and supported by the supporting member in the porous sheet.

According to such configuration, the shaping device of the present invention facilitates the layering of the plurality of porous sheets in the supporting member, and can facilitate the manufacturing of the three-dimensional object.

In the shaping device of the present invention, the supporting member may be rotatably supported, the shaping device may include a rotating means that rotates the supporting member; and the rotating means may wind the porous sheet around the supporting member by rotating the supporting member to layer the porous sheet.

According to such configuration, the shaping device of the present invention facilitates the layering of the plurality of porous sheets in the supporting member, and thus can facilitate the manufacturing of the three-dimensional object.

In the shaping device of the present invention, the supporting member may include a plurality of surfaces for forming the three-dimensional object in a rotating direction.

According to such configuration, the shaping device of the present invention can manufacture a plurality of three-dimensional objects at high speed as the three-dimensional object can be manufactured on each of the plurality of surfaces of the supporting member.

In the shaping device of the present invention, the shaping material head may bring into contact with each other, wherein the shaping materials ejected with a rotation angle of the supporting member by the rotating means different from each other.

According to such configuration, the shaping device of the present invention can manufacture the three-dimensional object of a shape corresponding to the rotation of the supporting member by the rotating means such as a tube-shaped three-dimensional object.

Effect of the Invention

A three-dimensional object manufacturing method, a three-dimensional object, and a shaping device of the present invention can manufacture a three-dimensional object capable of suppressing the occurrence of breakage and bend at a narrow portion.

DESCRIPTION OF EMBODIMENTS

Hereinafter, embodiments of the present invention will be described with reference to the accompanying drawings.

First Embodiment

First, a structure of a shaping device used in a three-dimensional object manufacturing method according to a first embodiment of the present invention will be described.

Figure 1:
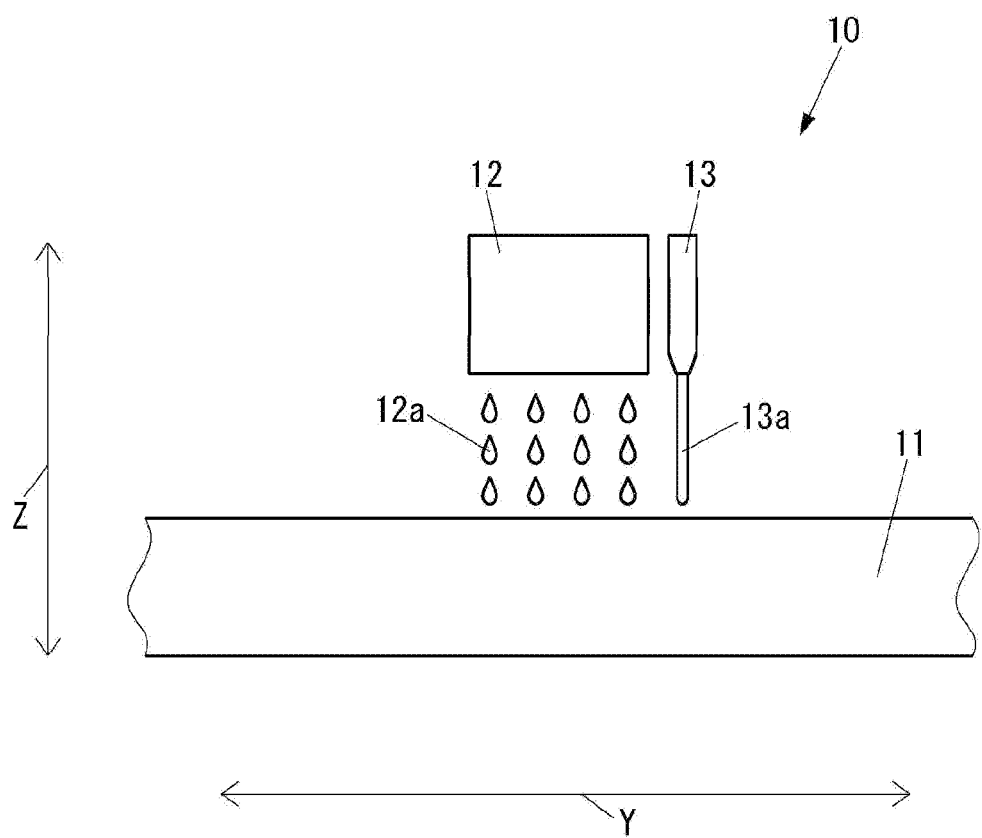
FIG. 1 is a schematic front view of a shaping device used in a three-dimensional object manufacturing method according to a first embodiment of the present invention.

FIG. 1 is a schematic front view of a shaping device 10 used in the three-dimensional object manufacturing method according to the present embodiment.

As shown in FIG. 1, the shaping device 10 includes a shaping table 11, which is to become a table for a three-dimensional object when a three-dimensional object is manufactured, a shaping head 12 of an inkjet method that ejects a liquid shaping material 12a toward the shaping table 11, and a shaping head 13 of an FDM (Fused Deposition Modeling/thermal dissolution layering method) method that ejects a liquid shaping material 13a toward the shaping table 11.

The FDM method is a method of arraying or layering a thermoplastic resin in a melted state. The layers in the FDM method are welded and integrated.

A UV curable ink that solidifies when irradiated with a UV (Ultra Violet) may be used for the shaping material 12a.

A thermoplastic resin that becomes a liquid when heated and that becomes a solid when cooled is used for the shaping material 13a. PVC (PolyVinyl Chloride) and ABS (Acrylonitrile Butadiene Styrene) resin may be used as the thermoplastic resin used for the shaping material 13a. Furthermore, an engineering plastic such as polycarbonate and PET (PolyEthylene Terephthalate) may be used as the thermoplastic resin used for the shaping material 13a.

The shaping material 13a uses a material that has a larger rigidity in the solid state compared to the shaping material 12a. Furthermore, as the shaping material 13a, a material that has a high bending strength in the solid state compared to the shaping material 12a is preferably used.

Figure 2:
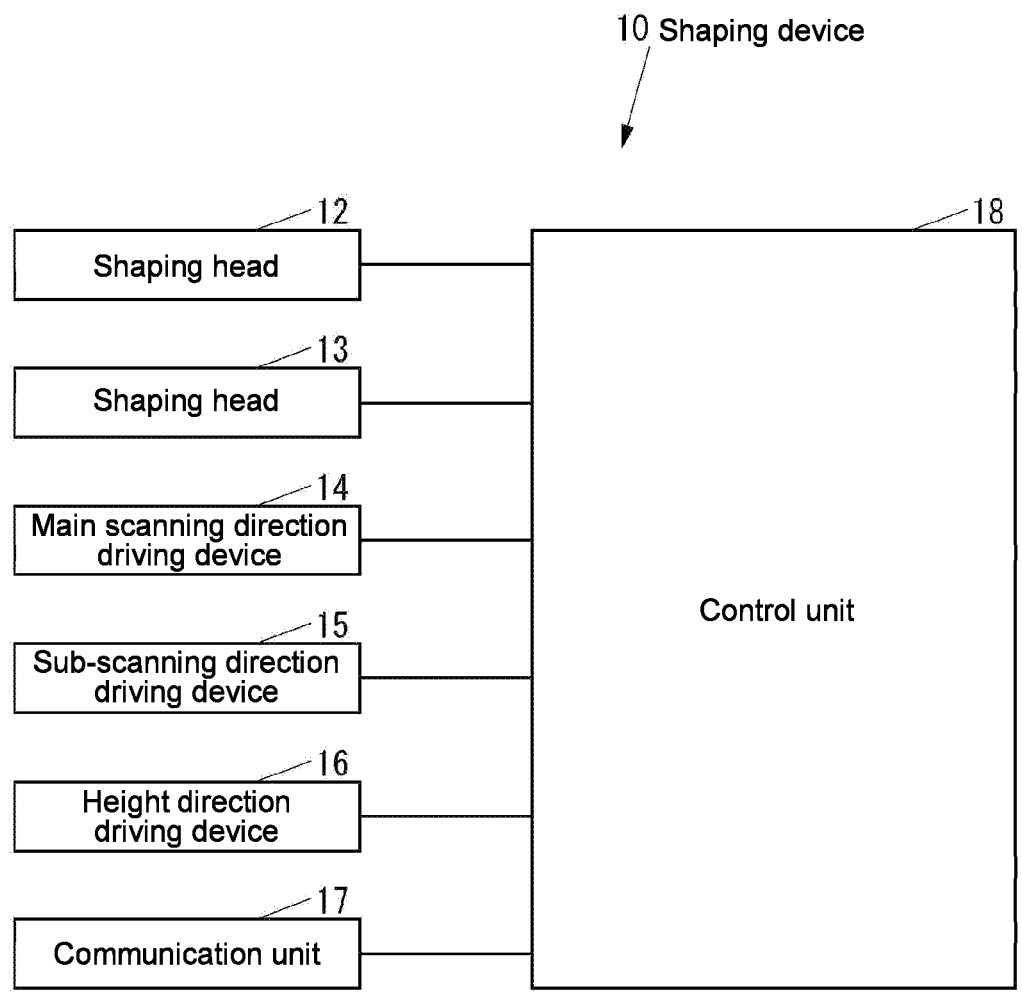
FIG. 2 is a block diagram of the shaping device shown in FIG. 1.

FIG. 2 is a block diagram of the shaping device 10.

As shown in FIG. 1 and FIG. 2, the shaping device 10 includes a main-scanning direction driving device 14 that relatively drives one of the shaping table 11, and the shaping head 12 and the shaping head 13 with respect to the other in a Y direction orthogonal to a Z direction serving as an ejecting direction of the shaping material by the shaping head 12 and the shaping head 13. The Z direction is a vertical direction.

The shaping device 10 includes a sub-scanning direction driving device 15 that relatively drives one of the shaping table 11, and the shaping head 12 and the shaping head 13 with respect to the other in an X direction (not shown) orthogonal to both the Y direction and the Z direction.

The shaping device 10 includes a height direction driving device 16 that relatively drives one of the shaping table 11, and the shaping head 12 and the shaping head 13 with respect to the other in the Z direction.

The shaping device 10 includes a communication unit 17, which is a communication device that carries out communication with an external device via a network (not shown), and a control unit 18 that controls the entire shaping device 10.

The control unit 18 includes a CPU (Central Processing Unit), a ROM (Read Only Memory) that stores programs and various types of data in advance, and a RAM (Random Access Memory) used as a work region of the CPU. The CPU executes the program stored in the ROM.

Next, a three-dimensional object manufacturing method according to the present embodiment will be described.

When shaping data is input via the communication unit 17, the control unit 18 of the shaping device 10 controls the shaping head 12, the shaping head 13, the main-scanning direction driving device 14, the sub-scanning direction driving device 15, and the height direction driving device 16 based on the input shaping data to manufacture the three-dimensional object. Specifically, in a periphery forming process, the control unit 18 ejects the liquid shaping material 12a with the shaping head 12 based on the shaping data, and then solidifies the ejected shaping material 12a to form a portion of a periphery of a portion of an interior of the three-dimensional object. The portion of the interior is hereinafter referred to as "interior portion". The portion of the periphery is hereinafter referred to as "peripheral portion". Furthermore, in an interior forming process, the control unit 18 ejects the liquid shaping material 13a with the shaping head 13 based on the shaping data, and then solidifies the ejected shaping material 13a to form the interior portion of the three-dimensional object.

Figure 3A:
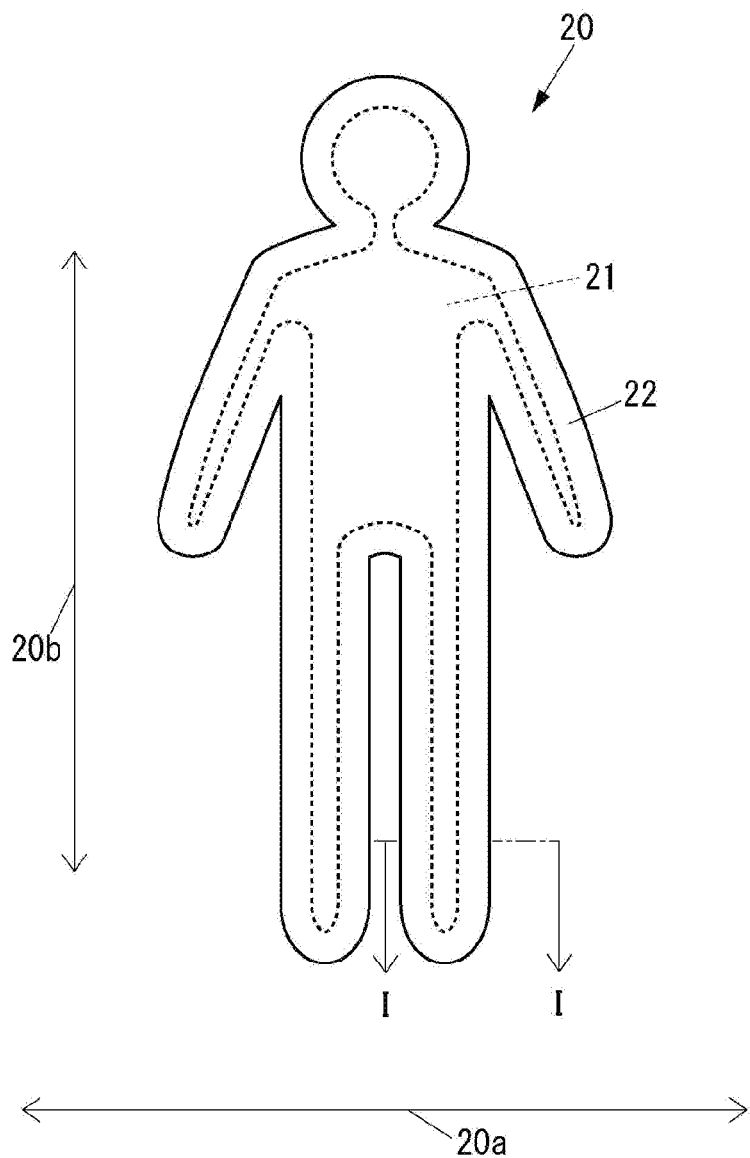
FIG. 3A is a plan view of one example of a three-dimensional object manufactured by the shaping device shown in FIG. 1.
Figure 3B:
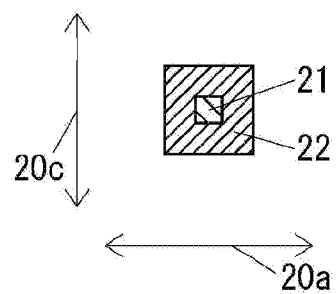
FIG. 3B is a cross-sectional view taken along I-I shown in FIG. 3A.

FIG. 3A is a plan view of one example of a three-dimensional object 20 manufactured by the shaping device 10. FIG. 3B is a cross-sectional view taken along I-I shown in FIG. 3A.

The three-dimensional object 20 shown in FIG. 3A and FIG. 3B is a doll. In the three-dimensional object 20, a front and back direction indicated with an arrow 20a, a left and right direction indicated with an arrow 20b, and an up and down direction indicated with an arrow 20c in FIG. 3A and FIG. 3B, each correspond to the X direction, the Y direction, and the Z direction at a time point of being manufactured by the shaping device 10.

The three-dimensional object 20 includes an interior portion 21 and a peripheral portion 22. At least a portion of the peripheral portion 22 on a surface side of the three-dimensional object 20 may be a decorative portion decorated with patterns and colors. Furthermore, the interior portion 21 may be configured white. The interior portion 21 configures a light reflecting portion that satisfactorily reflects light entering from the surface side of the three-dimensional object 20 and realizes coloring by subtractive color mixing by being configured white.

The interior portion 21 is formed by stacking a plurality of layers of shaping material 13a in the Z direction through the FDM method. Similarly, the peripheral portion 22 is formed by stacking a plurality of layers of shaping material 12a in the Z direction through the inkjet method.

Figure 4:
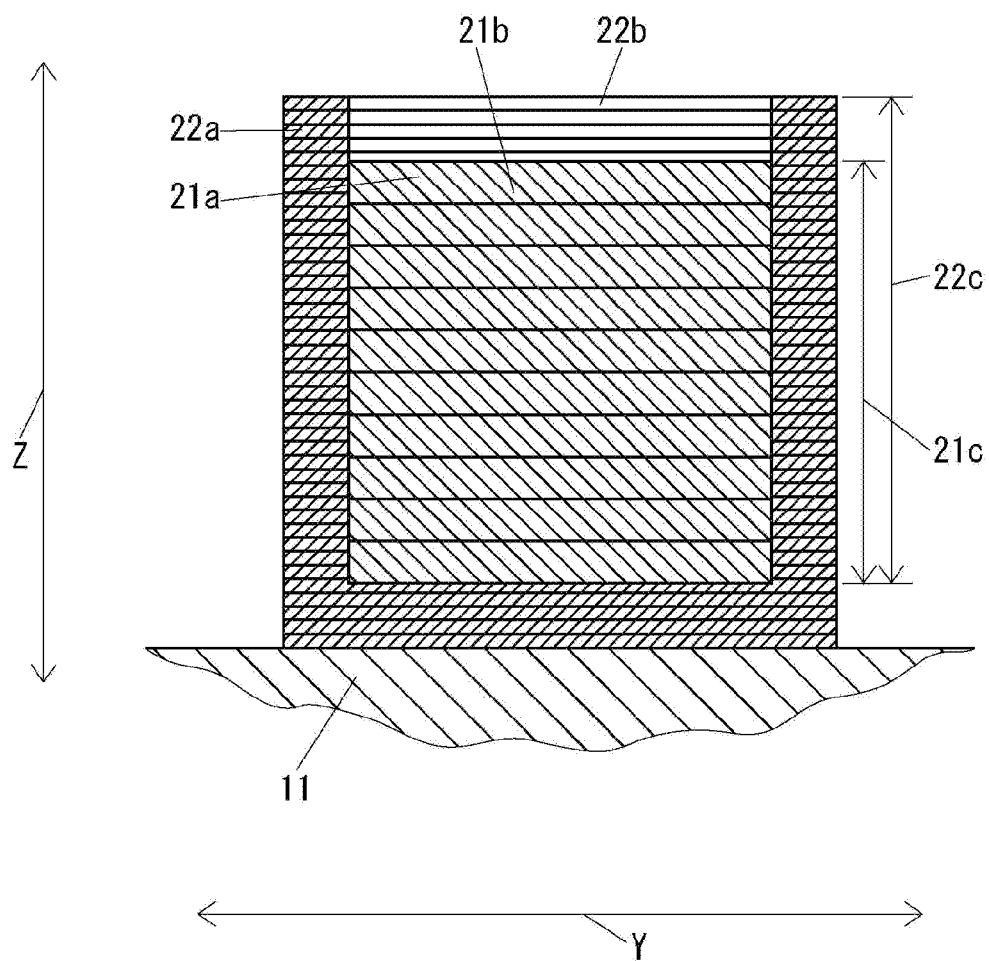
FIG. 4 is a cross-sectional view of the three-dimensional object in a middle stage of the three-dimensional object shown in FIG. 3A and FIG. 3B being manufactured.

The thickness of each layer by the inkjet method is very thin such as 40 μm. On the other hand, the thickness of each layer by the FDM method is thicker than the thickness of each layer by the inkjet method. Therefore, when the three-dimensional object 20 is manufactured, the control unit 18 preferably performs a control so that a height 21c in the Z direction of a portion 21b formed by the layers 21a by the FDM method does not become greater than a depth 22c in the Z direction of a groove 22b formed by stacking a plurality of layers 22a by the inkjet method, as shown in FIG. 4.

The control unit 18 may flatten the surface of the layer 22a with a roller (not shown) after the shaping material 12a for forming the layer 22a is ejected to even the thickness of each of the plurality of layers 22a. However, as an adhesiveness of the layers 22a lowers if the surface of the layer 22a is excessively flattened in the three-dimensional object 20, stripping may occur between two adjacent layers 22a when external force is applied or when expansion or contraction occurs by the influence of temperature. Thus, to enhance the adhesiveness between two adjacent layers 22a, the control unit 18 may form a great number of microscopic protruding portions by ejecting the shaping material 12a with the shaping head 12 on the surface of the layer 22a after flattening the surface of the layer 22a.

The control unit 18 may detect the status of the formation of the three-dimensional object 20 in the middle of forming the three-dimensional object 20 using a detection device such as a CCD (Charge-Coupled Device). The control unit 18 then determines whether or not the status of the formation of the three-dimensional object 20 is proceeding exactly like the shaping data. When determining that the status of the formation of the three-dimensional object 20 is not proceeding exactly like the shaping data, the control unit 18 corrects the shaping data so that an outer shape of the three-dimensional object 20 becomes exactly like the original shaping data. Thus, the precision of the outer shape of the completed three-dimensional object 20 is enhanced. In particular, the three-dimensional object manufacturing method according to the present embodiment has a great advantage in that the shaping data is corrected according to the status as the interior portion 21 and the peripheral portion 22 are formed through different methods from each other with shaping materials of different materials from each other and then overlapped with each other.

Figure 5:
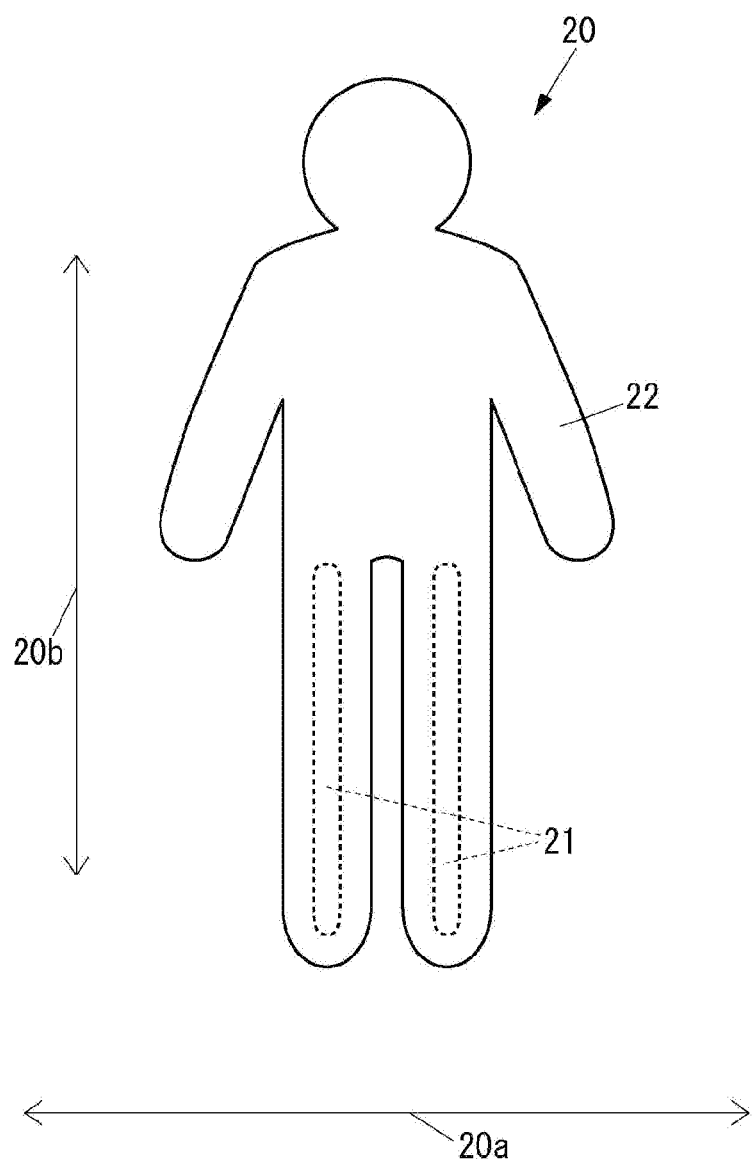
FIG. 5 is a plan view of an example of the three-dimensional object manufactured by the shaping device shown in FIG. 1, and shows the example different from the example shown in FIG. 3A and FIG. 3B.

The interior portion 21 is disposed over substantially the entire region of the three-dimensional object 20 in the example shown in FIG. 3A, but may be disposed only in an area where reinforcement is required in the three-dimensional object 20 as shown in FIG. 5.

The three-dimensional object manufacturing method according to the present embodiment can facilitate the manufacturing of the interior portion 21 as the interior portion 21 is formed by placing the liquid shaping material 13a in the groove 22b.

In the present embodiment, the interior portion 21 is formed by the FDM method. However, the interior portion 21 may be formed by the shaping material 13a through methods other than the FDM method. Furthermore, the interior portion 21 may be formed by the shaping material 13a through the inkjet method. Since the groove 22b is formed by the peripheral portion 22, the shaping material 13a for forming the interior portion 21 may merely be flowed into the groove 22b. Thus, the interior portion 21 may be formed through a method of ejecting the liquid shaping material 13a toward the groove 22b from a dispenser and the like, and then solidifying the ejected shaping material 13a. When using epoxy resin for the shaping material 13a for forming the interior portion 21, two dispensers, one of which is filled with the resin and the other of which is filled with a curing agent may be prepared, so that the resin ejected from one dispenser and the curing agent ejected from the other dispenser are mixed in the groove 22b.

When forming both the interior portion 21 and the peripheral portion 22 through the inkjet method, the structure of the shaping device can be simplified, and thus the manufacturing of the three-dimensional object 20 can be facilitated.

The shaping material 13a for forming the interior portion 21 merely needs to be a curable liquid such as a two-component curable material when the interior portion 21 is formed by flowing the shaping material 13a into the groove 22b. The shaping material 13a for forming the interior portion 21 may be an FRP (Fiber Reinforced Plastics) material, or may be combined with CNT (Carbon Nano Tube).

Figure 6:
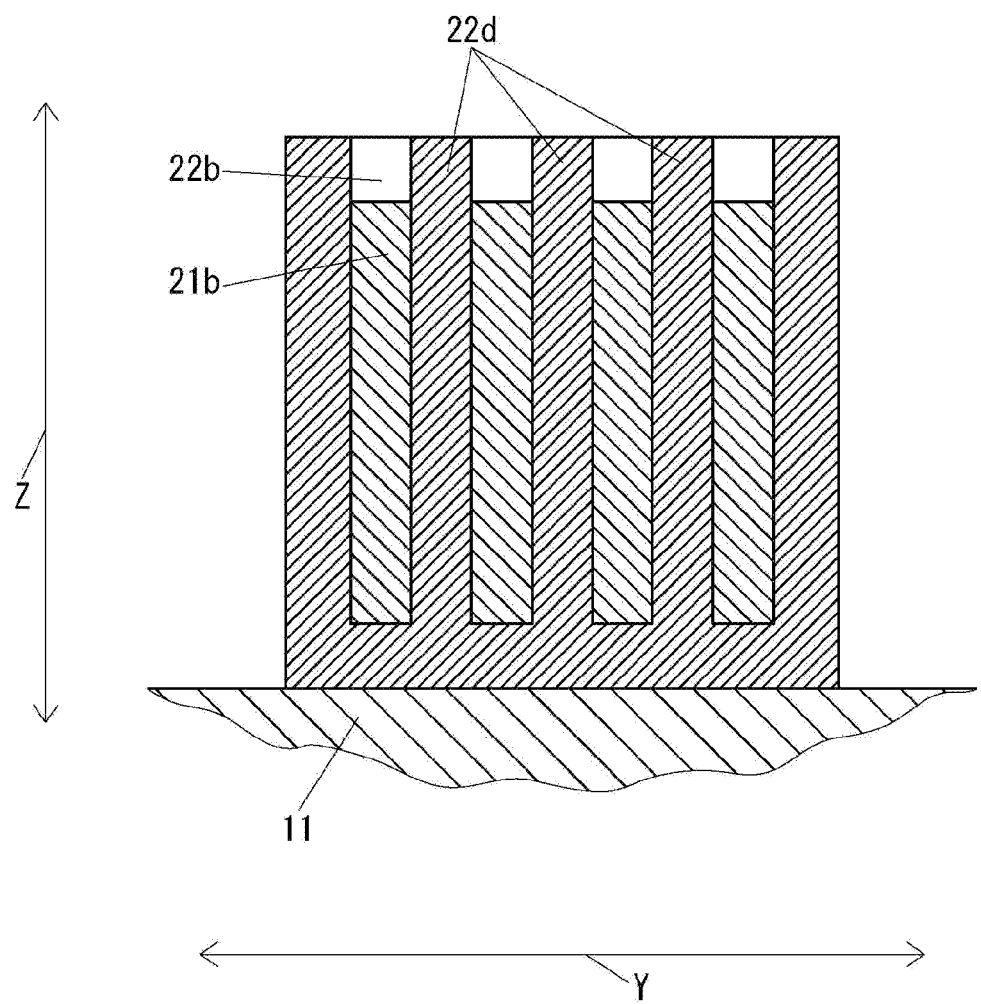
FIG. 6 is a cross-sectional view of the three-dimensional object in a middle stage of the three-dimensional object manufactured by the shaping device shown in FIG. 1 being manufactured.

As shown in FIG. 6, a projection 22d may be formed in the groove 22b. As the capacity of the groove 22b is reduced by the presence of the projection 22d, the amount of shaping material 13a for forming the interior portion 21 is reduced, and consequently, the time until the shaping material 13a for forming the interior portion 21 becomes a solid becomes short. Therefore, the three-dimensional object 20 can be formed early.

In the present embodiment, the peripheral portion 22 is formed by the inkjet method. However, the peripheral portion 22 may be formed by the shaping material 12a through methods other than the inkjet method. Furthermore, the peripheral portion 22 may be formed by the shaping material 12a through the FDM method.

As described above, the three-dimensional object 20 manufactured by the three-dimensional object manufacturing method according to the present embodiment can enhance the rigidity at the narrow portion by the shaping material 13a for forming the interior portion 21 as the shaping material 13a for forming the interior portion 21 has a larger rigidity in the solid state compared to the shaping material 12a for forming the peripheral portion 22. Therefore, the three-dimensional object manufacturing method according to the present embodiment can manufacture the three-dimensional object 20 capable of suppressing the occurrence of breakage and bend at the narrow portion.

As described above, the interior forming process of forming the interior portion 21 by the shaping material Ha is executed before the peripheral portion 22 of one part of the three-dimensional object 20 is formed by the periphery forming process of forming the peripheral portion 22 by the shaping material 12a. However, the interior forming process may be executed after all the peripheral portions 22 of the three-dimensional object 20 are formed by the periphery forming process. A hole communicating from the exterior to the interior of the peripheral portion 22 is formed in the periphery forming process, so that the process in which the shaping material 13a for the interior portion 21 is flowed into the interior of the peripheral portion 22 through the hole may be executed after all the peripheral portions 22 of the three-dimensional object 20 are formed by the periphery forming process.

Second Embodiment

First, a structure of a shaping device used in a three-dimensional object manufacturing method according to a second embodiment of the present invention will be described.

Figure 7:
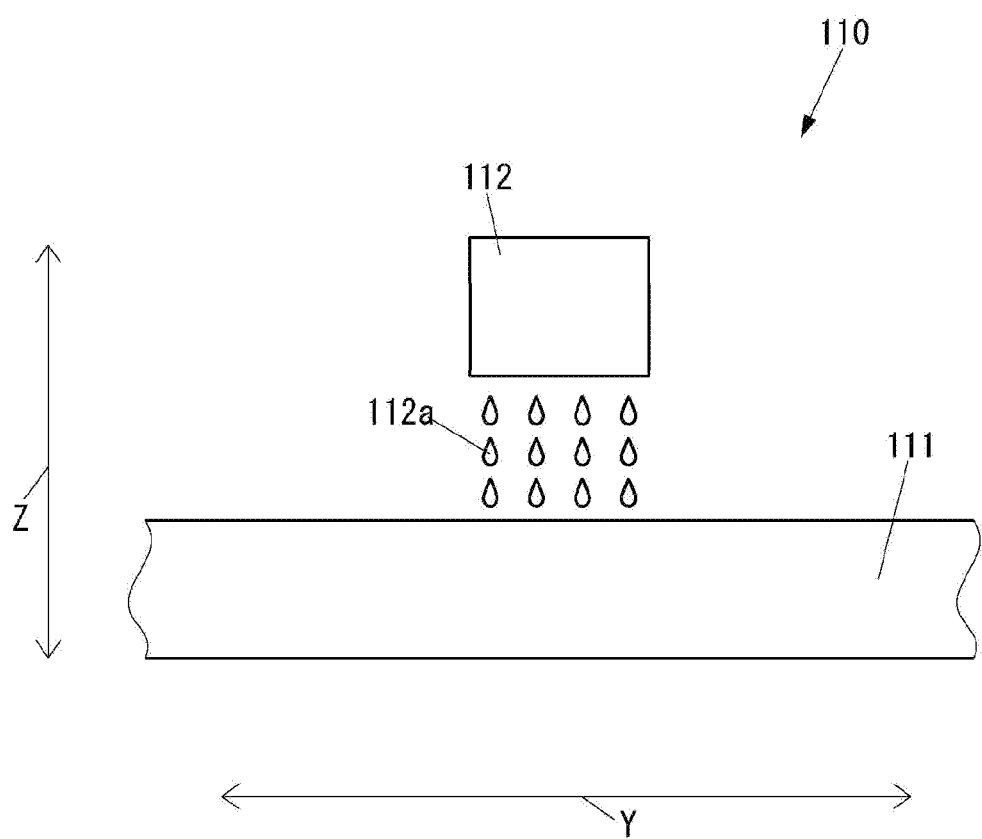
FIG. 7 is a schematic front view of a shaping device used in a three-dimensional object manufacturing method according to a second embodiment of the present invention.

FIG. 7 is a schematic front view of a shaping device 110 used in a three-dimensional object manufacturing method according to the present embodiment.

As shown in FIG. 7, the shaping device 110 includes a shaping table 111, which is to become a table for a three-dimensional object when the three-dimensional object is manufactured, and a shaping head 112 of an inkjet method that ejects a liquid shaping material 112a toward the shaping table 111.

A UV curable ink that solidifies when irradiated with a UV may be used for the shaping material 112a.

Figure 8:
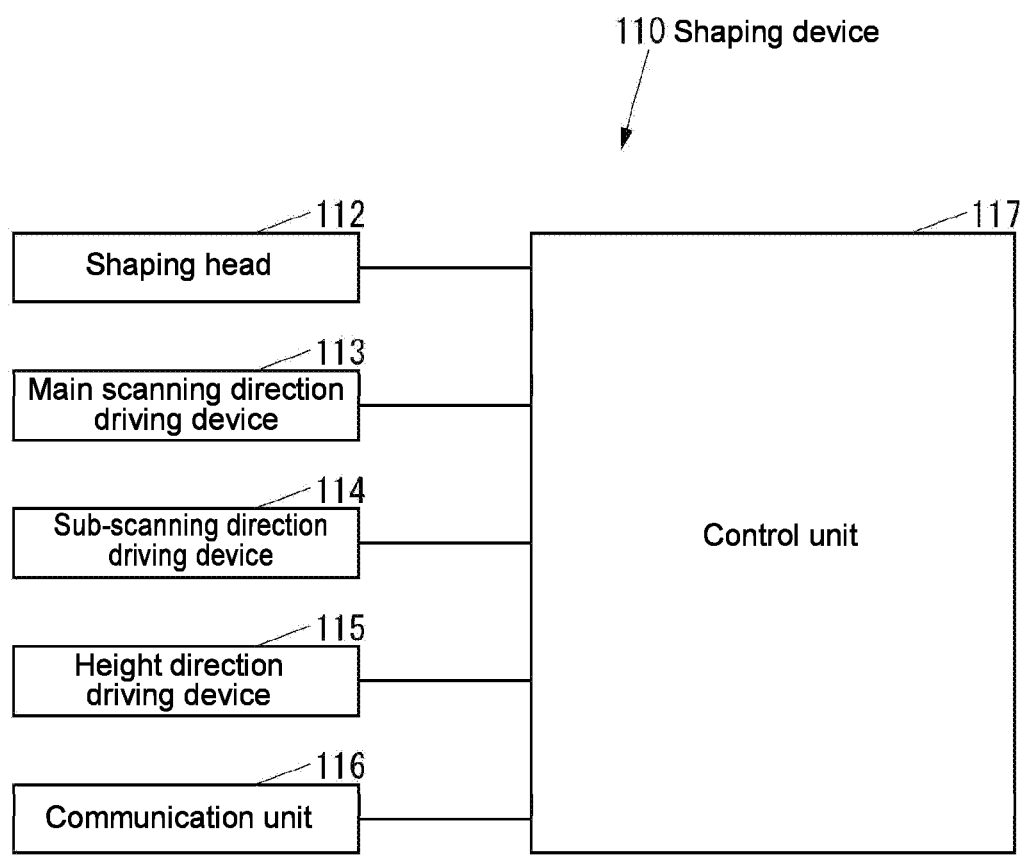
FIG. 8 is a block diagram of the shaping device shown in FIG. 7.

FIG. 8 is a block diagram of the shaping device 110.

As shown in FIG. 7 and FIG. 8, the shaping device 110 includes a main-scanning direction driving device 113 that relatively drives one of the shaping table 111 and the shaping head 112 with respect to the other in a Y direction orthogonal to a Z direction serving as an ejecting direction of the shaping material 112a by the shaping head 112. The Z direction is a vertical direction.

The shaping device 110 includes a sub-scanning direction driving device 114 that relatively drives one of the shaping table 111 and the shaping head 112 with respect to the other in an X direction (not shown) orthogonal to both the Y direction and the Z direction.

The shaping device 110 includes a height direction driving device 115 that relatively drives one of the shaping table 111 and the shaping head 112 with respect to the other in the Z direction.

The shaping device 110 includes a communication unit 116, which is a communication device that carries out communication with an external device via a network (not shown), and a control unit 117 that controls the entire shaping device 110.

The control unit 117 includes a CPU, a ROM that stores programs and various types of data in advance, and a RAM used as a work region of the CPU. The CPU executes the program stored in the ROM.

Next, the three-dimensional object manufacturing method according to the present embodiment will be described.

When shaping data is input via the communication unit 116, the control unit 117 of the shaping device 110 controls the shaping head 112, the main-scanning direction driving device 113, the sub-scanning direction driving device 114, and the height direction driving device 115 based on the input shaping data to manufacture a three-dimensional object. Specifically, in a periphery forming process, the control unit 117 ejects the liquid shaping material 112a with the shaping head 112 based on the shaping data, and then solidifies the ejected shaping material 112a to form a peripheral portion of an interior portion of the three-dimensional object.

Figure 9A:
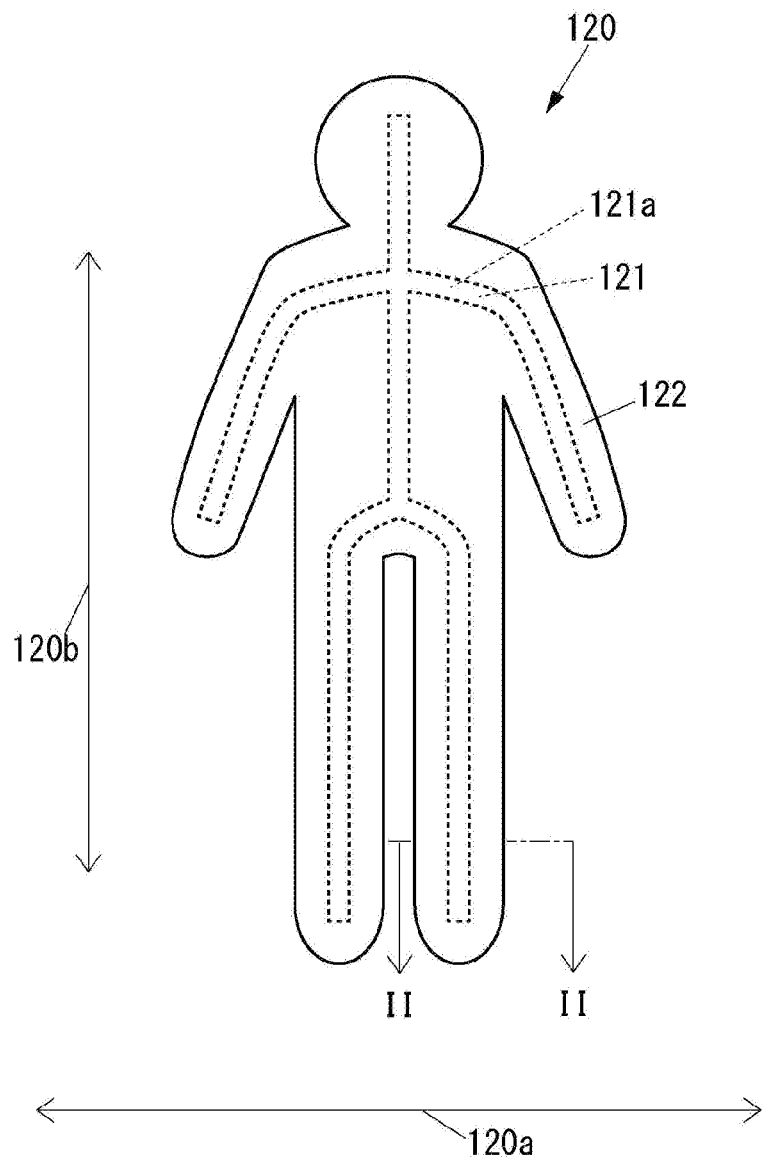
FIG. 9A is a plan view of one example of a three-dimensional object manufactured by the shaping device shown in FIG. 7.
Figure 9B:
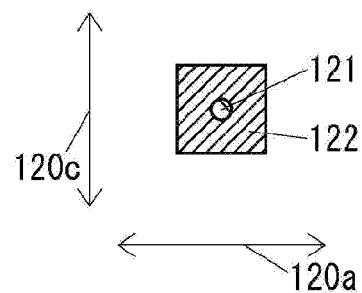
FIG. 9B is a cross-sectional view taken along II-II shown in FIG. 9A.

FIG. 9A is a plan view of one example of a three-dimensional object 120 manufactured by the shaping device 110. FIG. 9B is a cross-sectional view taken along II-II shown in FIG. 9A.

The three-dimensional object 120 shown in FIG. 9A and FIG. 9B is a doll. In the three-dimensional object 120, a front and back direction indicated with an arrow 120a, a left and right direction indicated with an arrow 120b, and an up and down direction indicated with an arrow 120c in FIG. 9A and FIG. 9B each correspond to the X direction, the Y direction, and the Z direction at a time point of being manufactured by the shaping device 110.

The three-dimensional object 120 includes an interior portion 121 and a peripheral portion 122.

The interior portion 121 is formed by a reinforcement material 121a other than the shaping material 112a ejected by the shaping head 112. Metal, resin, wood, and the like may be used for the reinforcement material 121a. When metal is used for the reinforcement material 121a, a piano wire is preferred if thinness and strength are required, and stainless is preferred if rust becomes an issue. When resin is used for the reinforcement material 121a, epoxy resin is preferred if adhesivity to the shaping material 112a is required, and FRP such as glass fiber containing resin and carbon fiber containing resin is preferred if rigidity is required. The reinforcement material 121a has a larger rigidity compared to the shaping material 112a in the solid state. Furthermore, the reinforcement material 121a preferably uses a material that has a high bending strength compared to the shaping material 112a in the solid state. Moreover, the reinforcement material 121a preferably uses a material having a high impact value in addition to the high bending strength compared to the shaping material 112a in the solid state.

Figure 10:
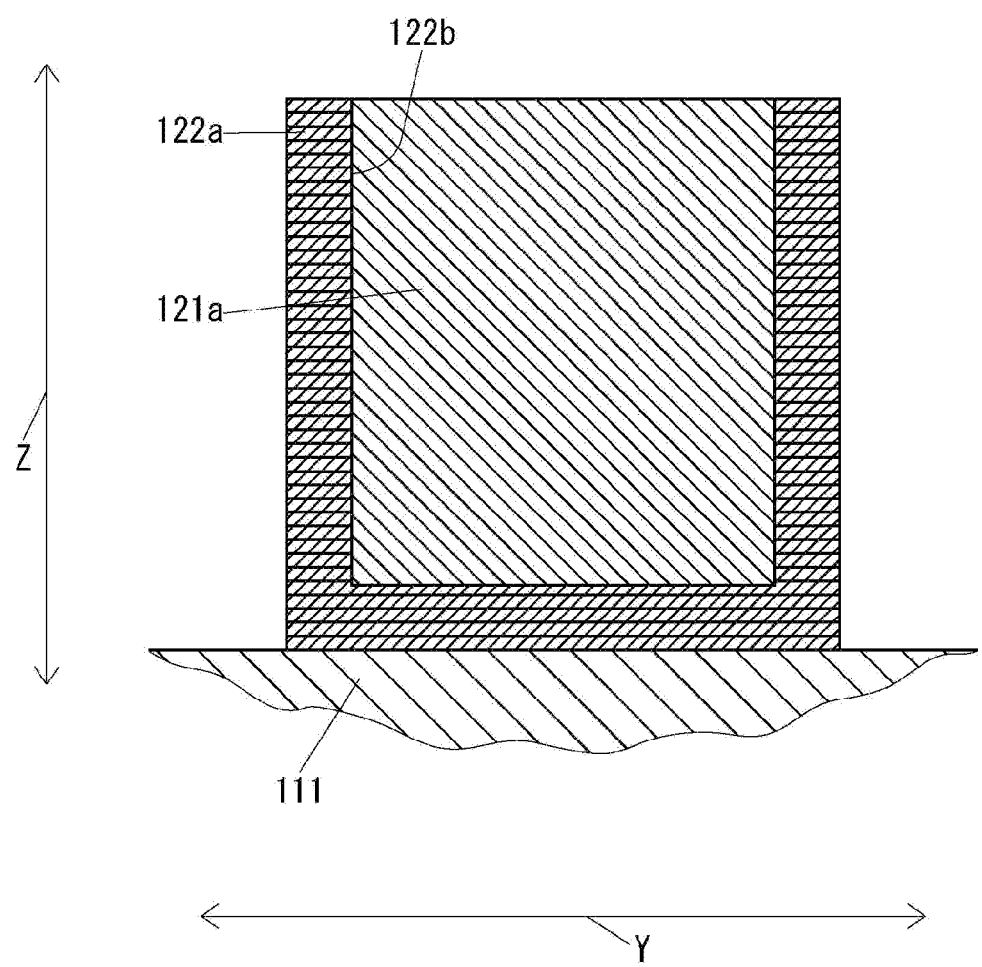
FIG. 10 is a cross-sectional view of the three-dimensional object in a middle stage of the three-dimensional object shown in FIG. 9A and FIG. 9B being manufactured.

At least a portion of the peripheral portion 122 on a surface side of the three-dimensional object 120 may be a decorative portion decorated with patterns and colors. As shown in FIG. 10, the peripheral portion 122 is formed by stacking a plurality of layers 122a of shaping material 112a in the Z direction through the inkjet method.

The control unit 117 may flatten the surface of the layer 122a with a roller (not shown) after the shaping material 112a for forming the layer 122a is ejected to even the thickness of each of the plurality of layers 122a. However, as the adhesiveness of the layers 122a lowers if the surface of the layer 122a is excessively flattened in the three-dimensional object 120, stripping may occur between two adjacent layers 122a when external force is applied or when expansion or contraction occurs by the influence of temperature. Thus, to enhance the adhesiveness between two adjacent layers 122a, the control unit 117 may form a great number of microscopic protruding portions by ejecting the shaping material 112a with the shaping head 112 on the surface of the layer 122a after flattening the surface of the layer 122a.

The control unit 117 may detect the status of the formation of the three-dimensional object 120 in the middle of forming the three-dimensional object 120 using a detection device such as a CCD. The control unit 117 then determines whether or not the status of the formation of the three-dimensional object 120 is proceeding exactly like the shaping data. When determining that the status of the formation of the three-dimensional object 120 is not proceeding exactly like the shaping data, the control unit 117 corrects the shaping data so that an outer shape of the three-dimensional object 120 becomes exactly like the original shaping data. Thus, the precision of the outer shape of the completed three-dimensional object 120 is enhanced. After the reinforcement material 121a is disposed on the peripheral portion 122 before the peripheral portion 122 of one part of the three-dimensional object 120 is formed by the periphery forming process, the position of the reinforcement material 121a with respect to the peripheral portion 122 may be detected and the shaping data may be corrected based on the detected position. The three-dimensional object manufacturing method according to the present embodiment has a large advantage in that the shaping data is corrected according to the status as the peripheral portion 122 is overlapped on the interior portion 121 in the vertical direction, that is, the Z direction.

Figure 11:
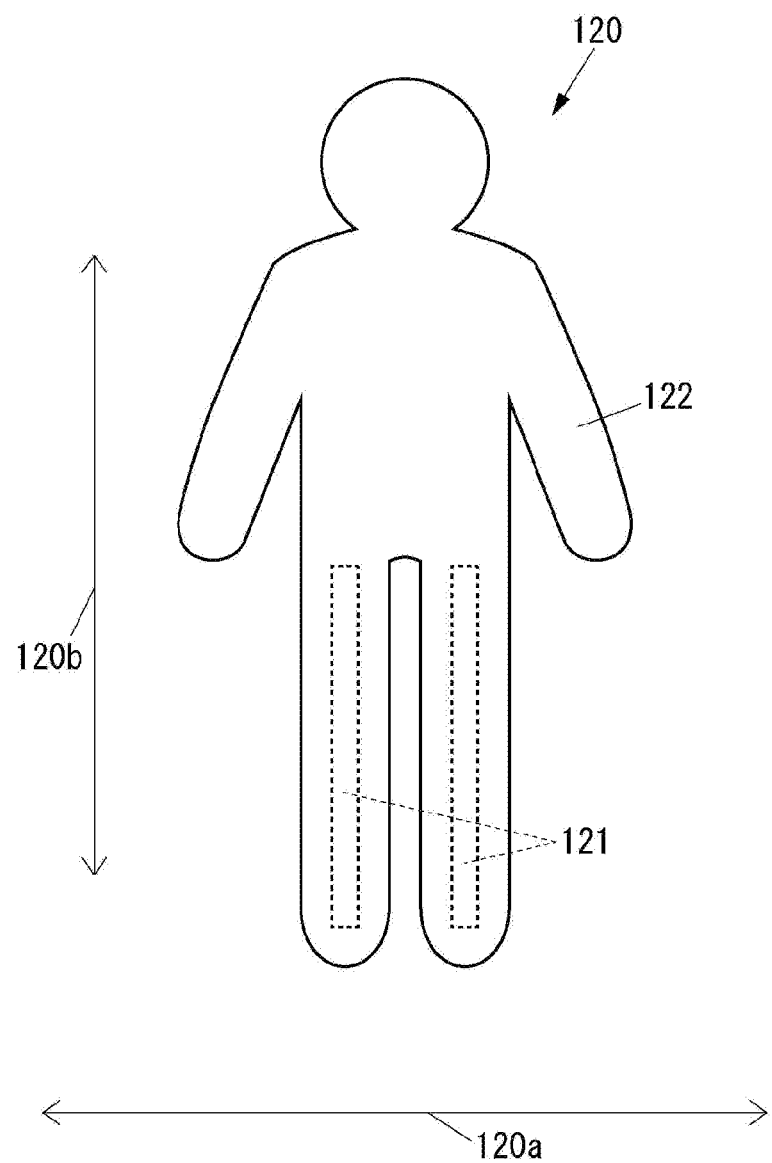
FIG. 11 is a plan view of an example of the three-dimensional object manufactured by the shaping device shown in FIG. 7, and shows the example different from the example shown in FIG. 9A and FIG. 9B.

The interior portion 121 is disposed over substantially the entire region of the three-dimensional object 120 in the example shown in FIG. 9A, but may be disposed only in an area where reinforcement is required in the three-dimensional object 120 as shown in FIG. 11.

Figure 12:
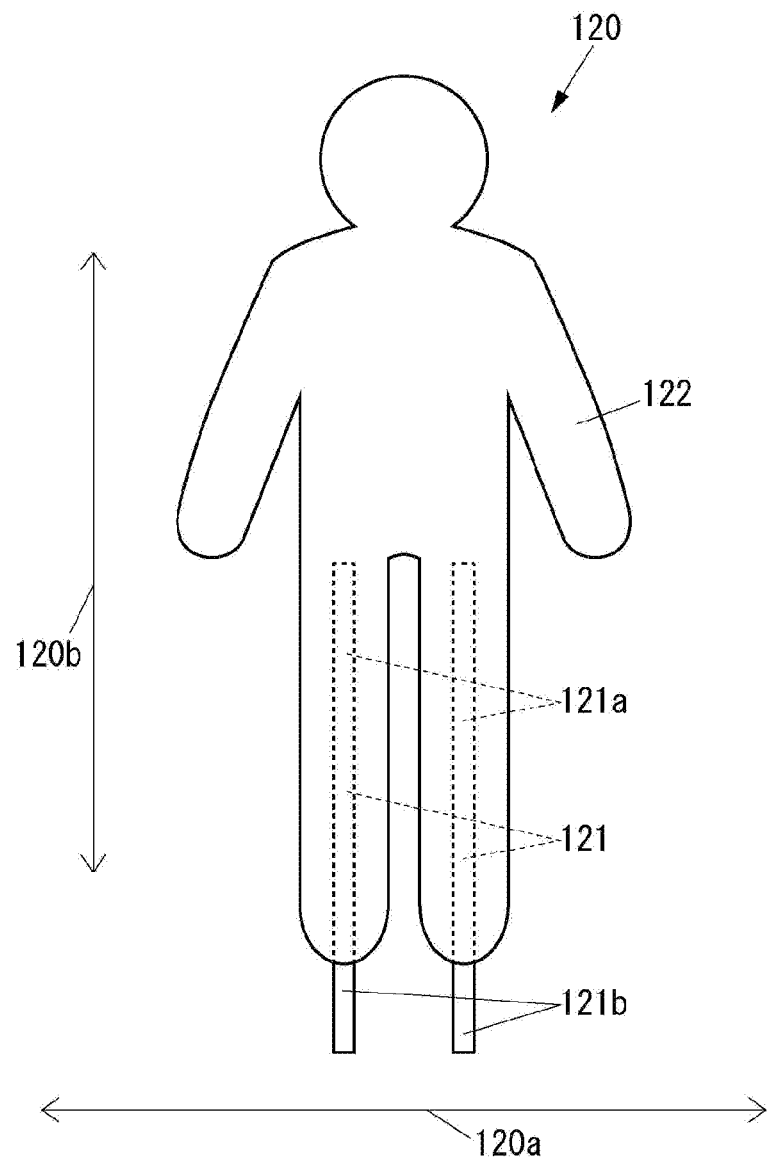
FIG. 12 is a plan view of an example of the three-dimensional object manufactured by the shaping device shown in FIG. 7, and shows the example different from the examples shown in FIG. 9A and FIG. 9B and FIG. 11.

The reinforcement material 121a configuring the interior portion 121 may have a portion 121b of one part extending out to the exterior of the three-dimensional object 120 as shown in FIG. 12. When the portion 121b of one part of the reinforcement material 121a is extending out to the exterior of the three-dimensional object 120, the portion 121b can be utilized in various applications.

Figure 13A:
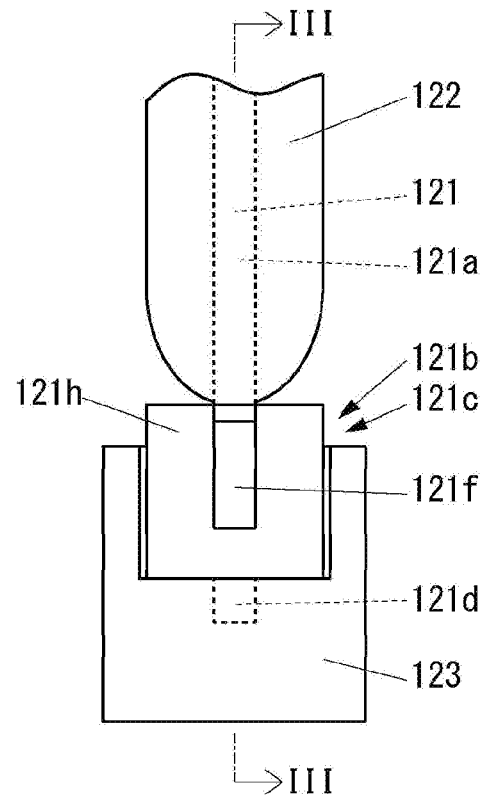
FIG. 13A is a view showing an alternative embodiment of a portion of a reinforcement material extending out to the exterior of the three-dimensional object in FIG. 12.
Figure 13B:
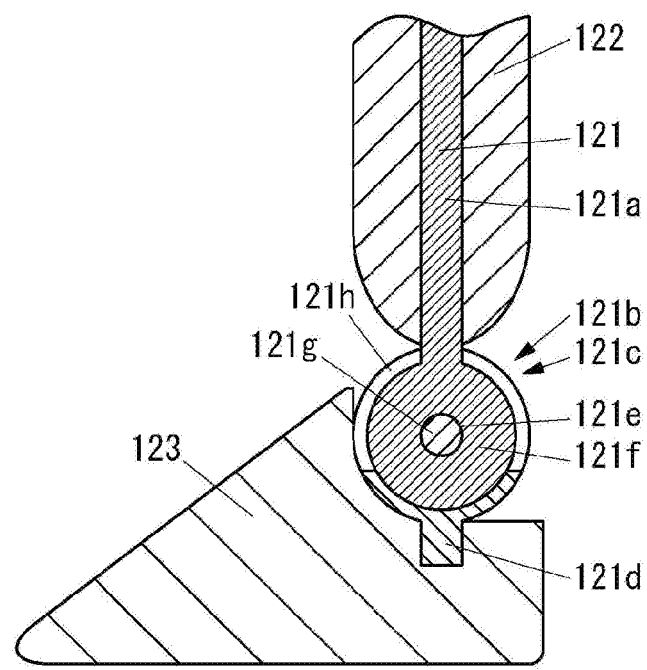
FIG. 13B is a cross-sectional view taken along line shown in FIG. 13A.

The portion 121b of the reinforcement material 121a may be used as a connecting part for connecting with another member. When used as the connecting part, the portion 121b may be simply inserted and fixed to another member, but if having a screw formed thereon, may be coupled with a screw of another member. Furthermore, the portion 121h can be connected with another member in a state where an angle can be changed with respect to another member by having a region like a hinge formed thereon. FIG. 13A and FIG. 13B are views showing an example in which a hinge 121c is formed at the portion 121b. In FIG. 13A and FIG. 13B, the portion 121b includes a connecting part 121d that connects the hinge 121c and a foot 123 serving as another member. The hinge 121c includes a portion 121f integrally formed with the interior portion 121 and having a hole 121e formed at the center, a shaft 121*g* to be inserted to the hole 121*e*, and a portion 121*h* having a hole (not shown) therein to which the shaft 121*g* inserted. The connecting part 121*d* is integrally formed with the portion 121*h*. In FIG. 13A and FIG. 13B, the foot joint of the doll is formed by the hinge 121*c*, but joints of other portions such as a knee joint and a hip joint may be formed with similar configuration. In FIG. 13A and FIG. 13B, the hinge 121*c* can realize the rotation around the shaft 121*g* orthogonal to the extending direction of the interior portion 121, but may also be able to realize rotation in a direction other than the rotation in the direction shown in FIG. 13A and FIG. 13B such as the rotation around a shaft extending in the extending direction of the interior portion 121.

Furthermore, the portion 121*b* of the reinforcement material 121*a* may be used for flowing current. When the reinforcement material 121*a* itself has conductivity, the portion 121*b* itself of the reinforcement material 121*a* may be used as an electrode. Even if the reinforcement material 121*a* itself does not have conductivity, if the reinforcement material 121*a* has a pipe shape, power can be supplied from the exterior of the three-dimensional object 120 by inserting an electrical wire into the reinforcement material 121*a*. The power supplied from the exterior of the three-dimensional object 120 is supplied to an electronic component attached to the three-dimensional object 120. An LED (Light Emitting Diode) and the like can be used for the electronic component attached to the three-dimensional object 120.

The three-dimensional object 120 can realize the flow of current in the interior using the reinforcement material 121*a*, but the flow of current in the interior can be realized by adopting the shaping material 112*a* containing particles of a substance having conductivity for the shaping material 112*a* of an area where current flow is required.

Figure 14:
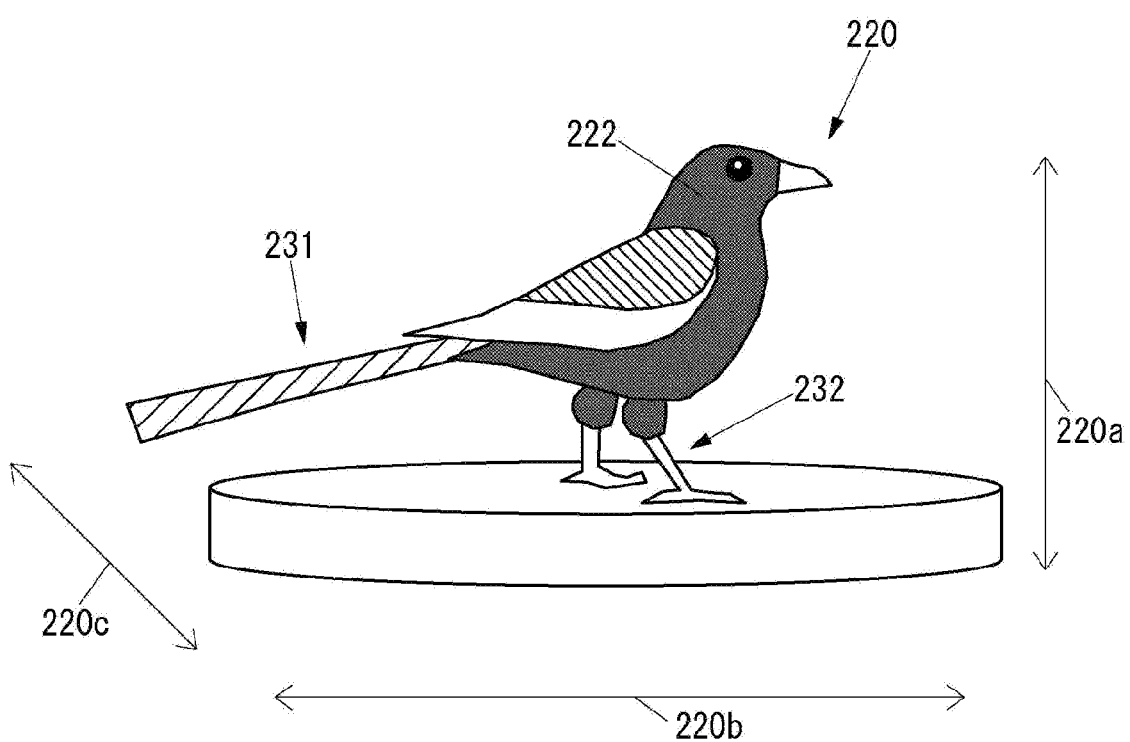
FIG. 14 is a perspective view of an outer appearance of an example of the three-dimensional object manufactured by the shaping device shown in FIG. 7, and shows the example different from the examples shown in FIG. 9A and FIG. 9B, FIG. 11, and FIG. 12.
Figure 15A:
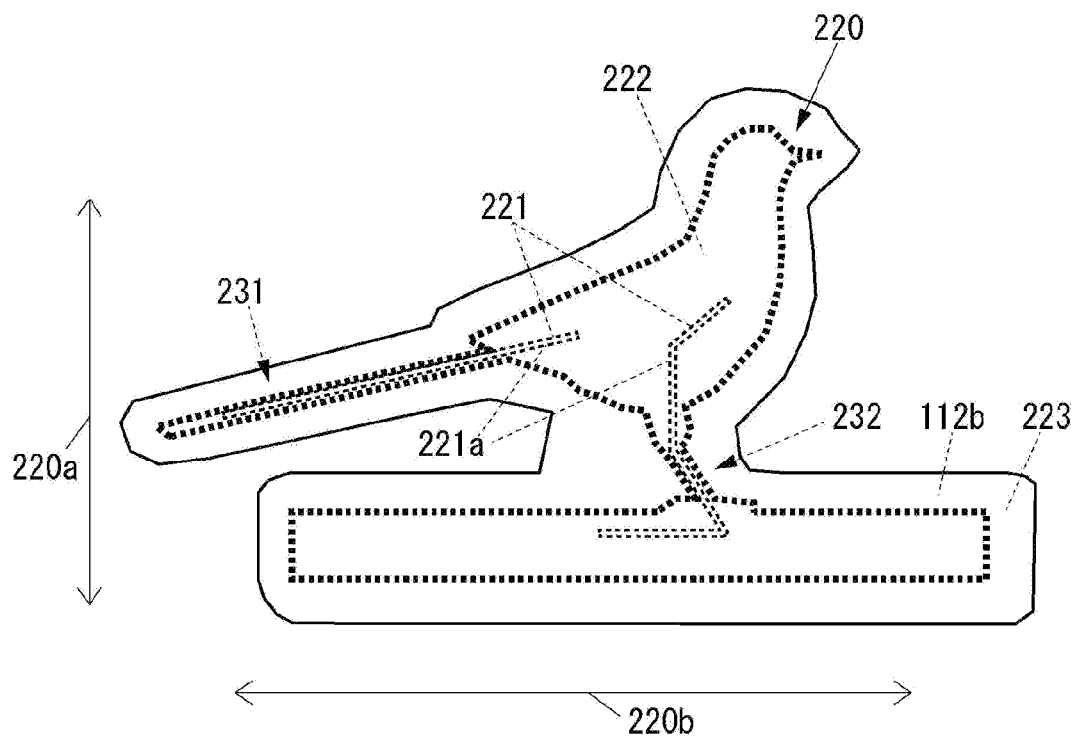
FIG. 15A is a side view of the three-dimensional object shown in FIG. 14 in a state before a support material portion formed by the support material is removed.
Figure 15B:
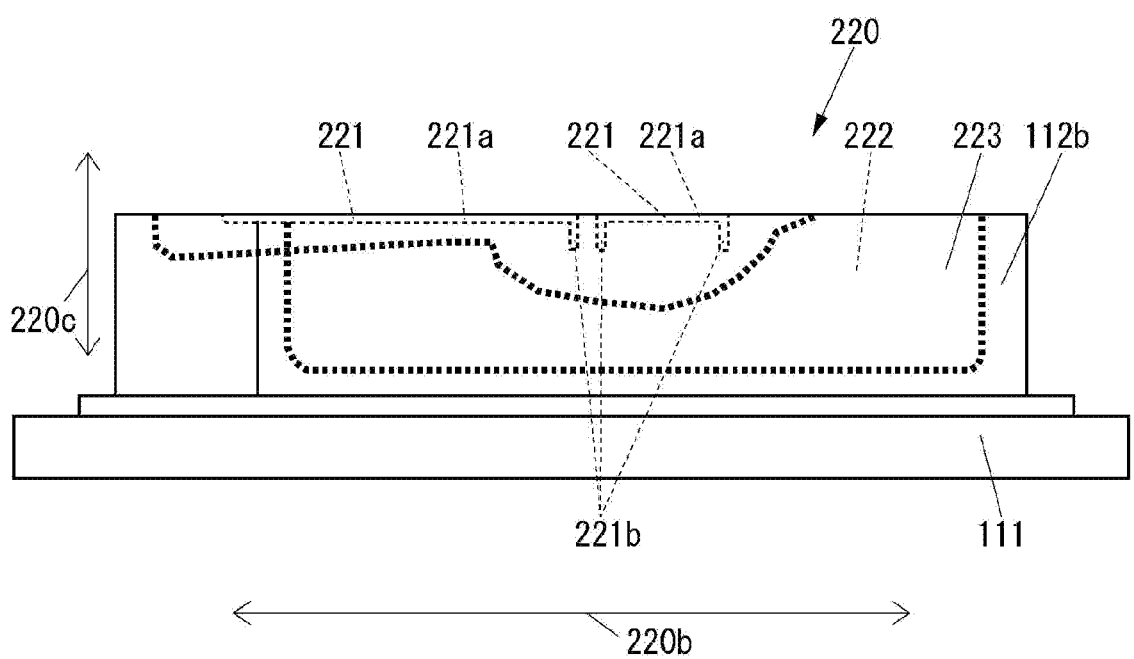
FIG. 15B is a bottom view of the three-dimensional object shown in FIG. 14 in the middle of being manufactured by the shaping device.

FIG. 14 is a perspective view of an outer appearance of a three-dimensional object 220 manufactured by the shaping device 110. FIG. 15A is a side view of the three-dimensional object 220 before a support material portion 223 formed by the support material 112*b* is removed. FIG. 15B is a bottom view of the three-dimensional object 220 in the middle of being manufactured by the shaping device 110.

The three-dimensional object 220 shown in FIG. 14 and FIG. 15A and FIG. 15B is a model of a small bird standing on a circular disc shaped table. In the three-dimensional object 220, an up and down direction indicated with an arrow 220*a*, a front and back direction indicated with an arrow 220*b*, and a left and right direction indicated with an arrow 220*c* in FIG. 14 and FIG. 15A and FIG. 15B each correspond to the X direction, the Y direction, and the Z direction at a time point of being manufactured by the shaping device 110.

The three-dimensional object 220 includes an interior portion 221 and a peripheral portion 222.

The interior portion 221 is formed by a reinforcement material 221*a* other than the shaping material 112*a* ejected by the shaping head 112. Metal, resin, wood, and the like may be used for the reinforcement material 221*a*. The reinforcement material 221*a* has a larger rigidity compared to the shaping material 112*a* in the solid state. Furthermore, as the reinforcement material 221*a*, a material that has a high bending strength compared to the shaping material 112*a* in the solid state is preferably used. Moreover, as the reinforcement material 221*a*, a material having a high impact value in addition to the high bending strength compared to the shaping material 112*a* in the solid state is preferably used.

At least a portion of the peripheral portion 222 on a surface side of the three-dimensional object 220 may be a decorative portion decorated with patterns and colors. When formed by stacking a plurality of layers including at least one of the shaping material 112*a* and the support material 112*b* in the Z direction, the peripheral portion 222 is formed by the shaping material 112*a* of a plurality of layers.

When the peripheral portion 222 is formed, the support material portion 223 is arranged to support the peripheral portion 222 from a lower side in the vertical direction, that is, the Z direction or from the horizontal direction. The support material portion 223 is formed by ejecting a liquid support material 112*b* with a head (not shown) similar to the shaping head 112 and then solidifying the ejected support material 112*b*, similarly to the peripheral portion 222. When formed by stacking a plurality of layers including at least one of the shaping material 112*a* and the support material 112*b* in the Z direction, the support material portion 223 is formed by the support material 112*b* of a plurality of layers. The support material 112*b* can be easily dissolved and removed by water, and the like.

The reinforcement material 221*a* is preferably a wire rod having a smaller diameter than the thickness of the three-dimensional object 220. The reinforcement material 221*a* extending in the extending direction of the layer is disposed in the middle of layering. Since a bent portion 221*b* extending in a direction perpendicular to a layering surface, that is, in a direction indicated with the arrow 220*c* exists at the end of the reinforcement material 221*a*, the three-dimensional object 220 has an increased strength with respect to the twist in the three-dimensional direction compared to when the bent portion 221*b* does not exist. When a layer lower than the reinforcement material 221*a* in the vertical direction, that is, the Z direction is formed, a hole corresponding to the bent portion 221*b* is formed so that the bent portion 221*b* is accommodated in the hole. The reinforcement material 221*a* is disposed in the peripheral portion 222 so as not to project out toward the outer side of the three-dimensional object 220. The reinforcement material 221*a* is preferably not visible from at least the outer side of the three-dimensional object 220. When the peripheral portion 222 is formed by a transparent layer having a thickness of 20 μm to 100 μm, a color layer having a thickness of 20 μm to 300 μm, a white layer having a thickness of 50 μm to 500 μm, and a shaping layer from the outer side, the reinforcement material 221*a* is preferably disposed on the inner side of the white layer.

If the three-dimensional object 220 does not include the reinforcement material 221*a*, a thin tail feather portion 231 tends to easily bend over time by the weight of the tail feather itself. Furthermore, when the three-dimensional object 220 does not include the reinforcement material 221*a*, a thin leg portion 232 tends to easily break by the weight of the portion above the leg. However, the three-dimensional object 220 includes the reinforcement material 221*a*, and thus the occurrence of such breakage and bend can be suppressed.

Figure 16:
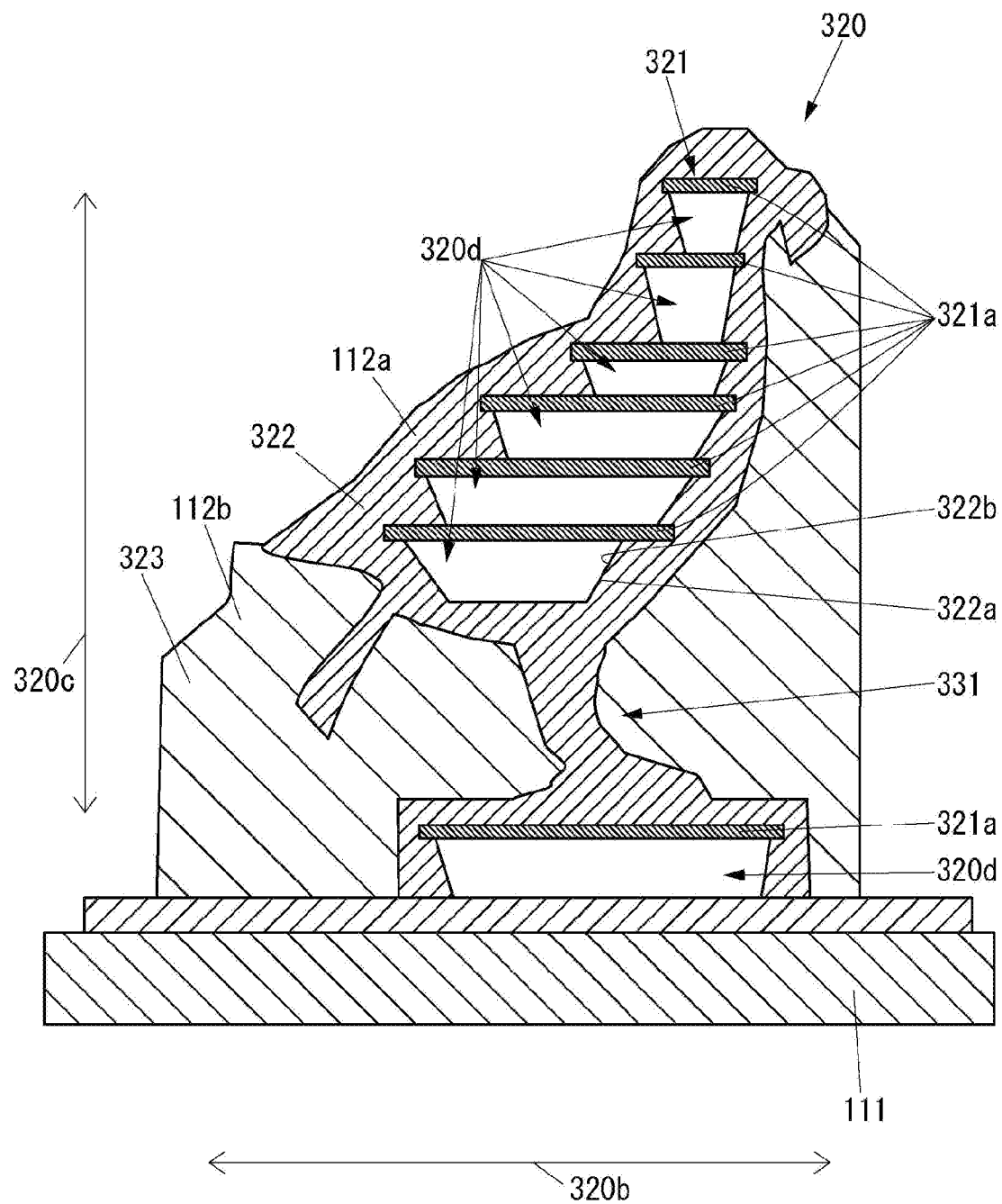
FIG. 16 is a side cross-sectional view of an example different from the examples shown in FIG. 9A and FIG. 9B, FIG. 11, FIG. 12, and FIG. 14, and shows a three-dimensional object in the middle of being manufactured by the shaping device shown in FIG. 7.

FIG. 16 is a side cross-sectional view of a three-dimensional object 320 in the middle of being manufactured by the shaping device 110.

The three-dimensional object 320 shown in FIG. 16 is a model of a large bird standing on a circular disc shaped table. In the three-dimensional object 320, a left and right direction (not shown), as well as a front and back direction indicated with an arrow 320*b* and an up and down direction indicated with an arrow 320*c* in FIG. 16 each correspond to the X direction, the Y direction, and the Z direction at a time point of being manufactured by the shaping device 110.

The three-dimensional object 320 includes an interior portion 321 and a peripheral portion 322.

The interior portion 321 is formed by a reinforcement material 321*a* other than the shaping material 112*a* ejected by the shaping head 112. Metal, resin, wood, and the like may be used for the reinforcement material 321*a*. The reinforcement material 321*a* has a larger rigidity compared to the shaping material 112*a* in the solid state. Furthermore, as the reinforcement material 321*a*, a material that has a high bending strength compared to the shaping material 112*a* in the solid state is preferably used. Moreover, as the reinforcement material 321*a*, a material having a high impact value in addition to the high bending strength compared to the shaping material 112*a* in the solid state is preferably used.

When formed by stacking a plurality of layers including at least one of the shaping material 112*a* and the support material 112*b* in the Z direction, the peripheral portion 322 is formed by the shaping material 112*a* of a plurality of layers.

When the peripheral portion 322 is formed, a support material portion 323 formed by the support material 112*b* is arranged to support the peripheral portion 322 from the lower side in the vertical direction, that is, the Z direction or from the horizontal direction. The support material portion 323 is formed by ejecting the liquid support material 112*b* with a head (not shown) similar to the shaping head 112, and then solidifying the ejected support material 112*b*, similarly to the peripheral portion 322. When formed by stacking a plurality of layers including at least one of the shaping material 112*a* and the support material 112*b* in the Z direction, the support material portion 323 is formed by the support material 112*b* of a plurality of layers. The support material 112*b* can be easily dissolved and removed by water and the like.

The reinforcement material 321*a* has a planar shape. The three-dimensional object 320 has a planar shaped reinforcement material 321*a* extending in the extending direction of the layer disposed in the middle of layering. The reinforcement material 321*a* is disposed in plural positions in the direction indicated with the arrow 320*c*. The three-dimensional object 320 has a space 320*d* in which the shaping material 112*a* does not exist formed at one part of an area on the lower side of the reinforcement material 321*a* in the vertical direction, that is, the Z direction in the periphery forming process, and thus the necessary amount of shaping material 112*a* can be greatly reduced, and the weight and the material cost can be reduced. Furthermore, the three-dimensional object 320 can suppress the occurrence of breakage and bend at a thin leg portion 331 by the weight of the portion above the leg because the weight is reduced.

The peripheral portion 322 includes a supporting part 322*a* that supports the reinforcement material 321*a* at the lower side of the reinforcement material 321*a* in the vertical direction, that is, the Z direction and configures one part of the boundary of the space 320*d* in the periphery forming process. A plane 322*b* of the supporting part 322*a* of the surface forming the space 320*d* is an inclined plane that does not overhang in the periphery forming process, and hence the layer of the shaping material 112*a* on the upper side in the vertical direction, that is, the Z direction is reliably formed above the layer of the shaping material 112*a* on the lower side. Therefore, the three-dimensional object 320 can restrain each layer from losing shape at the portion of the space 320*d*, and consequently can be formed with satisfactory precision.

Figure 17:
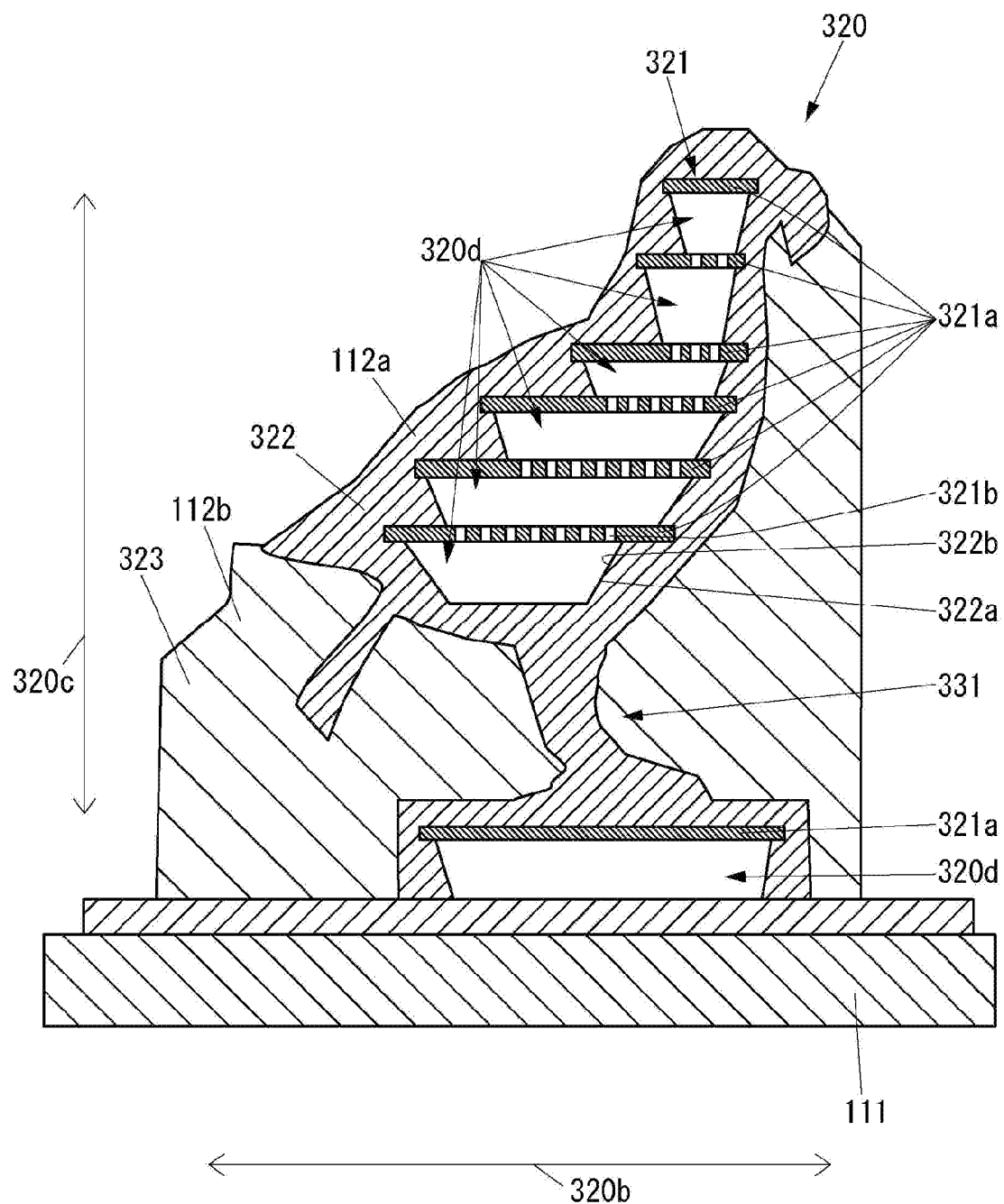
FIG. 17 is a side cross-sectional view of the three-dimensional object shown in FIG. 16 in a state where a hole is formed in the reinforcement material.

As shown in FIG. 17, the reinforcement material 321*a* may have a great number of holes 321*b* formed in at least one part of an area where the space 320*d* is formed on both sides in the direction orthogonal to the extending direction of the layer, that is, the direction indicated with the arrow 320*c*. When the hole 321*b* is formed in the reinforcement material 321*a* in the three-dimensional object 320, the necessary amount of reinforcement material 321*a* is greatly reduced and hence the weight and the material cost are reduced.

Figure 18:
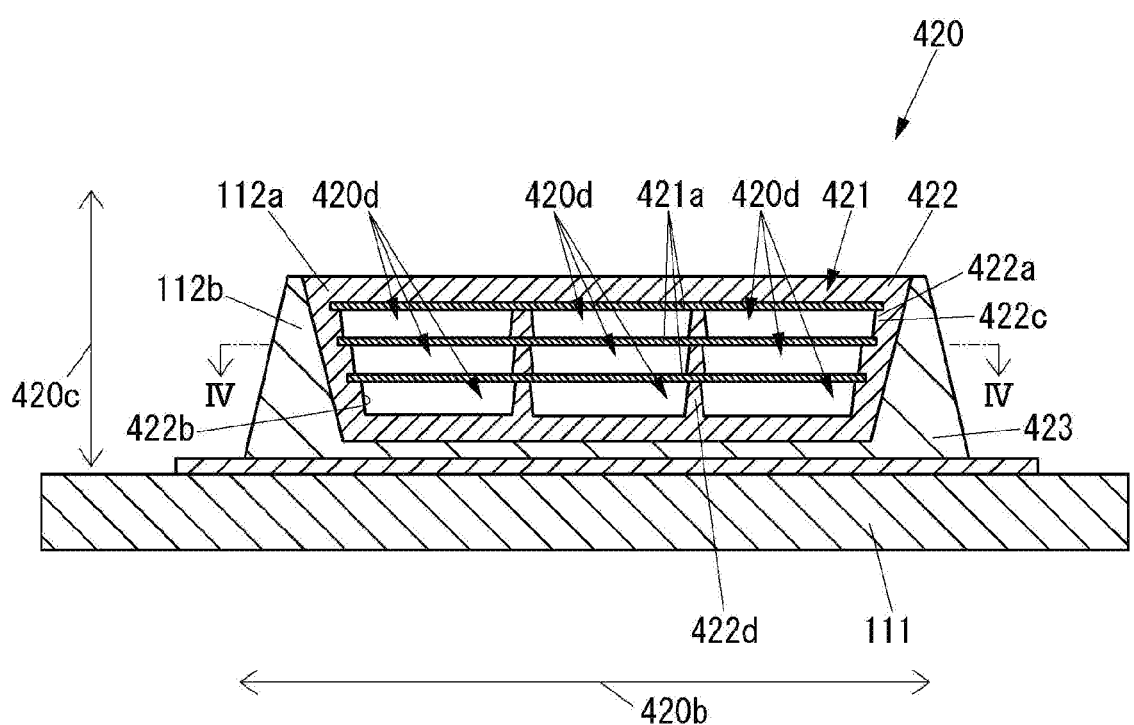
FIG. 18 is a side cross-sectional view of an example different from the examples shown in FIG. 9A and FIG. 9B, FIG. 11, FIG. 12, FIG. 14, and FIG. 16, and shows a three-dimensional object in the middle of being manufactured by the shaping device shown in FIG. 7.
Figure 19A:
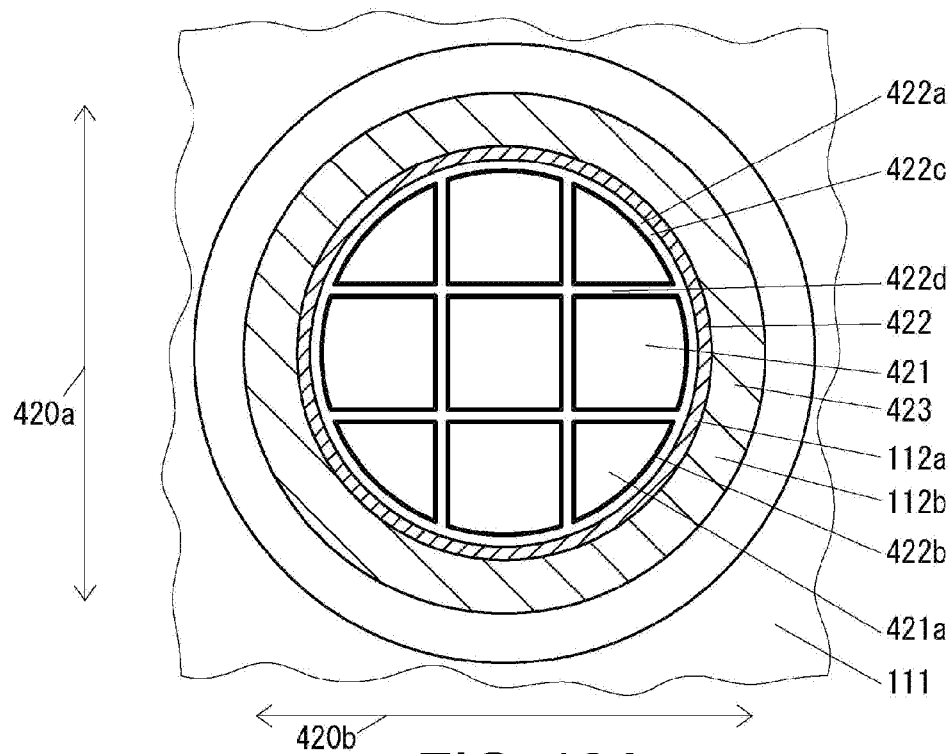
FIG. 19A is a cross-sectional view taken along IV-IV shown in FIG. 18.

FIG. 18 is a side cross-sectional view of a three-dimensional object 420 in the middle of being manufactured by the shaping device 110. FIG. 19A is a cross-sectional view taken along IV-IV shown in FIG. 18.

The three-dimensional object 420 shown in FIG. 18 and FIG. 19A is a circular truncated cone in which a diameter of an upper base is greater than a diameter of a lower base. In the three-dimensional object 420, a left and right direction indicated with an arrow 420*a* in FIG. 19A, a front and back direction indicated with an arrow 420*b* in FIG. 18 and FIG. 19A, and an up and down direction indicated with an arrow 420*c* in FIG. 18 each corresponds to the X direction, the Y direction, and the Z direction at a time point of being manufactured by the shaping device 110.

The three-dimensional object 420 includes an interior portion 421 and a peripheral portion 422.

The interior portion 421 is formed by a reinforcement material 421*a* other than the shaping material 112*a* ejected by the shaping head 112. Metal, resin, wood, and the like may be used for the reinforcement material 421*a*. The reinforcement material 421*a* has a larger rigidity compared to the shaping material 112*a* in the solid state. Furthermore, as the reinforcement material 421*a*, a material that has a high bending strength compared to the shaping material 112*a* in the solid state is preferably used. Moreover, as the reinforcement material 421*a*, a material having a high impact value in addition to the high bending strength compared to the shaping material 112*a* in the solid state is preferably used.

When formed by stacking a plurality of layers including at least one of the shaping material 112*a* and the support material 112*b* in the Z direction, the peripheral portion 422 is formed by the shaping material 112*a* of a plurality of layers.

When the peripheral portion 422 is formed, a support material portion 423 formed by the support material 112*b* is arranged to support the peripheral portion 422 from the lower side in the vertical direction, that is, the Z direction or from the horizontal direction. The support material portion 423 is formed by ejecting the liquid support material 112*b* with a head (not shown) similar to the shaping head 112, and then solidifying the ejected support material 112*b*, similarly to the peripheral portion 422. When formed by stacking a plurality of layers including at least one of the shaping material 112*a* and the support material 112*b* in the Z direction, the support material portion 423 is formed by the support material 112*b* of a plurality of layers. The support material 112*b* can be easily dissolved and removed by water and the like.

The reinforcement material 421*a* has a planar shape. The three-dimensional object 420 has a planar shaped reinforcement material 421*a* extending in the extending direction of the layer disposed in the middle of layering. The reinforcement material 421*a* is disposed in plural positions in the direction indicated with the arrow 420*c*. The three-dimensional object 420 has a space 420*d* in which the shaping material 112*a* does not exit formed at one part of an area on the lower side of the reinforcement material 421*a* in the vertical direction, that is, the Z direction in the periphery forming process, so that the necessary amount of shaping material 112*a* can be greatly reduced, and the weight and the material cost can be reduced.

The peripheral portion 422 includes a supporting part 422a that supports the reinforcement material 421a at the lower side of the reinforcement material 421a in the vertical direction, that is, the Z direction and configures one part of the boundary of the space 420d in the periphery forming process. A plane 422b of the supporting part 422a of the surface forming the space 420d is an inclined plane that does not overhang in the periphery forming process, and hence the layer of the shaping material 112a on the upper side in the vertical direction, that is, the Z direction is reliably formed above the layer of the shaping material 112a on the lower side. Therefore, the three-dimensional object 420 can restrain each layer from losing shape at the portion of the space 420d, and consequently can be formed with satisfactory precision.

Figure 19B:
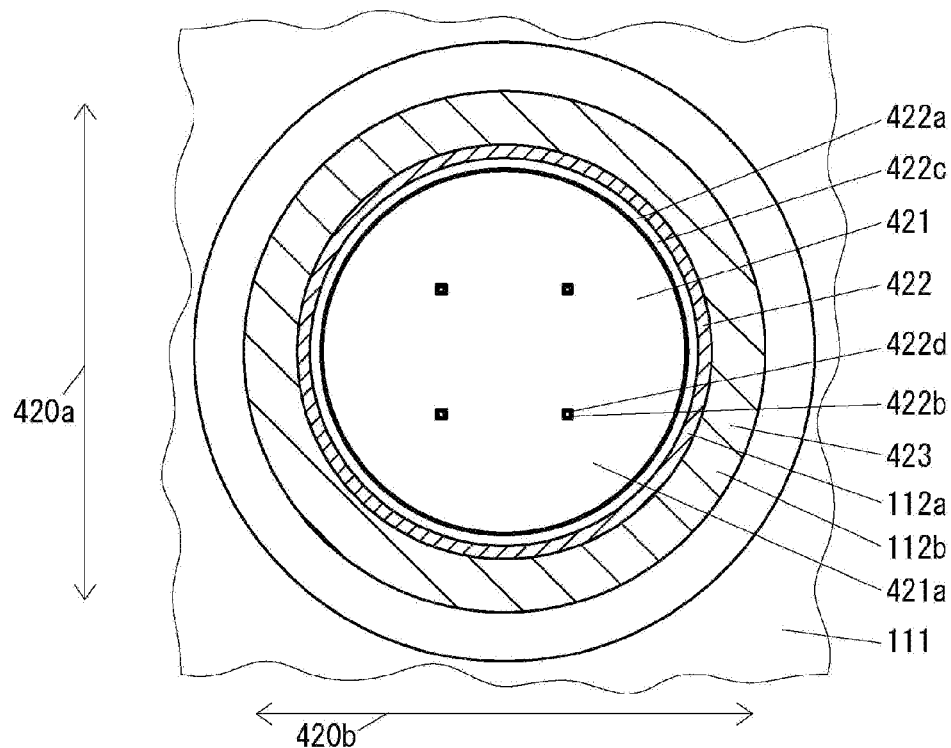
FIG. 19B is a view showing an alternative embodiment of the three-dimensional object shown in FIG. 19A.

The supporting part 422a includes an end supporting part 422c that supports the reinforcement material 421a at an end of the reinforcement material 421a in the extending direction of the layer, and a non-end supporting part 422d that supports the reinforcement material 421a at a portion other than the end of the reinforcement material 421a in the extending direction of the layer. The non-end supporting part 422d may be a wall that partitions the space 420d as shown in FIG. 19A, or may be a column that does not partition the space 420d as shown in FIG. 19B. The three-dimensional object 420 has the non-end supporting part 422d formed by the shaping material 112a in an area where the length in the extending direction of the layer is long in the reinforcement material 421a, and thus occurrence of deflection can be suppressed in the reinforcement material 421a and consequently, the three-dimensional object can be formed with satisfactory precision.

Figure 20:
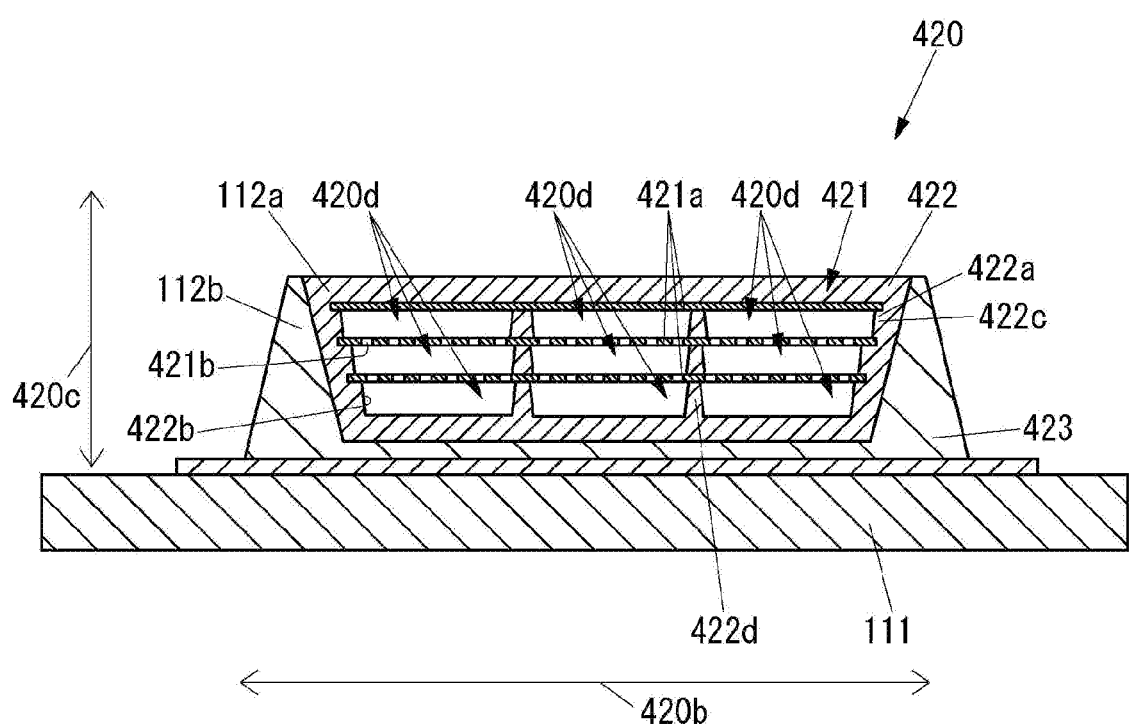
FIG. 20 is a side cross-sectional view of the three-dimensional object shown in FIG. 18 in a state where a hole is formed in the reinforcement material.

As shown in FIG. 20, the reinforcement material 421a may have a great number of holes 421b formed in at least one part of an area where the space 420d is formed on both sides in the direction orthogonal to the extending direction of the layer, that is, the direction indicated with the arrow 420c. When the hole 421b is formed in the reinforcement material 421a in the three-dimensional object 420, the necessary amount of reinforcement material 421a is greatly reduced and hence the weight and the material cost are reduced.

In the present embodiment, the peripheral portion is formed by the inkjet method. However, the peripheral portion may be formed by the shaping material 112a through methods other than the inkjet method. The peripheral portion may be formed by the shaping material 112a through the FDM method.

As described above, the three-dimensional object manufactured by the three-dimensional object manufacturing method according to the present embodiment can enhance the rigidity at the narrow portion by the reinforcement material as the reinforcement material for forming the interior portion has a larger rigidity compared to the shaping material in the solid state for forming the peripheral portion. Therefore, the three-dimensional object manufacturing method according to the present embodiment can manufacture the three-dimensional object capable of suppressing the occurrence of breakage and bend at the narrow portion.

Since the three-dimensional object has the reinforcement material interiorly disposed, degradation of the outer appearance by the reinforcement material can be suppressed as opposed to the configuration in which the reinforcement material is exteriorly disposed. Furthermore, since the reinforcement material is interiorly disposed, the three-dimensional object does not require a fixing structure for fixing the reinforcement material as opposed to the configuration in which the reinforcement material is exteriorly disposed.

The three-dimensional object can enhance convenience when the reinforcement material is also used for connection with another member other than reinforcement.

When correcting the shaping data based on the position of the reinforcement material with respect to the peripheral portion, the disposition work of the reinforcement material to the peripheral portion can be facilitated. Therefore, the manufacturing of the three-dimensional object can be facilitated.

As described above, the interior forming process in which the reinforcement material is disposed in the peripheral portion is executed before the peripheral portion of one part of the three-dimensional object is formed by the periphery forming process of forming the peripheral portion by the shaping material. Therefore, the reinforcement material can be easily fixed in the interior of the three-dimensional object compared to a method of inserting the reinforcement material to the peripheral portion after all the peripheral portions of the three-dimensional object are formed by the periphery forming process. However, the interior forming process of inserting the reinforcement material to the three-dimensional object may be executed after all the peripheral portions of the three-dimensional object are formed by the periphery forming process. As a hole communicating from the exterior to the interior of the peripheral portion is formed in the periphery forming process, the process in which the reinforcement material is inserted to the interior of the peripheral portion through the hole may be executed after all the peripheral portions of the three-dimensional object are formed by the periphery forming process. When the interior forming process of inserting the reinforcement material to the three-dimensional object is executed after all the peripheral portions of the three-dimensional object are formed by the periphery forming process, the manufacturing of the peripheral portion can be facilitated compared to a case in which the interior forming process in which the reinforcement material is disposed in the peripheral portion is executed before the peripheral portion of one part of the three-dimensional object is formed by the periphery thrilling process.

Third Embodiment

First, a configuration of a shaping device used in a three-dimensional object manufacturing method according to a third embodiment of the present invention will be described.

Figure 21:
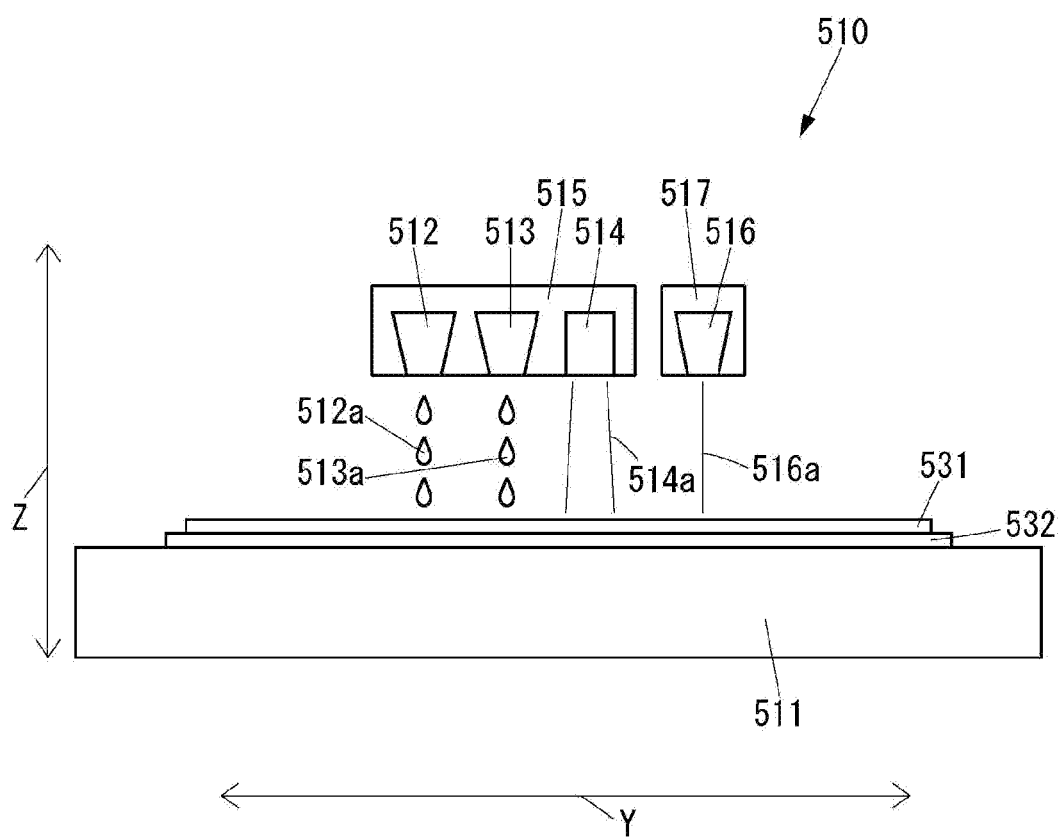
FIG. 21 is a schematic front view of a shaping device according to a third embodiment of the present invention.

FIG. 21 is a schematic front view of a shaping device 510 according to the present embodiment.

The structure shown in FIG. 21 is a basic structure of the shaping device according to the present embodiment.

As shown in FIG. 21, the shaping device 510 includes a supporting member 511 that supports a three-dimensional object when the three-dimensional object is manufactured.

The shaping device 510 includes a carriage 515 mounted with a shaping material head 512 of an inkjet method that ejects a liquid shaping material 512a toward the supporting member 511, a support material head 513 of an inkjet method that ejects a liquid support material 513a toward the supporting member 511, and an ultraviolet irradiating device 514 that irradiates the shaping material 512a ejected by the shaping material head 512 and the support material 513a ejected by the support material head 513 with an ultraviolet light 514a.

The shaping material 512a is an UV curable ink that solidifies when irradiated with the UV. The shaping material 512a is a shaping ink that becomes the material of the three-dimensional object. The shaping ink may include a color ink of CMYK (cyan, magenta, yellow, black) that forms a surface portion of the three-dimensional object and a white ink that forms the interior of the three-dimensional object for color development by the color ink. Furthermore, the shaping ink may include a transparent clear ink.

In FIG. 21, only one shaping material head 512 is shown. However, the shaping device 510 may actually include the shaping material head 512 for every type of shaping material 512a.

The support material 513a is an UV curable ink that solidifies when irradiated with UV. The support material 513a becomes the material of the support material portion that supports the three-dimensional object to form the three-dimensional object of an arbitrary shape by the shaping ink. The support material 513a may be a color ink of CMYK. The support material 513a is an ink that can be easily removed with a specific liquid such as water. In the shaping device 510, the support material portion is formed on the lower side in the vertical direction or in the horizontal direction with respect to the three-dimensional object. When the three-dimensional object includes an overhanging portion, the support material portion is formed on the lower side in the vertical direction with respect to the overhanging portion to support the overhanging portion.

In FIG. 21, only one support material head 513 is shown. However, the shaping device 510 may actually include the support material head 513 for every type of support material 513a.

The shaping device 510 includes a carriage 517 mounted with a laser cutter 516 that executes cutting by a laser light 516a. The laser light 516a may be a pulse laser or may be a CW (Continuous Wave) laser. To restrain the shaping material 512a and a porous sheet, to be described later, from reacting with ambient gas by the heat generated when the shaping material 512a and the porous sheet are irradiated with the laser light 516a and suppress occurrence of burn and oxidation from occurring in the shaping material 512a and the porous sheet, the cutting process by the laser cutter 516 is preferably executed in an inactive gas.

Figure 22A:
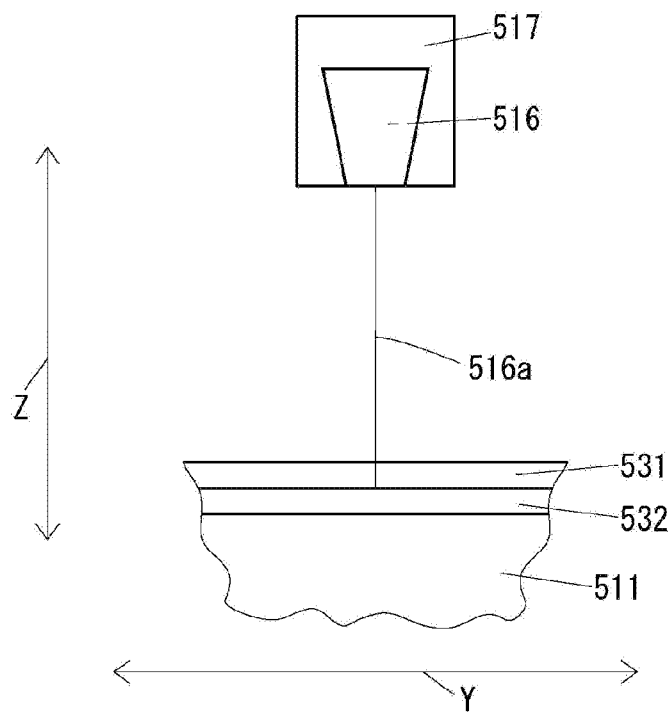
FIG. 22A is a schematic front view of one part of the shaping device shown in FIG. 21 when a laser light is emitted in the vertical direction.
Figure 22B:
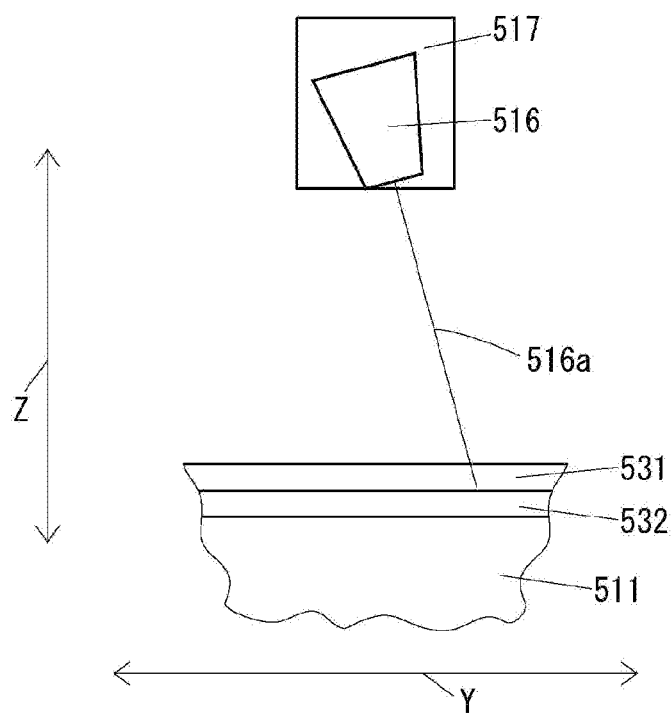
FIG. 22B is a schematic front view of one part of the shaping device shown in FIG. 21 when the laser light is emitted in a direction different from the vertical direction.

FIG. 22A is a schematic front view of one part of the shaping device 510 when the laser light 516a is emitted in the vertical direction. FIG. 22B is a schematic front view of one part of the shaping device 510 when the laser light 516a is emitted in a direction different from the vertical direction.

As shown in FIG. 22A and FIG. 22B, the laser cutter 516 is mounted on the carriage 517 to be able to change orientation, so that the laser light 516a can be emitted in an arbitrary direction in which a component in the vertical direction is directed downward, by changing the orientation. Since the emitting direction of the laser light 516a by the laser cutter 516, that is, the cutting direction by the laser light 516a can be changed, the surface of the three-dimensional object cut out by the laser light 516a becomes smooth.

In FIG. 21, the porous sheet 531 having a great number of holes formed therein is supported on the supporting member 511 by way of a separation sheet 532.

The porous sheet 531 is a sheet having a great number of holes formed therein so that the shaping material 512a and the support material 513a can be transmitted or permeated through the holes. A film including a braid woven with a plastic fiber or a metal wire, a sheet having holes formed by the braid such as a fabric can be adopted for the porous sheet 531. Furthermore, a sheet having holes formed not by the braid such as an etching film having a great number of holes formed by etching can be adopted for the porous sheet 531.

The separation sheet 532 is a member that enables the porous sheet 531 attached with the shaping material 512a to be easily stripped from the separation sheet 532 itself. Furthermore, the separation sheet 532 is a member that also enables the separation sheet 532 itself to be easily peeled from the supporting member 511.

In the three-dimensional object manufacturing method according to the present embodiment, the porous sheet 531 may be directly supported by the supporting member 511 without using the separation sheet 532.

Figure 23:
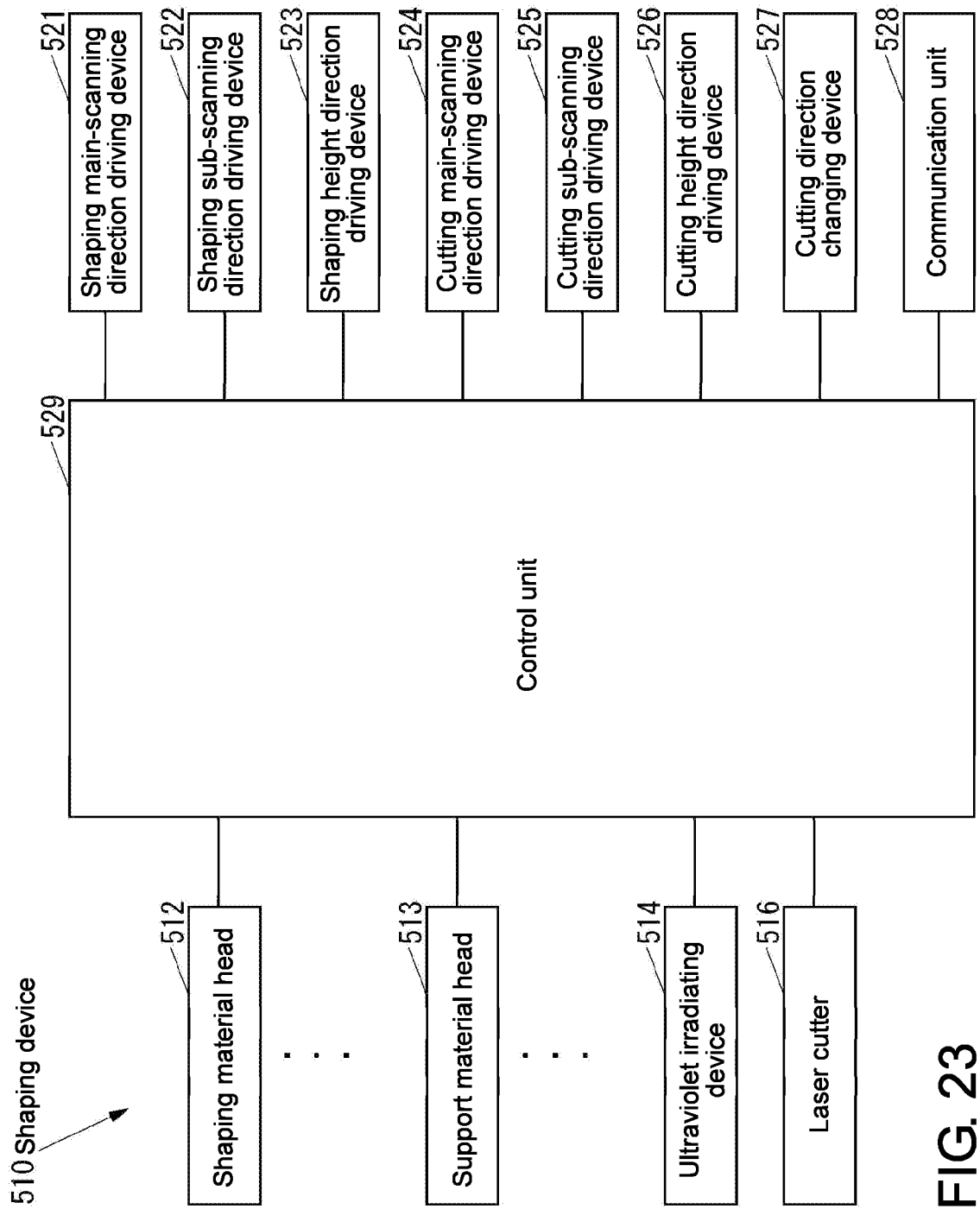
FIG. 23 is a block diagram of the shaping device shown in FIG. 21.

FIG. 23 is a block diagram of the shaping device 510.

As shown in FIG. 21 and FIG. 23, the shaping device 510 includes a shaping main-scanning direction driving device 521 that relatively drives one of the supporting member 511 and the carriage 515 with respect to the other in an ejecting direction of the shaping material 512a by the shaping material head 512 and a Y direction orthogonal to a Z direction serving as the ejecting direction of the support material 513a by the support material head 513. The Z direction is a vertical direction.

The shaping device 510 includes a shaping sub-scanning direction driving device 522 that relatively drives one of the supporting member 511 and the carriage 515 with respect to the other in an X direction (not shown) orthogonal to both the Y direction and the Z direction.

The shaping device 510 includes a shaping height direction driving device 523 that relatively drives one of the supporting member 511 and the carriage 515 with respect to the other in the Z direction.

The shaping device 510 includes a cutting main-scanning direction driving device 524 that relatively drives one of the supporting member 511 and the carriage 517 with respect to the other in the Y direction.

The shaping device 510 includes a cutting sub-scanning direction driving device 525 that relatively drives one of the supporting member 511 and the carriage 517 with respect to the other in the X direction.

The shaping device 510 includes a cutting height direction driving device 526 that relatively drives one of the supporting member 511 and the carriage 517 with respect to the other in the Z direction.

The shaping device 510 includes a cutting direction changing device 527 that changes the orientation of the laser cutter 516 with respect to the carriage 517 to change the emitting direction of the laser light 516a by the laser cutter 516 to an arbitrary direction in which the component in the vertical direction is directed downward.

The shaping device 510 includes a communication unit 528, which is a communication device that carries out communication with an external device via a network (not shown), and a control unit 529 that controls the entire shaping device 510.

The control unit 529 includes a CPU, a ROM that stores programs and various types of data in advance, and a RAM used as a work region of the CPU. The CPU executes the program stored in the ROM.

Next, a three-dimensional object manufacturing method using the shaping device 510 will be described.

When the shaping data is input through the communication unit 528, the control unit 529 of the shaping device 510 controls the shaping material head 512, the support material head 513, the ultraviolet irradiating device 514, the laser cutter 516, the shaping main-scanning direction driving device 521, the shaping sub-scanning direction driving device 522, the shaping height direction driving device 523, the cutting main-scanning direction driving device 524, the cutting sub-scanning direction driving device 525, the cutting height direction driving device 526, and the cutting direction changing device 527 based on the input shaping data to manufacture a three-dimensional object.

Description will be specifically made below.

After ejecting the liquid shaping material 512a toward the porous sheet 531 by the shaping material head 512 based on the shaping data, the control unit 529 irradiates the shaping material 512a attached to the porous sheet 531 with the ultraviolet light by the ultraviolet irradiating device 514 to cure and solidify the shaping material 512a. Similarly, when forming the support material portion based on the shaping data, the control unit 529 ejects the liquid support material 513a toward the porous sheet 531 by the support material head 513, and thereafter, irradiates the support material 513a attached to the porous sheet 531 with the ultraviolet light by the ultraviolet irradiating device 514 to cure and solidify the support material 513a. The control unit 529 solidifies the shaping material 512a and the support material 513a attached to the porous sheet 531, as described above, while controlling the shaping main-scanning direction driving device 521 and the shaping sub-scanning direction driving device 522 based on the shaping data to form the shaping material portion formed with the shaping material 512a and the support material portion formed with the support material 513a on one porous sheet 531.

Figure 24:
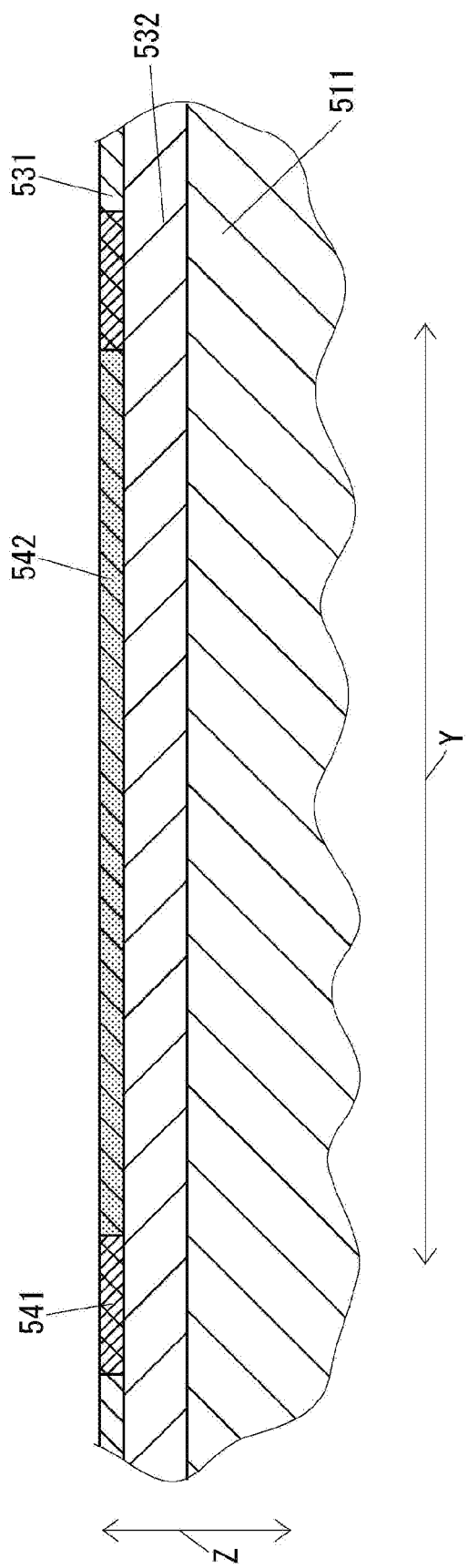
FIG. 24 is a schematic front cross-sectional view of one part of the shaping device shown in FIG. 21 in a state where a shaping material portion and a support material portion are formed on one porous sheet.

FIG. 24 is a schematic front cross-sectional view of one part of the shaping device 510 in a state where the shaping material portion 541 and the support material portion 542 are formed on one porous sheet 531.

As described above, the control unit 529 controls the shaping material head 512, the support material head 513, the ultraviolet irradiating device 514, the shaping main-scanning direction driving device 521, and the shaping sub-scanning direction driving device 522 based on the shaping data to form the shaping material portion 541 and the support material portion 542 on one porous sheet 531, as shown in FIG. 24.

After forming the shaping material portion 541 and the support material portion 542 on one porous sheet 531, the control unit 529 irradiates the porous sheet 531 with the laser light 516a by the laser cutter 516 while controlling the cutting main-scanning direction driving device 524, the cutting sub-scanning direction driving device 525, and the cutting direction changing device 527 based on the shaping data so that the porous sheet 531 is cut to bring one part of the three-dimensional object in the porous sheet 531 and the portions other than the three-dimensional object into a separable state.

Figure 25:
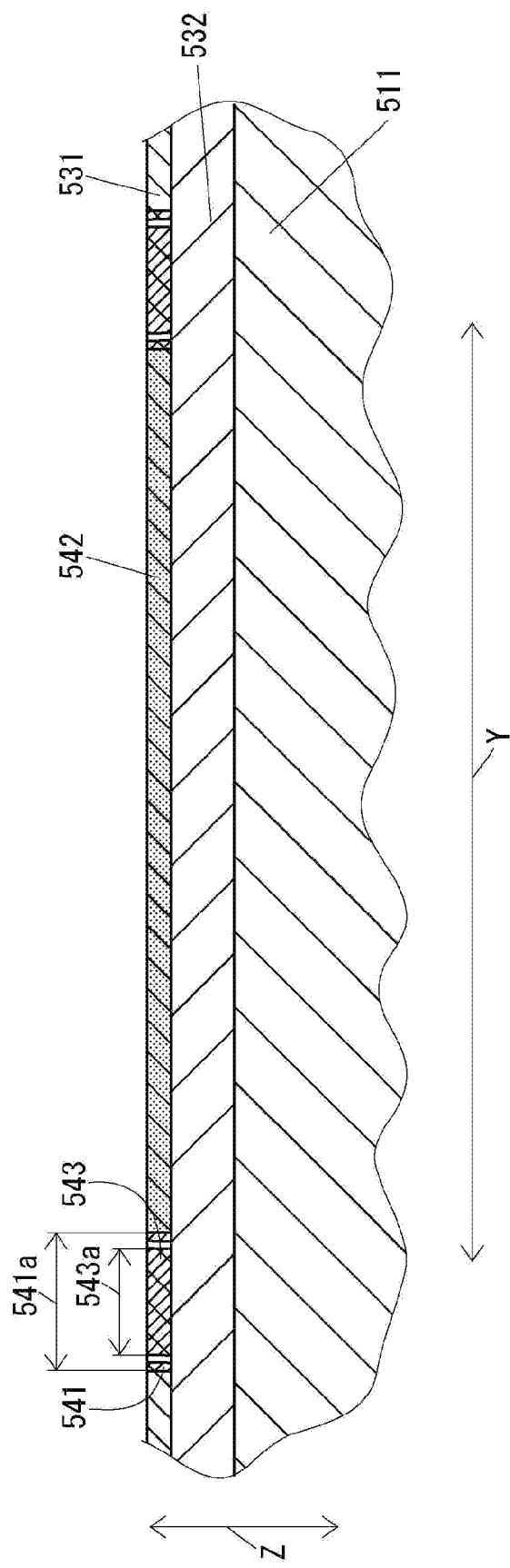
FIG. 25 is a schematic front cross-sectional view of one part of the shaping device shown in FIG. 21 in which one part of the three-dimensional object in one porous sheet and the portions other than the three-dimensional object are in a separable state.

FIG. 25 is a schematic front cross-sectional view of one part of the shaping device 510 in which one part 543 of the three-dimensional object in one porous sheet 531 and the portions other than the three-dimensional object are in a separable state.

As described above, the control unit 529 controls the laser cutter 516, the cutting main-scanning direction driving device 524, the cutting sub-scanning direction driving device 525, and the cutting direction changing device 527 to bring one part 543 of the three-dimensional object in one porous sheet 531 and the portions other than the three-dimensional object into a separable state, as shown in FIG. 25.

As the positional precision of cutting by the laser cutter 516 is higher than the positional precision of printing by the shaping material head 512, the shaping material portion 541 is preferably formed so that a width 541a of the shaping material portion 541 is wider than a width 543a of one part 543 of the three-dimensional object cut by the laser cutter 516 and includes the one part 543 of the three-dimensional object, as shown in FIG. 25, to reliably define the width 543a of one part 543 of the three-dimensional object through cutting by the laser cutter 516 without being defined through printing by the shaping material head 512. However, the width 541a may be the same as the width 543a.

After bringing one part 543 of the three-dimensional object in one porous sheet 531 and the portions other than the three-dimensional object into the separable state, the control unit 529 controls the shaping height direction driving device 523 and the cutting height direction driving device 526 based on the shaping data to increase the distance in the vertical direction of the supporting member 511 and the carriage 515 and the carriage 517 by a distance worth the thickness of one porous sheet 531. Thereafter, a new porous sheet 531 is overlapped on the upper side in the vertical direction of the porous sheet 531 in which one part 543 of the three-dimensional object and the portions other than the three-dimensional object are in the separable state.

When changing the distance in the vertical direction of the supporting member 511, and the carriage 515 and the carriage 517 by moving the supporting member 511 in the vertical direction, the shaping height direction driving device 523 and the cutting height direction driving device 526 may be the same device.

Figure 26:
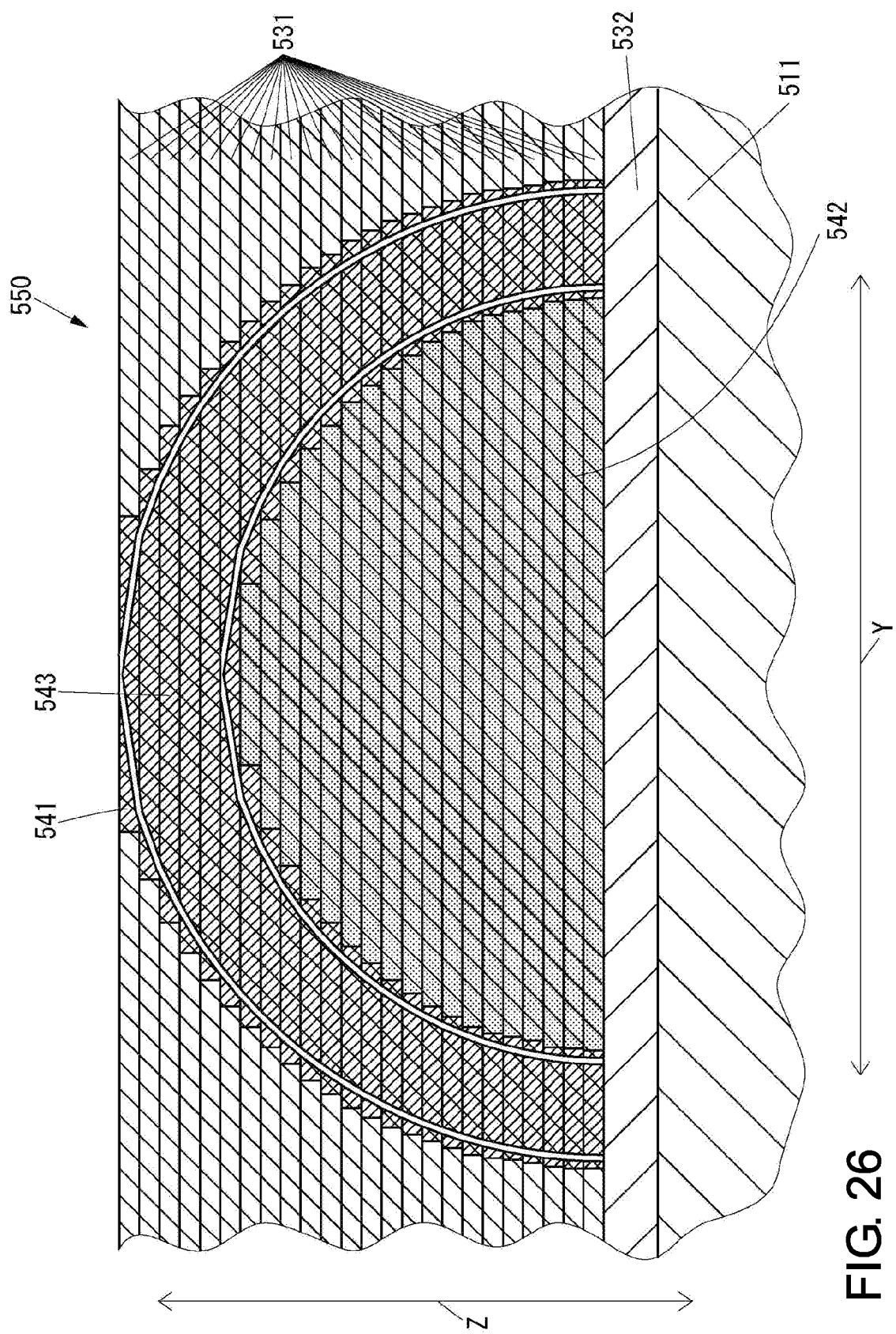
FIG. 26 is a schematic front cross-sectional view of one part of the shaping device shown in FIG. 21 in a state where the three-dimensional object is manufactured.
Figure 27:
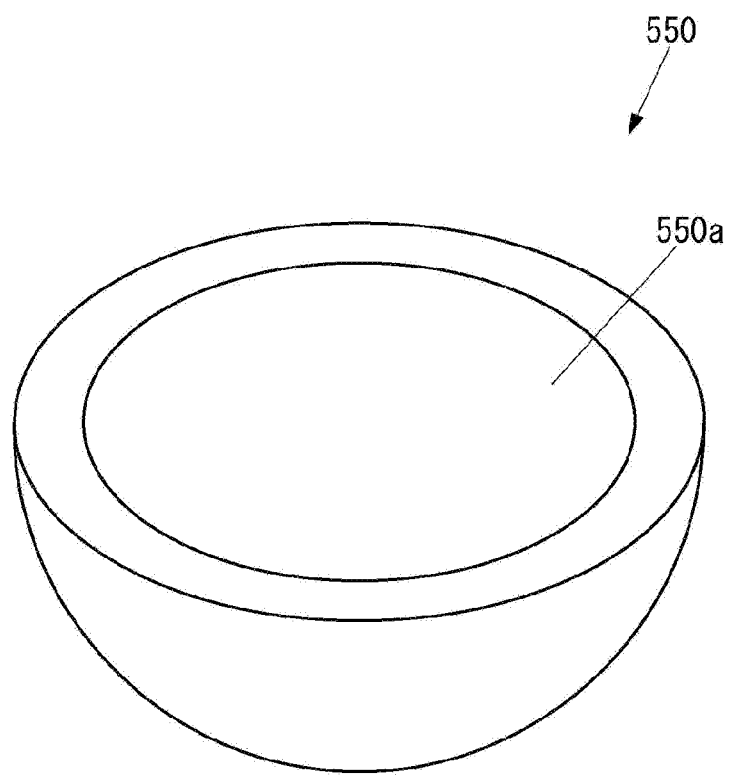
FIG. 27 is a perspective view of an outer appearance of the three-dimensional object shown in FIG. 26.

FIG. 26 is a schematic front cross-sectional view of one part of the shaping device 510 in a state where a three-dimensional object 550 is manufactured. FIG. 27 is a perspective view of an outer appearance of the three-dimensional object 550 shown in FIG. 26.

The control unit 529 repeats the above operations to manufacture the three-dimensional object 550, as shown in FIG. 26. In other words, the three-dimensional object 550 has a layer formed for every thickness of one porous sheet 531 so as to be configured by overlapping a plurality of layers. The three-dimensional object 550 is in a state where one part 543 of the three-dimensional object and the portions other than the three-dimensional object are separable in each porous sheet 531. Therefore, the worker can take out the three-dimensional object 550, as shown in FIG. 27. The three-dimensional object 550 shown in FIG. 27 is a semi-spherical three-dimensional object having a semispherical groove 550a formed thereon.

The amount of shaping material 512a attached to the porous sheet 531 merely needs to be an amount for causing the porous sheet 531 and a porous sheet 531 immediately below the relevant porous sheet 531 to adhere by the shaping material 512a, and may not be an amount uniformly impregnating to the entire region of the shaping material portion 541 of the porous sheet 531.

When a cut is formed in the porous sheet 531 by the laser cutter 516, if another porous sheet 531 is overlapped on the relevant porous sheet 531, and the shaping material 512a is attached to the porous sheet 531 of the upper layer at a position corresponding to the position of the cut of the porous sheet 531 of the lower layer of the positions in the horizontal direction, the shaping material 512a attached to the porous sheet 531 of the upper layer may possibly enter the cut of the porous sheet 531 of the lower layer. When the shaping material 512a that has entered the cut is cured by the ultraviolet light, the three-dimensional object 550 may not be taken out. Therefore, when a cut is formed in the porous sheet 531 by the laser cutter 516, the control unit 529 attaches the shaping material 512a at a position corresponding to the position of the cut of the positions in the horizontal direction on the porous sheet 531 of the upper layer of the porous sheet 531 after burying the cut with the support material 513a, thus preventing the shaping material 512a from entering the cut from the porous sheet 531 of the upper layer, and reducing the possibility of the three-dimensional object 550 not being able to be taken out.

Figure 28A:
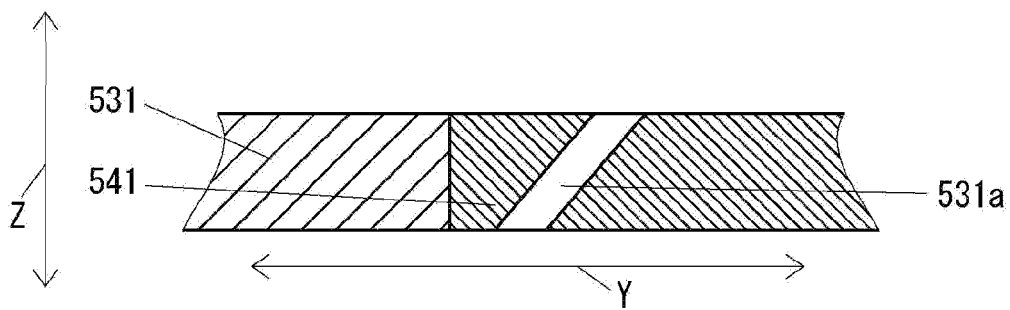
FIG. 28A is a schematic cross-sectional view of the porous sheet shown in FIG. 21 having a cut formed by a laser cutter.
Figure 28B:
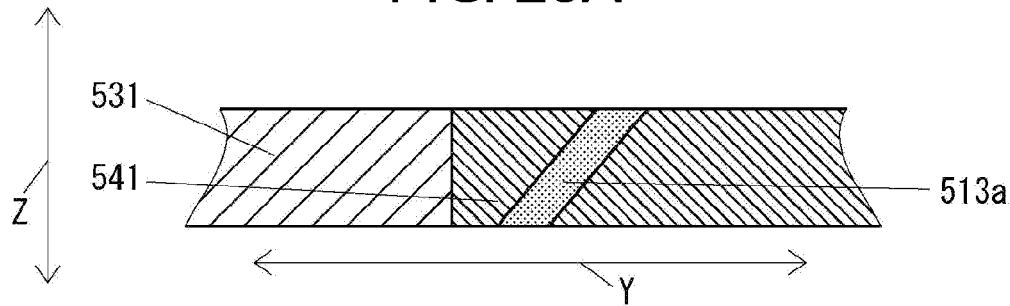
FIG. 28B is a schematic cross-sectional view of the porous sheet performed with a subsequent process in the state shown in FIG. 28A.
Figure 28C:
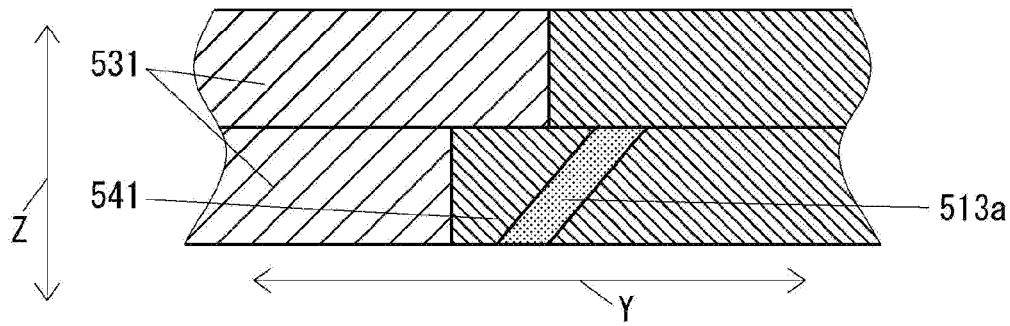
FIG. 28C is a schematic cross-sectional view of the porous sheet performed with the subsequent process in the state shown in FIG. 28B.
Figure 28D:
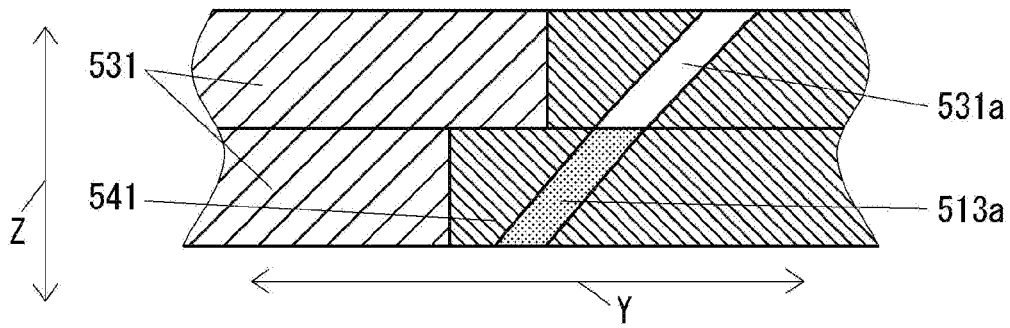
FIG. 28D is a schematic cross-sectional view of the porous sheet performed with the subsequent process in the state shown in FIG. 28C.

FIG. 28A is a schematic cross-sectional view of the porous sheet 531 having the cut 531a formed by the laser cutter 516. FIG. 28B is a schematic cross-sectional view of the porous sheet 531 subjected to a subsequent process in the state shown in FIG. 28A. FIG. 28C is a schematic cross-sectional view of the porous sheet 531 subjected to the subsequent process in the state shown in FIG. 28B. FIG. 28D is a schematic cross-sectional view of the porous sheet 531 subjected to the subsequent process in the state shown in FIG. 28C.

When the cut 531a is formed in the porous sheet 531 by the laser cutter 516 as shown in FIG. 28A, the control unit 529 buries the cut 531a of the porous sheet 531 having the cut 531a formed thereon with the support material 513a as shown in FIG. 28B and cures the support material 513a with the ultraviolet light 514a in overlapping another porous sheet 531 on the relevant porous sheet 531 and further attaching the shaping material 512a. Next, the control unit 529 overlaps another porous sheet 531 on the porous sheet 531 in which the cut 531a is buried by the support material 513a and attaches the shaping material 512a as shown in FIG. 28C to obtain the shaping material portion 541. The control unit 529 then forms a cut 531a, as shown in FIG. 28D, in the porous sheet 531 having the shaping material portion 541 formed by the laser cutter 516. The support material 513a buried and cured in the cut 531a can be easily removed with water, and the like.

Figure 29:
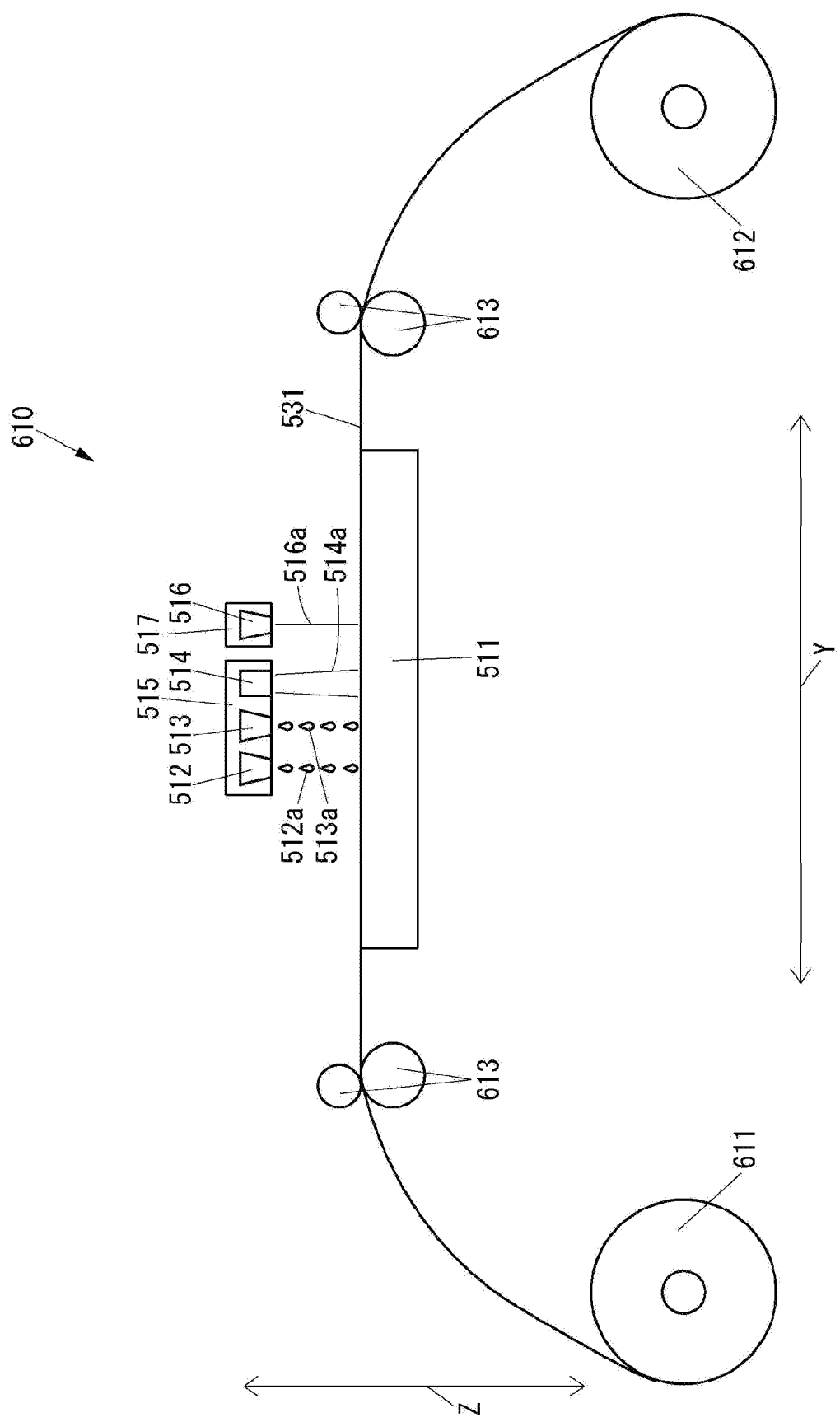
FIG. 29 is a schematic front view showing one example of e shaping device shown in FIG. 21.

FIG. 29 is a schematic front view showing a shaping device 610 serving as an example of the shaping device 510. The shaping device 510 shown in FIG. 21 can be realized as the shaping device 610 shown in FIG. 29.

As shown in FIG. 29, the shaping device 610 includes a feed roller 611 around which the porous sheet 531 is wound to feed the porous sheet 531, a take-up roller 612 around which the porous sheet 531 is wound to take up the porous sheet 531, and a plurality of rollers 613 for extending the porous sheet 531 fed by the feed roller 611 and taken up by the take-up roller 612 in a direction orthogonal to the Z direction.

The center shafts of the feed roller 611, the take-up roller 612, and the rollers 613 are extended in the X direction. The feed roller 611, the take-up roller 612, and the rollers 613 are rotatably supported about the respective center shafts.

Figure 30:
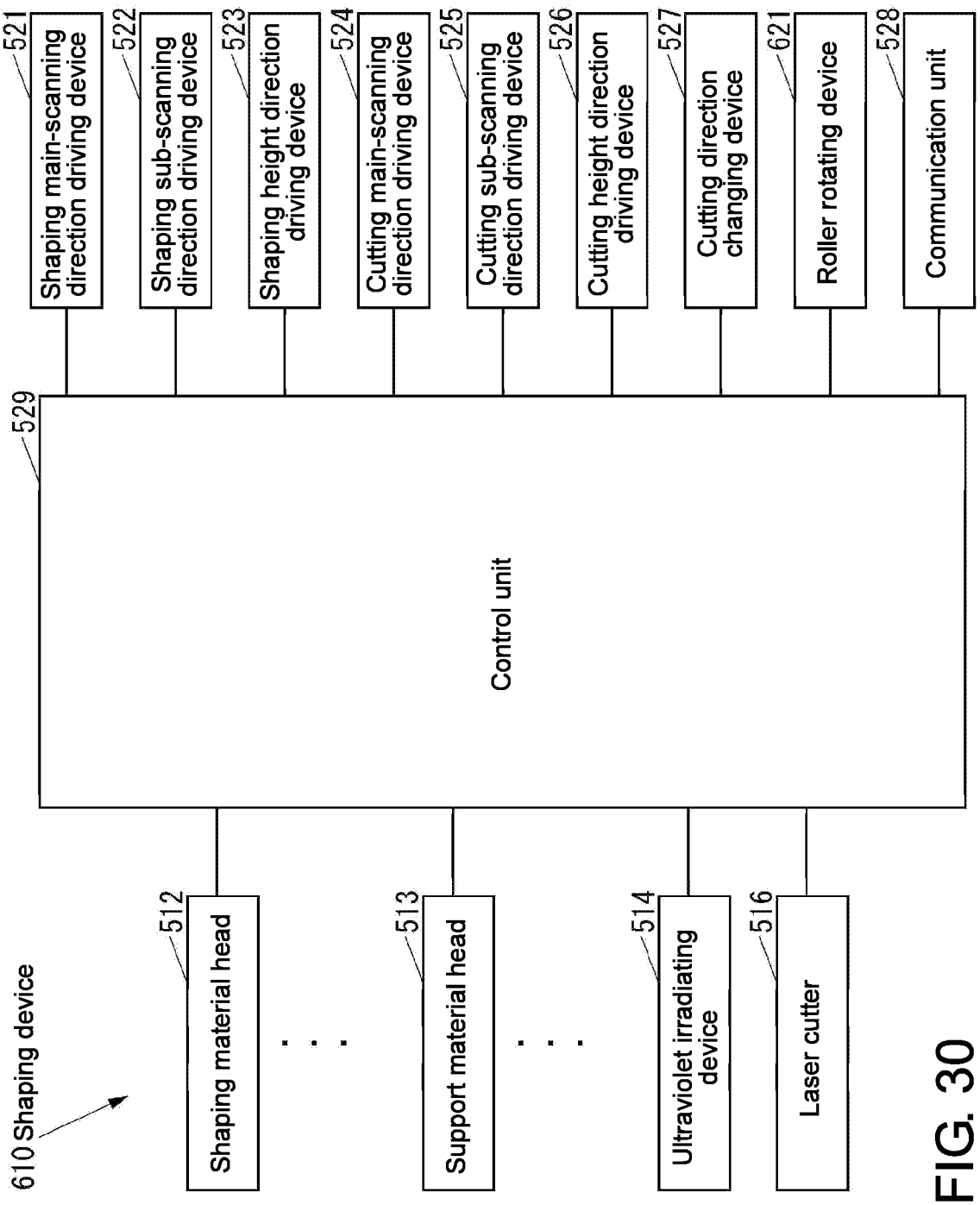
FIG. 30 is a block diagram of the shaping device shown in FIG. 29.

FIG. 30 is a block diagram of the shaping device 610.

As shown in FIG. 30, the configuration of the control system of the shaping device 610 is similar to the configuration shown in FIG. 23 other than that a roller rotating device 621 that controls the rotations of the feed roller 611 and the take-up roller 612 is provided. The roller rotating device 621 relatively moves the porous sheet 531 with respect to the supporting member 511, and configures a moving means of the present invention.

However, in the shaping device 610, the shaping main-scanning direction driving device 521 drives only the carriage 515 of the supporting member 511 and the carriage 515 in the Y direction. The shaping sub-scanning direction driving device 522 drives only the carriage 515 of the supporting member 511 and the carriage 515 in the X direction. The cutting main-scanning direction driving device 524 drives only the carriage 517 of the supporting member 511 and the carriage 517 in the Y direction. The cutting sub-scanning direction driving device 525 drives only the carriage 517 of the supporting member 511 and the carriage 517 in the X direction. The shaping height direction driving device 523 and the cutting height direction driving device 526 are the same device, and drive only the supporting member 511 of the supporting member 511, and the carriage 515 and the carriage 517 in the Z direction.

Next, a three-dimensional object manufacturing method using the shaping device 610 will be described.

Figure 31:
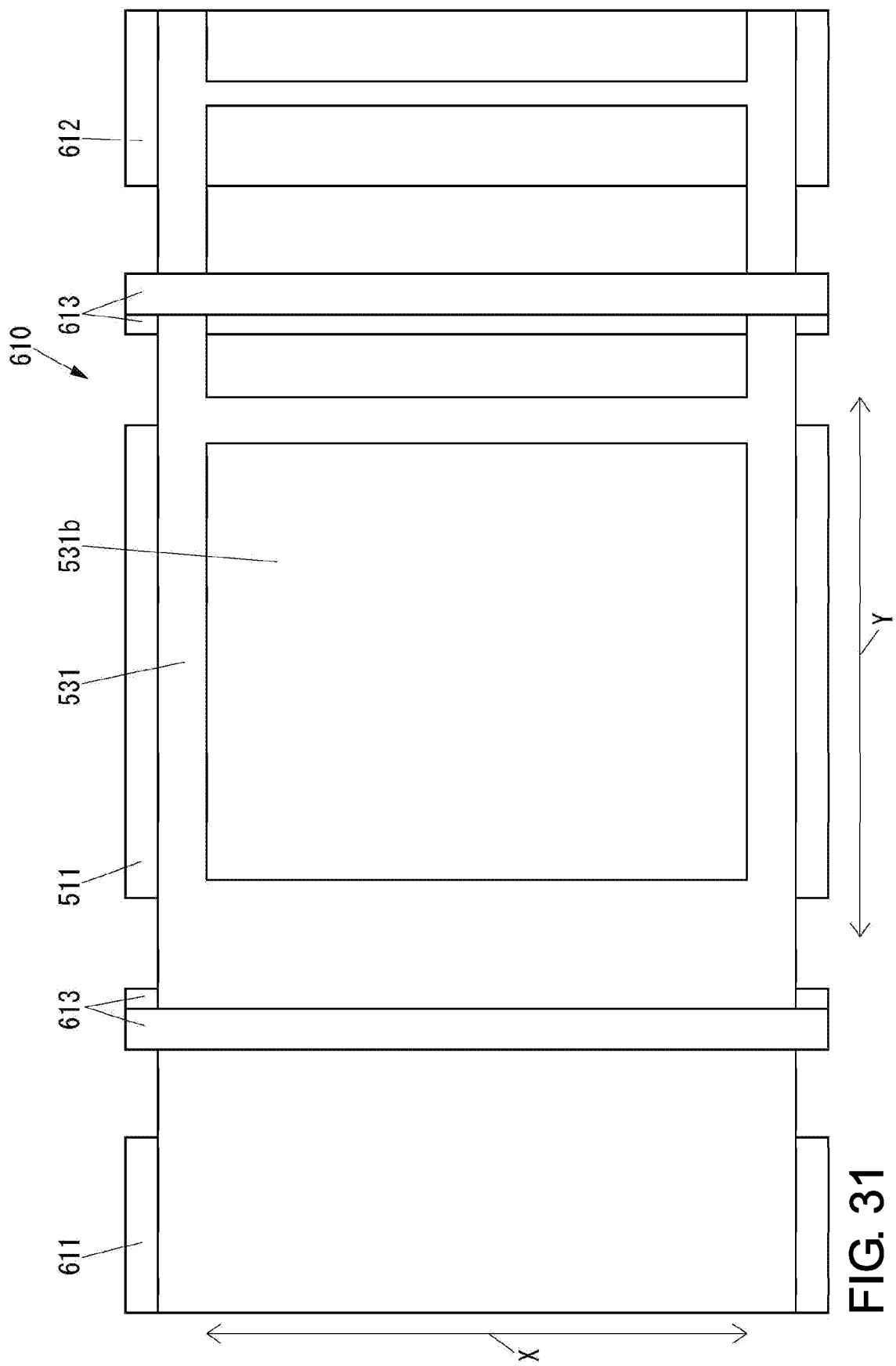
FIG. 31 is a schematic plan view showing one part of the shaping device shown in FIG. 29.

FIG. 31 is a schematic plan view of one part of the shaping device 610.

When bringing one part 543 of the three-dimensional object in the porous sheet 531 and the portions other than the three-dimensional object into a separable state after forming the shaping material portion 541 and the support material portion 542 in the porous sheet 531, as described above, the control unit 529 of the shaping device 610 cuts out a portion 531b of a specific range from the porous sheet 531, as shown in FIG. 31.

Then, the control unit 529 controls the cutting height direction driving device 526, which is the shaping height direction driving device 523, based on the shaping data to move the supporting member 511 toward the lower side in the vertical direction by a distance of the thickness of one porous sheet 531.

Next, the control unit 529 operates the roller rotating device 621 to take up the porous sheet 531 with the take-up roller 612 by a distance longer than the length of the portion 531b in the Y direction. The porous sheet 531 is fed from the feed roller 611 by the amount taken up by the take-up roller 612. After the taking up of the porous sheet by the take-up roller 612 is finished, the control unit 529 biases the feed roller 611 by the roller rotating device 621 in a direction opposite to the rotating direction at the time of feeding the porous sheet 531, and biases the take-up roller 612 by the roller rotating device 621 in a rotating direction at the time of taking up the porous sheet 531 to apply tension in the Y direction on the porous sheet 531 whose position in the horizontal direction is overlapped with respect to the supporting member 511 and whose position in the vertical direction is on the uppermost side of the porous sheets 531 fed by the feed roller 611 and taken up by the take-up roller 612.

Figure 32:
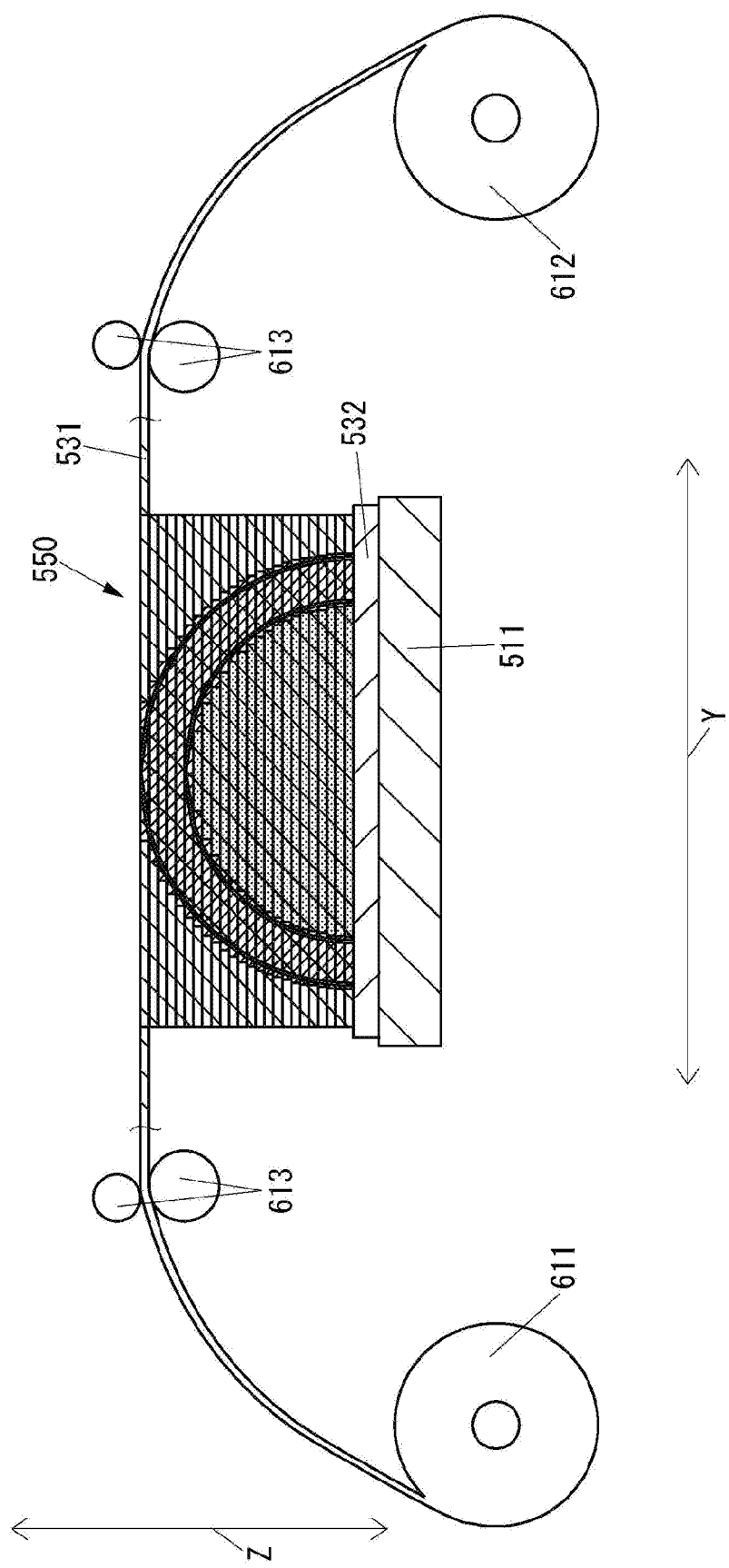
FIG. 32 is a schematic front cross-sectional view of one part of the shaping device shown in FIG. 29.

FIG. 32 is a schematic front cross-sectional view of one part of the shaping device 610.

The control unit 529 repeats the above operations to manufacture the three-dimensional object 550 as shown in FIG. 32. The three-dimensional object 550 shown in FIG. 32 has a layer formed for every thickness of one porous sheet 531 so as to be configured by overlapping a plurality of layers.

In the shaping device 610, the porous sheet 531 was transported in the Y direction in the description made above, but may be transported in the X direction. In other words, the shaping device 610 may have the center shafts of the feed roller 611, the take-up roller 612, and the rollers 613 extending in the Y direction.

The shaping device 610 cuts out one part, that is, the portion 531b from the porous sheet 531 by the laser cutter 516, and then relatively moves the porous sheet 531 with respect to the supporting member 511 by the roller rotating device 621 to layer a porous sheet 531 on a side opposite to the supporting member 511 side with respect to the portion 531b cut out by the laser cutter 516 and supported by the supporting member 511 in the porous sheet 531. According to such configuration, the shaping device 610 facilitates the layering of the plurality of porous sheets 531 on the supporting member 511, and thus can facilitate the manufacturing of the three-dimensional object 550.

Figure 33:
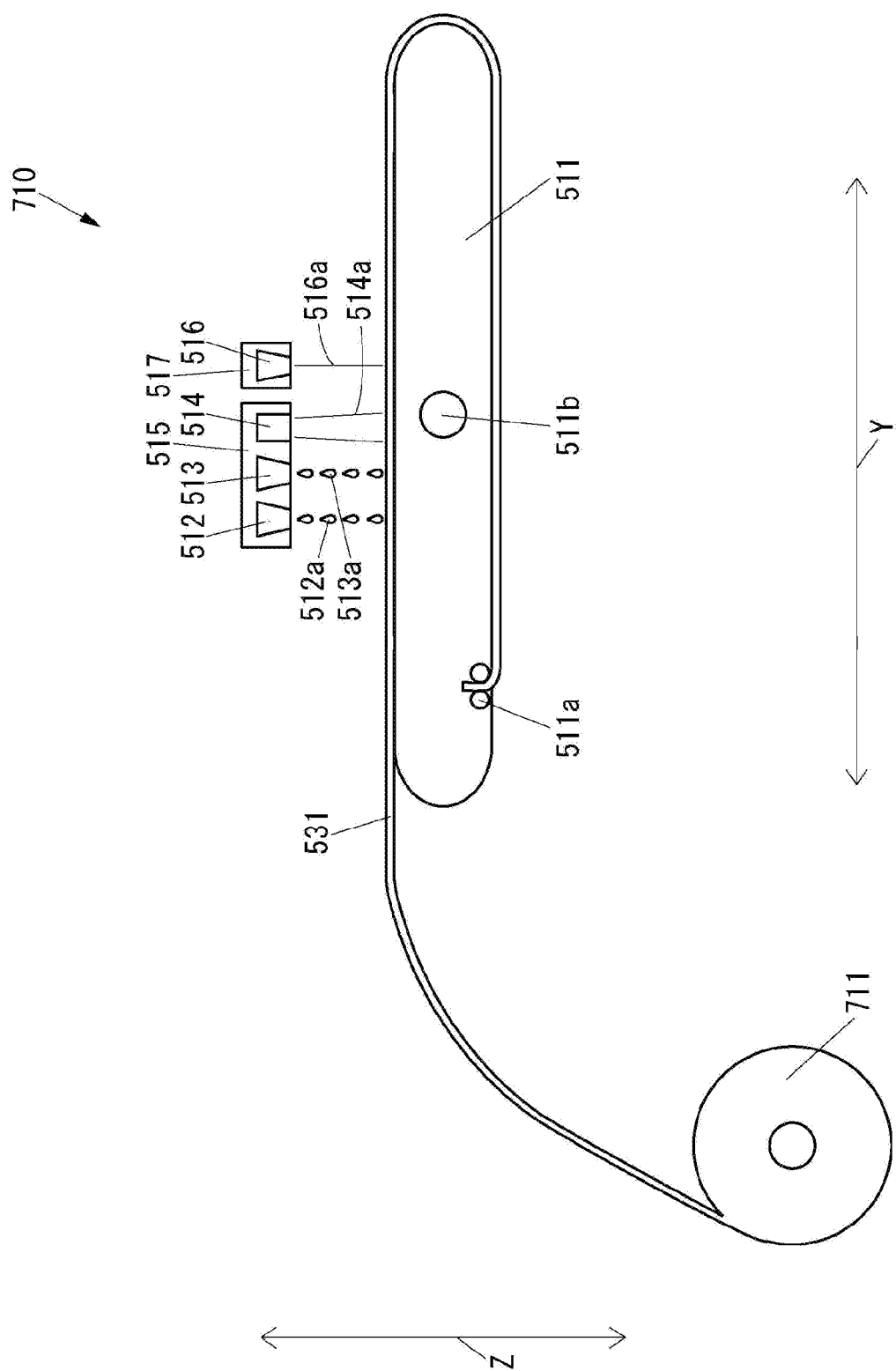
FIG. 33 is a schematic front view showing an example different from the example shown in FIG. 29, and shows one example of the shaping device shown in FIG. 21.

FIG. 33 is a schematic front view showing a shaping device 710 serving as an example of the shaping device 510.

The shaping device 510 shown in FIG. 21 can be realized as the shaping device 710 shown in FIG. 33.

As shown in FIG. 33, the shaping device 710 includes a feed roller 711 around which the porous sheet 531 is wound to feed the porous sheet 531. The center shaft of the feed roller 711 is extended in the X direction. The feed roller 711 is rotatably supported about the center shaft.

The supporting member 511 of the shaping device 710 includes a sheet fixing portion 511*a* to which the porous sheet 531 is fixed. A center shaft 511*b* of the supporting member 511 of the shaping device 710 is extended in the X direction. The supporting member 511 of the shaping device 710 is rotatably supported about the center shaft 511*b*.

Figure 34:
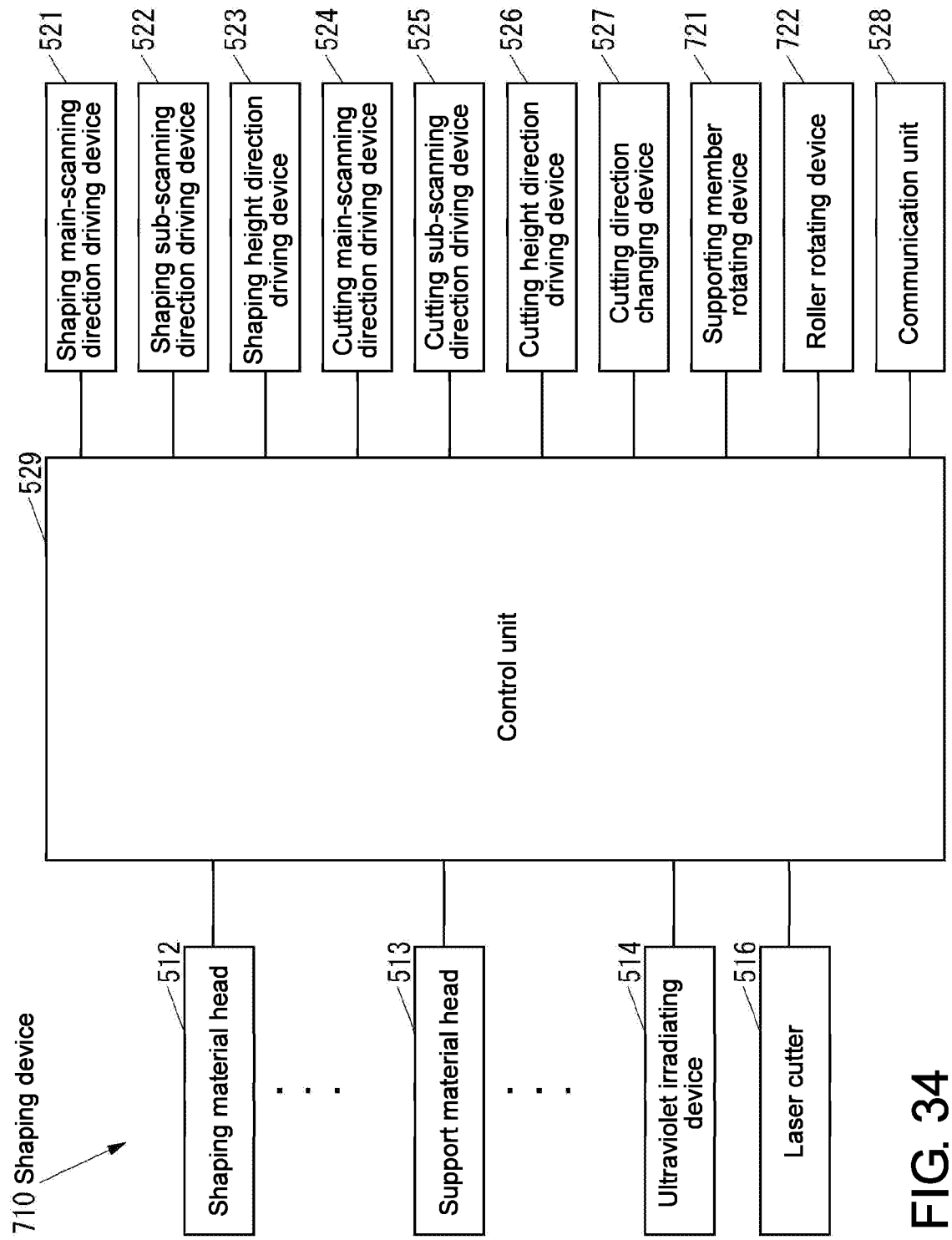
FIG. 34 is a block diagram of the shaping device shown in FIG. 33.

FIG. 34 is a block diagram of the shaping device 710.

As shown in FIG. 34, the configuration of the control system of the shaping device 710 is similar to the configuration shown in FIG. 23 other than that a supporting member rotating device 721 that controls the rotation of the supporting member 511, and a roller rotating device 722 that controls the rotation of the feed roller 711 are provided. The supporting member rotating device 721 rotates the supporting member 511, and configures a rotating means of the present invention.

However, in the shaping device 710, the shaping main-scanning direction driving device 521 drives only the carriage 515 of the supporting member 511 and the carriage 515 in the Y direction. The shaping sub-scanning direction driving device 522 drives only the carriage 515 of the supporting member 511 and the carriage 515 in the X direction. The shaping height direction driving device 523 drives only the carriage 515 of the supporting member 511 and the carriage 515 in the Z direction. The cutting main-scanning direction driving device 524 drives only the carriage 517 of the supporting member 511 and the carriage 517 in the Y direction. The cutting sub-scanning direction driving device 525 drives only the carriage 517 of the supporting member 511 and the carriage 517 in the X direction. The cutting height direction driving device 526 drives only the carriage 517 of the supporting member 511 and the carriage 517 in the Z direction.

Next, a three-dimensional object manufacturing method using the shaping device 710 will be described.

As described above, the control unit 529 of the shaping device 710 forms the shaping material portion 541 and the support material portion 542 in the porous sheet 531, and after bringing one part 543 of the three-dimensional object in the porous sheet 531 and the portions other than the three-dimensional object into a separable state, controls the shaping height direction driving device 523 and the cutting height direction driving device 526 based on the shaping data to move the carriage 515 and the carriage 517 toward the upper side in the vertical direction by a distance worth the thickness of one porous sheet 531.

Then, the control unit 529 drives the carriage 515 by at least one of the shaping main-scanning direction driving device 521 and the shaping sub-scanning direction driving device 522 and drives the carriage 517 by at least one of the cutting main-scanning direction driving device 524 and the cutting sub-scanning direction driving device 525 to a position where the carriage 515 and the carriage 517 do not make contact with the supporting member 511 and the porous sheet 531 wound around the supporting member 511 when the supporting member 511 rotates by 180° in a specific direction about the center shaft 511*b*.

The control unit 529 then operates the supporting member rotating device 721 so that the supporting member 511 rotates by 180° in a specific direction about the center shaft 511*b*. The porous sheet 531 is fed from the feed roller 711 by the amount taken up by the supporting member 511. After the rotation of the supporting member 511 is finished, the control unit 529 biases the feed roller 711 by the roller rotating direction 722 in a direction opposite to the rotating direction at the time of feeding the porous sheet 531 to apply tension in the Y direction on the porous sheet 531 whose position in the horizontal direction is overlapped with respect to the supporting member 511 and whose position in the vertical direction is on the uppermost side of the porous sheets 531 fed by the feed roller 711.

Figure 35:
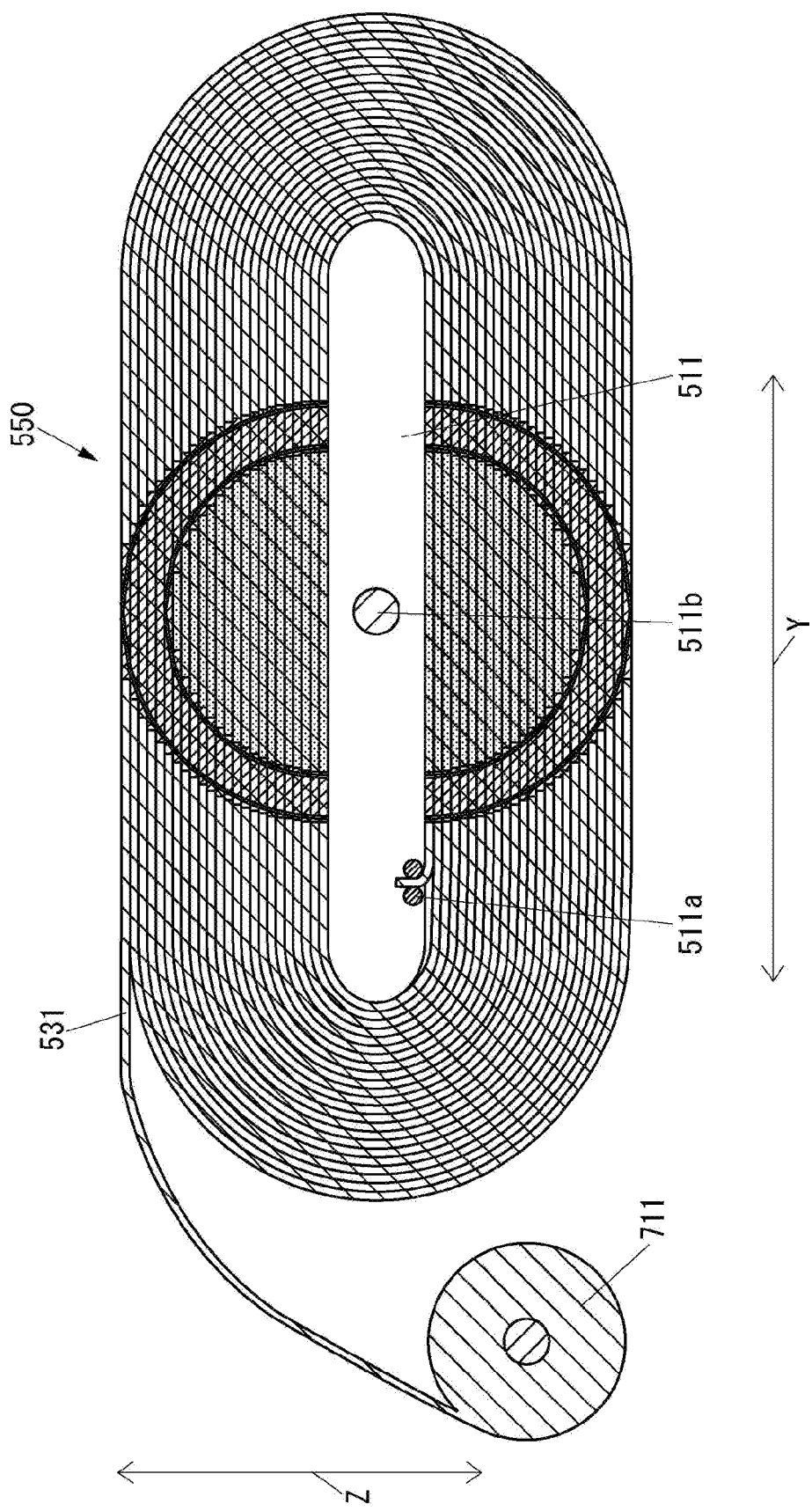
FIG. 35 is a schematic front cross-sectional view of one part of the shaping device shown in FIG. 33.

FIG. 35 is a schematic front cross-sectional view of one part of the shaping device 710.

The control unit 529 repeats the above operations to manufacture the three-dimensional object 550 shown in FIG. 35. The three-dimensional object 550 shown in FIG. 35 has a layer formed for every thickness of one porous sheet 531 so as to be configured by overlapping a plurality of layers. As shown in FIG. 35, the shaping device 710 can manufacture the three-dimensional object 550 on each of the two surfaces of the supporting member 511. Since the cured shaping material 512*a* and the support material 513*a* are attached to the surface of the supporting member 511 with an adhesive force of a certain extent, even if the three-dimensional object 550 exists on the lower side in the vertical direction with respect to the supporting member 511, the three-dimensional object 550 will not drop off from the supporting member 511 unless a force of a certain extent is applied.

In the shaping device 710, the porous sheet 531 is transported in the Y direction in the description made above, but may be transported in the X direction. In other words, the shaping device 710 may have the center shaft of the feed roller 711, and the center shaft 511*b* of the supporting member 511 extending in the Y direction.

The supporting member rotating device 721 winds the porous sheet 531 around the supporting member 511 by rotating the supporting member 511 to layer the porous sheets 531. According to such configuration, the shaping device 710 facilitates the layering of the plurality of porous sheets 531 on the supporting member 511, and thus can facilitate the manufacturing of the three-dimensional object 550.

The shaping device 610 shown in FIG. 29 maintains the position of the porous sheet 531 with respect to the carriage 515 and the carriage 517 by the balance of the tensile force of the porous sheet 531 by the feed roller 611 and the take-up roller 612. The shaping device 710 shown in FIG. 33, on the other hand, maintains the position of the porous sheet 531 with respect to the carriage 515 and the carriage 517 by the tensile force of the porous sheet 531 solely by the feed roller 711. Therefore, the shaping device 710 can maintain the position of the porous sheet 531 with respect to the carriage 515 and the carriage 517 at high precision compared to the shaping device 610.

Furthermore, in the shaping device 710, the supporting member 511 has two surfaces, on which the three-dimensional object 550 is formed, in the rotating direction, and the three-dimensional object 550 can be manufactured on each of the two surfaces of the supporting member 511, whereby a plurality of three-dimensional objects 550 can be manufactured at high speed compared to the shaping device 610.

Figure 36:
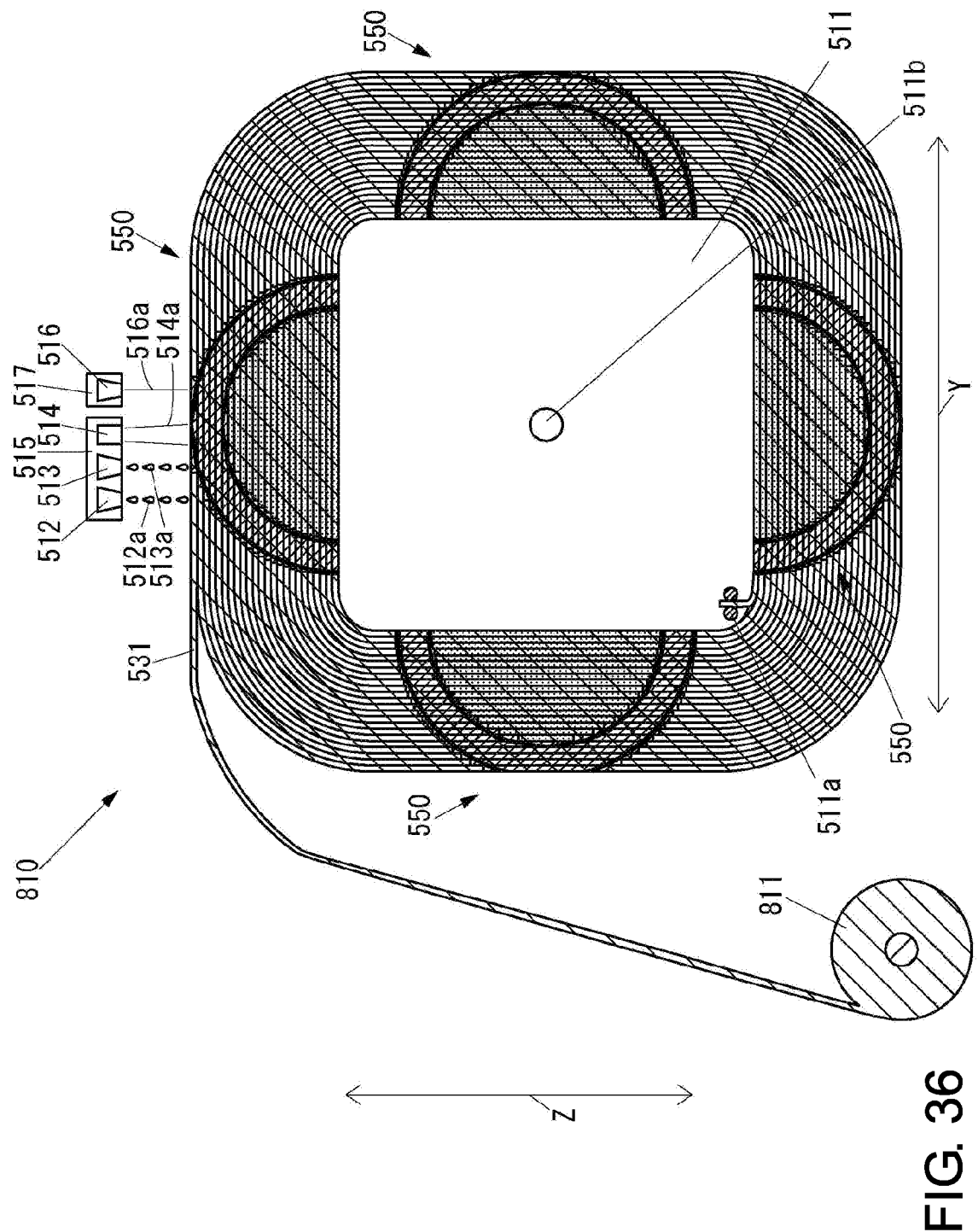
FIG. 36 is a schematic front view showing an example different from the examples shown in FIG. 29 and FIG. 33, and shows one example of the shaping device shown in FIG. 21.

FIG. 36 is a schematic front view showing a shaping device 810 serving as an example of the shaping device 510.

The shaping device 510 shown in FIG. 21 can be realized as the shaping device 810 shown in FIG. 36.

As shown in FIG. 36, the shaping device 810 is similar to the shaping device 710 shown in FIG. 33 other than in the shape of the supporting member 511 and in that the control unit 529 operates the supporting member rotating device 721 so that the supporting member 511 rotates not by 180° but by 90° in a specific direction about the center shaft 511b.

In the shaping device 810, the porous sheet 531 is transported in the Y direction in FIG. 36, but may be transported in the X direction. In other words, the shaping device 810 may have the center shaft of a feed roller 811 and the center shaft 511b of the supporting member 511 extending in the Y direction.

The shaping device 810 winds the porous sheet 531 around the supporting member 511 by rotating the supporting member 511 to layer the porous sheets 531, similarly to the shaping device 710 shown in FIG. 35. According to such configuration, the shaping device 810 facilitates the layering of the plurality of porous sheets 531 on the supporting member 511, and thus can facilitate the manufacturing of the three-dimensional object 550.

In the shaping device 810, the supporting member 511 has four surfaces, on which the three-dimensional object 550 is formed, in the rotating direction, and the three-dimensional object 550 can be manufactured on each of the four surfaces of the supporting member 511, whereby a plurality of three-dimensional objects 550 can be manufactured at high speed compared to the shaping device 710.

Figure 37:
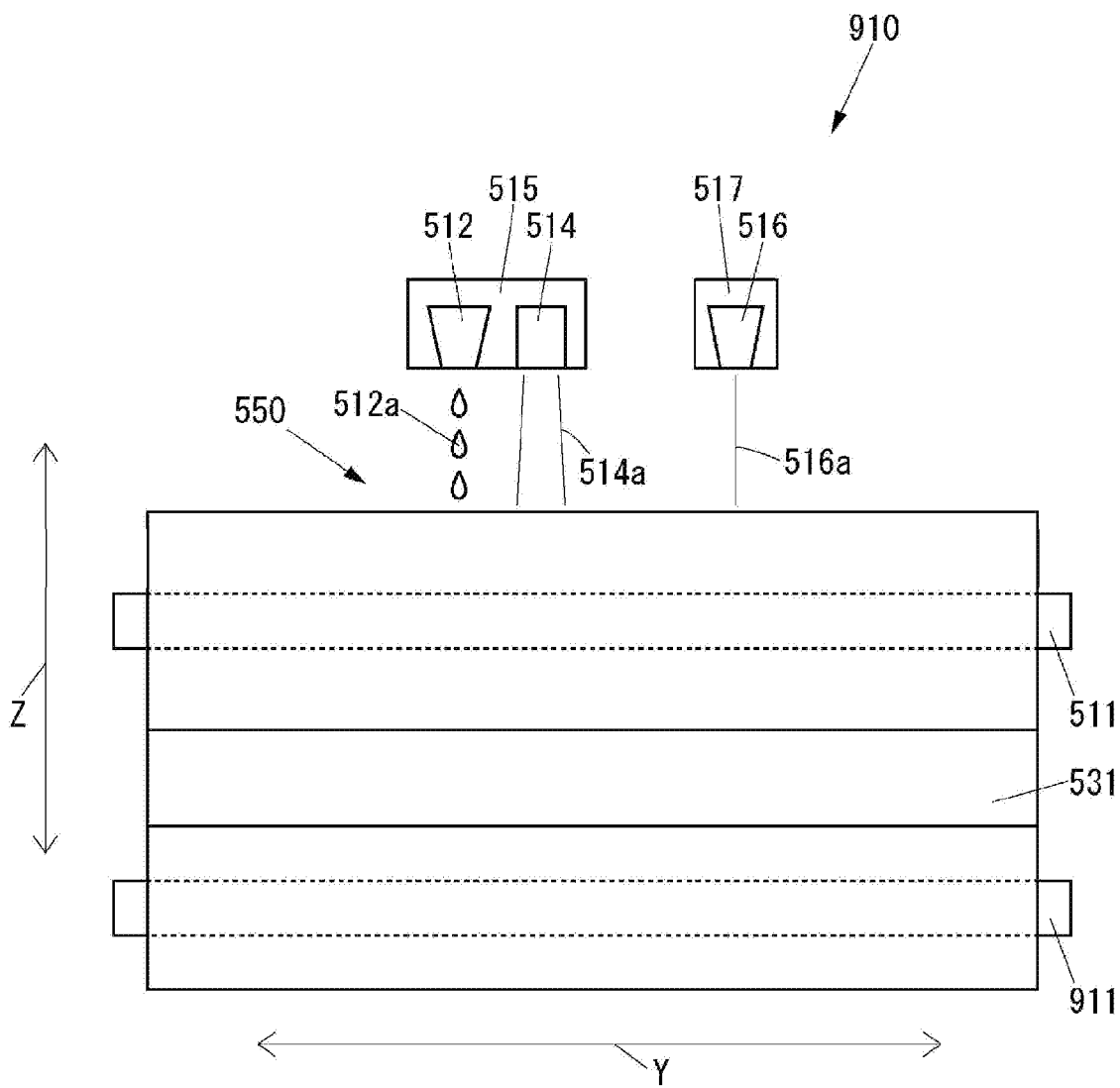
FIG. 37 is a schematic front view showing an example different from the examples shown in FIG. 29, FIG. 33 and FIG. 36, and shows one example of the shaping device shown in FIG. 21.
Figure 38:
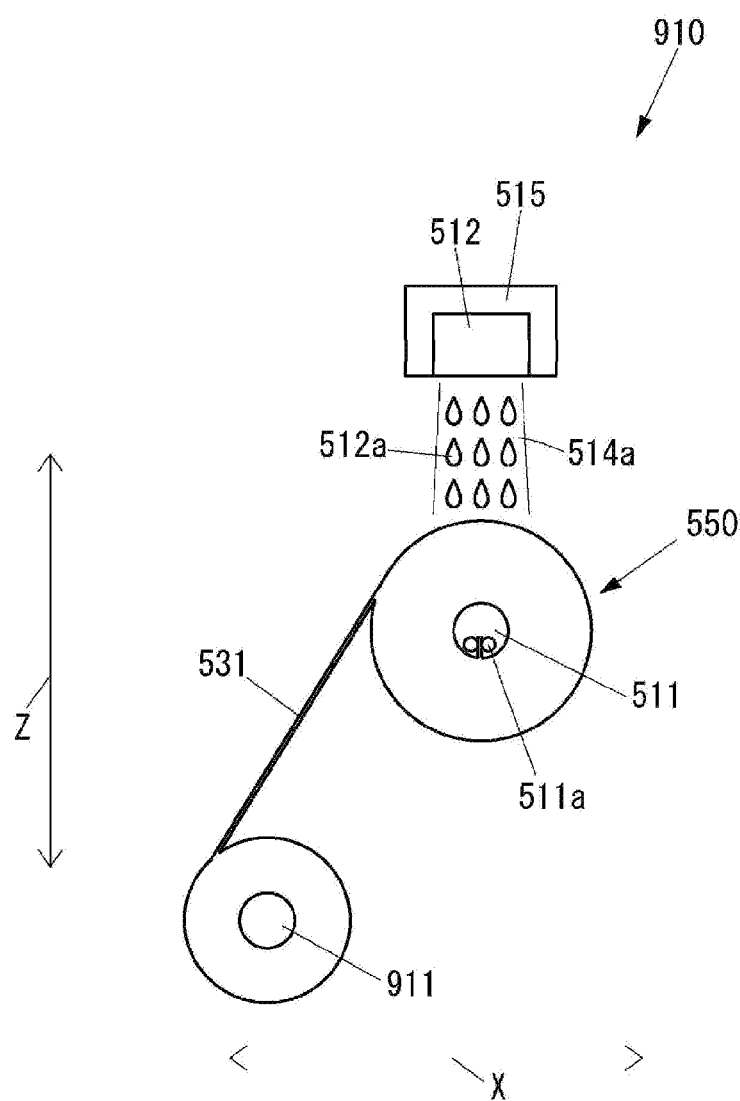
FIG. 38 is a schematic side view of the shaping device shown in FIG. 37.

FIG. 37 is a schematic front view showing a shaping device 910 serving as an example of the shaping device 510. FIG. 38 is a schematic side view of the shaping device 910.

The shaping device 510 shown in FIG. 21 can be realized as the shaping device 910 shown in FIG. 37 and FIG. 38.

As shown in FIG. 37 and FIG. 38, the shaping device 910 includes a feed roller 911 around which the porous sheet 531 is wound to feed the porous sheet 531. The center shaft of the feed roller 911 is extended in the Y direction. The feed roller 911 is rotatably supported about the center shaft.

The supporting member 511 of the shaping device 910 includes a sheet fixing portion 511a to which the porous sheet 531 is fixed. The supporting member 511 of the shaping device 910 has a circular column shape. The center shaft of the supporting member 511 of the shaping device 910 is extended in the Y direction. The supporting member 511 of the shaping device 910 is rotatably supported about the center shaft.

The configuration of the control system of the shaping device 910 is similar to the configuration shown in FIG. 30.

However, in the shaping device 910, the shaping main-scanning direction driving device 521 drives only the carriage 515 of the supporting member 511 and the carriage 515 in the Y direction. The shaping height direction driving device 523 drives only the carriage 515 of the supporting member 511 and the carriage 515 in the Z direction. The cutting main-scanning direction driving device 524 drives only the carriage 517 of the supporting member 511 and the carriage 517 in the Y direction. The cutting height direction driving device 526 drives only the carriage 517 of the supporting member 511 and the carriage 517 in the Z direction. The shaping sub-scanning direction driving device 522 and the cutting sub-scanning direction driving device 525 are the same device, and rotate only the supporting member 511 of the supporting member 511, and the carriage 515 and the carriage 517 about the center axis of the supporting member 511 to relatively move one of the supporting member 511, and the carriage 515 and the carriage 517 with respect to the other in the X direction. The roller rotating device 621 rotates the feed roller 911. The roller rotating device 621 controls the rotation of the feed roller 911.

Next, a three-dimensional object manufacturing method using the shaping device 910 will be described.

After ejecting the liquid shaping material 512a toward the porous sheet 531 by the shaping material head 512 based on the shaping data, the control unit 529 irradiates the shaping material 512a attached to the porous sheet 531 with the ultraviolet light by the ultraviolet irradiating device 514 to cure and solidify the shaping material 512a. The control unit 529 solidifies the shaping material 512a attached to the porous sheet 531 as described above while controlling the shaping main-scanning direction driving device 521 based on the shaping data to form the shaping material portion 541 formed with the shaping material 512a in the porous sheet 531.

After forming the shaping material portion 541 in the porous sheet 531, the control unit 529 irradiates the porous sheet 531 with the laser light 516a by the laser cutter 516 while controlling the cutting main-scanning direction driving device 524 and the cutting direction changing device 527 based on the shaping data to cut the porous sheet 531.

The control unit 529 solidifies the shaping material 512a attached to the porous sheet 531 in the above manner and cuts the porous sheet 531 with the laser cutter 516 while controlling the shaping sub-scanning direction driving device 522 based on the shaping data to form the shaping material portion 541 formed with the shaping material 512a in the porous sheet 531 and bring one part of the three-dimensional object in the porous sheet 531 and the portions other than the three-dimensional object into a separable state. The control unit 529 biases the feed roller 911 by the roller rotating device 621 in a direction opposite to the rotating direction at the time of feeding the porous sheet 531 to apply tension in the X direction on the porous sheet 531 whose position in the horizontal direction is overlapped with respect to the supporting member 511 and whose position in the vertical direction is on the uppermost side of the porous sheets 531 fed by the feed roller 911.

The control unit 529 controls the shaping height direction driving device 523 and the cutting height direction driving device 526 in accordance with the rotation of the supporting member 511 by the shaping sub-scanning direction driving device 522 so that the distance between the carriage 515 and the carriage 517 and the porous sheet 531 at the position facing thereto is within a range of a specific distance.

The control unit 529 can manufacture a tube-shaped three-dimensional object 550 that surrounds the supporting member 511 by repeating the above operations.

The shaping sub-scanning direction driving device 522 and the cutting sub-scanning direction driving device 525 serving as the rotating means of the present invention rotate the supporting member 511 to wind the porous sheet 531 around the supporting member 511 and layer the porous sheets 531. According to such configuration, the shaping device 910 facilitates the layering of the plurality of porous sheets 531 on the supporting member 511, and can facilitate the manufacturing of the three-dimensional object 550.

The shaping material head 512 of the shaping device 910 brings into contact with each other the shaping materials 512a ejected in a state where the rotation angles of the supporting member 511 by the shaping sub-scanning direction driving device 522 and the cutting sub-scanning direction driving device 525 are different from each other. According to such configuration, the shaping device 910 can manufacture the three-dimensional object 550 of a shape corresponding to the rotation of the supporting member 511 by the shaping sub-scanning direction driving device 522 and the cutting sub-scanning direction driving device 525, such as the tube-shaped three-dimensional object 550 and the like.

As described above, the three-dimensional object 550 is suited as a three-dimensional object capable of suppressing the occurrence of breakage and bend at the narrow portion since the porous sheets 531 are caused to adhere by the shaping material 512*a* to enhance the mechanical strength.

In the three-dimensional object 550, the shaping material 512*a* is an ultraviolet curable ink, and thus the shaping material 512*a* is cured at high speed and at high precision. Therefore, the three-dimensional object 550 can be manufactured at high speed and at high precision.

The shaping material 512*a* may be an ink other than the ultraviolet curable ink, or may cause the porous sheets 531 to adhere through a method other than the inkjet method. The shaping material 512*a* may be attached to the porous sheet 531 with a dispenser.

The shaping devices 510, 610, 710, 810, and 910 can manufacture the high precision three-dimensional object 550 having a high mechanical strength as the porous sheets 531 are caused to adhere with the shaping material 512*a* to enhance the mechanical strength, and the three-dimensional object 550 is cut out at high precision from the porous sheet 531 with the laser cutter 516. Therefore, the shaping devices 510, 610, 710, 810, and 910 are suited for the manufacturing of the three-dimensional object 550 capable of suppressing the occurrence of breakage and bend at the narrow portion.

The shaping material 512*a* used in the inkjet method needs to be ejected with the shaping material head 512, and thus is a liquid of low viscosity. The diameter of the nozzle of the shaping material head 512 used in the inkjet method is normally about 20 μm to 30 μm. Thus, the shaping material 512*a* cannot be mixed with a reinforcement material of large particle size or a filament-like reinforcement material to prevent clogging of the nozzle of the shaping material head 512. Thus, when formed only with the shaping material 512*a* without using the porous sheet 531, the three-dimensional object 550 cannot be used in applications where strength and durability are required. When the three-dimensional object 550 is a large object, the three-dimensional object 550 may possibly break by its own weight when the porous sheet 531 is not used and it is formed with only the shaping material 512*a*. However, the three-dimensional object 550 in the present embodiment can obtain the strength by being reinforced with the porous sheet 531, and thus can be used in applications where strength and durability are required.

The three-dimensional object 550 can enhance the precision in the Z direction by thinning the thickness of the porous sheet 531.

Furthermore, the three-dimensional object 550 can exercise the performance corresponding to the performance of the porous sheet 531. When the porous sheet 531 is a member of high strength, the strength of the three-dimensional object 550 enhances. Furthermore, when the porous sheet 531 has fire resistance property, the three-dimensional object 550 can have fire resistance property.

The invention claimed is:

1. A three-dimensional object manufacturing method for manufacturing a three-dimensional object by ejecting shaping material in a liquid state and then solidifying the ejected shaping material, the method comprising:
   an interior forming process of forming a portion of an interior of the three-dimensional object by a shaping material; and
   a periphery forming process of forming a portion of a periphery of the portion of the interior by stacking a plurality of layers by a shaping material, wherein
   the shaping material for forming the portion of the interior in the interior forming process has a larger rigidity in a solid state compared to the shaping material for forming the portion of the periphery in the periphery forming process,
   the periphery forming process is a process of forming a groove configuring at least one part of the portion of the periphery, wherein the groove is formed by stacking the plurality of layers by the shaping material in a vertical direction orthogonal to an extending direction of the plurality of layers, and
   the interior forming process is a process of forming the portion of the interior, after the groove is formed, by placing the shaping material in the liquid state in the groove formed by stacking of the plurality of layers before the portion of the periphery of one part of the three-dimensional object is formed in the periphery forming process,
   wherein the interior forming process and the periphery forming process are processes of ejecting the shaping material in the liquid state through an inkjet method,
   wherein the three dimensional object includes a first part and a second part that is narrower than the first part,
   wherein the second part that is narrower than the first part is formed by the interior forming process and the periphery forming process.

2. The three-dimensional object manufacturing method as set forth in claim 1, wherein a liquid used in the periphery forming process becomes the shaping material after solidifying.

3. The three-dimensional object manufacturing method as set forth in claim 1, wherein the first part is formed by the interior forming process and the periphery forming process, and
   the second part protrudes from the first part.

4. A three-dimensional object manufacturing method for manufacturing a three-dimensional object by ejecting a shaping material in a liquid state and then solidifying the ejected shaping material, the method comprising:
   an interior forming process of forming a portion of an interior of the three-dimensional object with a reinforcement material other than the shaping material; and
   a periphery forming process of forming a portion of a periphery of the portion of the interior by stacking a plurality of layers by the shaping material, wherein
   the reinforcement material has a larger rigidity compared to the shaping material in a solid state,
   wherein the periphery forming process is a process in which a direction orthogonal to an extending direction of the plurality of layers disposed by layering is a vertical direction,
   wherein the reinforcement material has a planar shape extending in the extending direction of the plurality of layers and is disposed in plural positions in the vertical direction;
   the three-dimensional object has a space formed at one part of an area on a lower side of each of the reinforcement material in the vertical direction in the periphery forming process, the portion of the periphery includes a supporting portion that supports the reinforcement material on the lower side of the reinforcement material in the vertical direction in the periphery forming process and that configures one part of a boundary of the space.

5. The three-dimensional object manufacturing method set forth in claim 4, wherein the reinforcement material includes a connecting part for connecting with another member.

6. The three-dimensional object manufacturing method as set forth in claim 4, wherein the interior forming process is a process in which the reinforcement material is disposed in the portion of the interior before the portion of the periphery of one part of the three-dimensional object is formed in the periphery forming process.

7. The three-dimensional object manufacturing method as set forth in claim 6, wherein the periphery forming process is a process of ejecting the shaping material in the liquid state with a shaping device based on shaping data, and the periphery forming process is a process of disposing the reinforcement material in the portion of the interior in the interior forming process, then detecting a position of the reinforcement material with respect to the portion of the periphery, and correcting the shaping data based on the detected position.

8. The three-dimensional object manufacturing method set forth in claim 4, wherein the interior forming process is a process in which the reinforcement material is inserted to the portion of the interior after all the portions of the periphery of the three-dimensional object are formed in the periphery forming process.

9. The three-dimensional object manufacturing method as set forth in claim 4, wherein a surface of the supporting portion of the surfaces forming the space is an inclined plane that does not overhang in the periphery forming process.

10. The three-dimensional object manufacturing method as set forth in claim 9, wherein the supporting portion includes:

an end supporting part that supports the reinforcement material at an end of the reinforcement material in the extending direction of the plurality of layers; and a non-end supporting part that supports the reinforcement material at a portion other than the end.

11. The three-dimensional object manufacturing method as set forth in claim 9, wherein the reinforcement material has a hole formed at at least one part of an area having the space formed on both sides in a direction orthogonal to the extending direction of the plurality of layers.

12. A three-dimensional object manufacturing method for manufacturing a three-dimensional object by ejecting a shaping material in a liquid state and then solidifying the ejected shaping material, the method comprising:

an interior forming process of forming a portion of an interior of the three-dimensional object by the shaping material; and a periphery forming process of forming a portion of a periphery of the portion of the interior by stacking a plurality of layers by the shaping material, wherein the shaping material for forming the portion of the interior in the interior forming process has a larger rigidity in a solid state compared to the shaping material for forming the portion of the periphery in the periphery forming process, the periphery forming process is a process of forming a groove configuring at least one part of the portion of the periphery, wherein the groove is formed by stacking the plurality of layers by the shaping material in a vertical direction orthogonal to an extending direction of the plurality of layers, and the interior forming process is a process of forming the portion of the interior, after the groove is formed, by placing the shaping material in the liquid state in the groove formed by stacking of the plurality of layers after all the portions of the periphery of the three-dimensional object are formed in the periphery forming process, wherein the interior forming process and the periphery forming process are processes of ejecting the shaping material in the liquid state through an inkjet method, wherein the three dimensional object includes a first part and a second part that is narrower than the first part, wherein the second part that is narrower than the first part is formed by the interior forming process and the periphery forming process.

13. The three-dimensional object manufacturing method as set forth in claim 12, wherein the first part is formed by the interior forming process and the periphery forming process, and the second part protrudes from the first part.

* * * * *